(12) United States Patent
Heinrich et al.

(10) Patent No.: US 10,884,523 B2
(45) Date of Patent: Jan. 5, 2021

(54) FILM AND METHOD FOR PRODUCING A FILM

(71) Applicant: LEONHARD KURZ Stiftung & Co. KG, Furth (DE)

(72) Inventors: Matthias Heinrich, Nuremberg (DE); Andreas Hirschfelder, Furth (DE); Martin Hahn, Herrieden (DE); Johannes Schad, Furth (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 201 days.

(21) Appl. No.: 15/778,071

(22) PCT Filed: Nov. 21, 2016

(86) PCT No.: PCT/EP2016/078349
§ 371 (c)(1),
(2) Date: May 22, 2018

(87) PCT Pub. No.: WO2017/093066
PCT Pub. Date: Jun. 8, 2017

(65) Prior Publication Data
US 2018/0348900 A1    Dec. 6, 2018

(30) Foreign Application Priority Data

Dec. 4, 2015  (DE) .................. 10 2015 121 195
Feb. 1, 2016  (DE) .................. 10 2016 101 736
Aug. 8, 2016  (DE) .................. 10 2016 114 638

(51) Int. Cl.
*B32B 3/00* (2006.01)
*G06F 3/041* (2006.01)
(Continued)

(52) U.S. Cl.
CPC ............. *G06F 3/041* (2013.01); *B32B 7/14* (2013.01); *B32B 37/06* (2013.01);
(Continued)

(58) Field of Classification Search
CPC .......... G06F 3/041; B32B 7/12; B32B 37/02; B32B 37/1292
See application file for complete search history.

(56) References Cited

U.S. PATENT DOCUMENTS 9,182,820 B1    11/2015  Hebenstreit et al.
2002/0149572 A1  10/2002  Schulz et al.
(Continued)

FOREIGN PATENT DOCUMENTS

DE    102005006074    8/2006
DE    102010044598    1/2012
(Continued)

*Primary Examiner* — Elizabeth E Mulvaney
(74) *Attorney, Agent, or Firm* — Hoffmann & Baron, LLP

(57) ABSTRACT

A film, a method for producing a film, the use of a film for application to a target substrate as well as a method for producing an electrical functional element. The film here includes a carrier substrate, an adhesion-promoting layer for applying the film to a target substrate, and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate.

82 Claims, 24 Drawing Sheets

(51) Int. Cl.
  *B32B 7/14* (2006.01)
  *B32B 37/06* (2006.01)
  *B32B 37/12* (2006.01)

(52) U.S. Cl.
  CPC .... *B32B 37/1292* (2013.01); *B32B 2255/205* (2013.01); *B32B 2307/202* (2013.01); *B32B 2309/02* (2013.01); *B32B 2457/208* (2013.01); *G06F 2203/04103* (2013.01); *G06F 2203/04104* (2013.01)

(56) References Cited

U.S. PATENT DOCUMENTS

| | | |
|---|---|---|
| 2008/0213541 A1 | 9/2008 | Schilling et al. |
| 2009/0044972 A1 | 2/2009 | Kitajima et al. |
| 2012/0026107 A1 | 2/2012 | Kim et al. |
| 2013/0248230 A1 | 9/2013 | Park et al. |
| 2014/0145980 A1 | 5/2014 | Feng et al. |
| 2014/0202840 A1 | 7/2014 | Fix et al. |
| 2014/0307181 A1 | 10/2014 | Tang et al. |
| 2015/0047885 A1 | 2/2015 | Chang et al. |
| 2015/0062452 A1 | 3/2015 | Shih et al. |
| 2015/0125680 A1 | 5/2015 | Araki et al. |
| 2015/0199048 A1 | 7/2015 | Monson et al. |
| 2015/0293558 A1 | 10/2015 | Hahn et al. |
| 2015/0316958 A1 | 11/2015 | Takesue |
| 2015/0338943 A1 | 11/2015 | Donnelly et al. |
| 2017/0066168 A1 | 3/2017 | Ludwig et al. |

FOREIGN PATENT DOCUMENTS

| | | |
|---|---|---|
| DE | 102012109820 | 4/2014 |
| DE | 102014106585 | 11/2015 |

FILM AND METHOD FOR PRODUCING A FILM

This application claims priority based on an International Application filed under the Patent Cooperation Treaty, PCT/EP2016/078349, filed Nov. 21, 2016, which claims priority to DE102015121195.5, filed Dec. 4, 2015, DE102016101736.1, filed Feb. 1, 2016 and DE102016114638.2, filed Aug. 8, 2016.

BACKGROUND OF THE INVENTION

The invention relates to a film, a method for producing a film, the use of a film for application to a target substrate as well as a method for producing an electrical functional element.

Combined input and output devices such as touchscreens, which are also called touch-sensitive screens, have various uses. Thus, for example, the use of touchscreens makes it possible to control a computer program by touching the touchscreen. For this, a touch sensor panel which detects touch is typically arranged on a display element, such as for example a liquid crystal display. The touch sensor panel thus makes it possible to control the image generated by the display element. Further input devices such as a computer mouse or a keyboard are therefore not required or are only required for special applications. Because of their typically smooth surface, touch sensor panels are less susceptible to dirt and easier to clean than other input devices. They further make an intuitive operation possible for the users. Touch sensors are therefore used in various ways for example in mobile telephones, in particular smartphones, as well as PDAs, tablet computers, cash machines, ticket machines, gaming machines and games consoles and also in household appliances or in motor vehicles.

To produce such touchscreens, until now touch sensors have been bonded to a target substrate, such as for example a display element, by means of a separately present adhesive film. The adhesive film here has a non-self-supporting adhesive layer which is arranged between two so-called liners. For the application of a touch sensor, in a first step one liner of the adhesive film is removed and then the adhesive layer is bonded to the touch sensor. In a second step the remaining liner is removed and the touch sensor is adhered to the target substrate. As these production processes are usually carried out by hand, a production quality that is as identical as possible is not always guaranteed. Thus, for example, the exact positioning of the touch sensor during application to the target substrate is error-prone. The individual work steps, in particular the detachment of the liners as well as a bubble-free application of the adhesive layer to the touch sensor or of the touch sensor to the target substrate, also require a large outlay in terms of time and personnel. In particular in the case of mass production, the provision of the individual preliminary products also requires a large logistical outlay in order to enable a production process that is as uninterrupted as possible.

SUMMARY OF THE INVENTION

The object of the invention is now to provide a film which avoids the disadvantages of the state of the art.

This object is achieved by a film comprising a carrier substrate, an adhesion-promoting layer for application of the film to a target substrate and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate. This object is further achieved by a method for producing a film, in particular according to one of claims 1 to 53, wherein the method comprises the following steps, which are implemented in particular in the following sequence: a) providing a carrier substrate; b) applying at least one electrically conductive layer to the carrier substrate, wherein the at least one electrically conductive layer forms an electrical functional structure in a functional region, wherein the at least one electrically conductive layer forms at least one contacting structure for contacting the electrical functional structure in at least one contacting region; c) applying an adhesion-promoting layer for application of the film to a target substrate in such a way that the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate. This object is further achieved by the use of a film according to one of claims 1 to 53 for application to a target substrate. This object is also achieved by a method for producing an electrical functional element, wherein the method comprises the following steps: a) providing a film according to one of claims 1 to 53; b) applying the film to a target substrate. This object is further also achieved by an electrical functional element with a film according to one of claims 1 to 53.

It has been shown here that the film according to the invention improves the production process for electrical functional elements, such as for example touchscreens. Thus, the film according to the invention makes a direct application of the film to a target substrate possible without further intermediate steps and/or further intermediate products. This makes a faster production process possible and makes it possible to reduce costs in the production. Because the adhesion-promoting layer does not cover the at least one contacting region at least in areas, it is ensured that the electrical functional structure can be reliably and robustly contacted after application of the film to the target substrate. As the contacting region does not adhere to the target substrate in the regions without adhesion-promoting layer, the target substrate is easily accessible for a contacting. Waste can also be reduced compared with the use of an adhesive film with a non-self-supporting adhesive layer which is arranged between two so-called liners, as for example neither the error-prone and laborious adaptation of the previously separately present adhesive film to the target substrate nor the adaptation of the adhesive film to the touch sensor has to be carried out by hand. The production costs can be further reduced hereby. The film according to the invention also makes an industrial mass production possible. Thus, for example, it is possible to apply the film to a target substrate over the whole surface by means of hot laminators. During hot lamination individual, in particular loose, layers of a layer stack are acted on by means of pressure and heat in order to join the individual layers of the layer stack to each other non-detachably and thus to produce a composite body. Here, the pressure and/or the heat acts on the layer stack for example by means of flat tools. Alternatively or additionally, for example, rollers can also be provided as tools, which allow pressure and/or heat to act on the layer stack as a linear contact in a roller gap. The outlay in terms of time, personnel and logistics can be further reduced hereby and at the same time an identical production quality can be ensured. The invention thus makes it possible to produce electrical functional elements, for example a display with a touch sensor, cost-effectively and at the same time to enable a robust and reliable contacting of the electrical functional structure which provides, for example, the touchpad functionality.

By region is meant here in each case a defined surface area of a layer or of the film, which is occupied when viewed perpendicularly to a plane spanned by the carrier substrate. Thus, for example, the at least one electrically conductive layer has a functional region as well as at least one contacting region, wherein each of the regions occupies in each case a defined surface area when viewed perpendicularly to a plane spanned by the carrier substrate.

Further advantageous embodiments of the invention are indicated in the dependent claims.

It has proved worthwhile to arrange the at least one electrically conductive layer between the carrier substrate and the adhesion-promoting layer. Thus, it is possible for the adhesion-promoting layer to be arranged on the side of the at least one electrically conductive layer facing away from the carrier substrate. Thus, it is possible for the adhesion-promoting layer to be applied in step c) in such a way that the at least one electrically conductive layer is arranged between the carrier substrate and the adhesion-promoting layer. As the adhesion-promoting layer is arranged on the surface of the film, the film can be applied directly to a target substrate, wherein it is further ensured that the electrical functional structure is reliably contactable.

It is also possible for the adhesion-promoting layer to be arranged on the side of the carrier substrate facing away from the at least one electrically conductive layer. Thus, it is possible in step c) for the adhesion-promoting layer to be arranged on the side of the carrier substrate facing away from the at least one electrically conductive layer.

Here, the adhesion-promoting layer is preferably applied over the whole surface when viewed perpendicularly to a plane spanned by the carrier substrate. The adhesion-promoting layer is thus advantageously arranged in the functional region and in the contacting region. It is further possible for the adhesion-promoting layer to be applied to the carrier substrate over the whole surface in such a way that no further layers are arranged between the carrier substrate and the adhesion-promoting layer.

The adhesion-promoting layer preferably covers the functional region at least in areas. Thus, it is possible in step c) for the adhesion-promoting layer to be applied in such a way that the adhesion-promoting layer covers the functional region at least in areas. It can hereby be ensured that the functional region adheres to the target substrate.

By adhesion is meant here an adhesion of the film to the target substrate in such a way that a predefined minimum adhesive force is achieved, which enables a secure adhesion of the film to the target substrate. The adhesive force here is at least so strong that the film cannot be separated from the intermediate or end product having the applied film and the target substrate in the case of normal use. However, the adhesive force here is not necessarily so strong that the film cannot be separated from the target substrate under the exertion of a large force, such as for example during a tearing down. Thus, it is possible for the adhesive force to be such that the film can be separated mechanically from the target substrate without damaging the target substrate or the film.

The adhesion-promoting layer advantageously covers at least 30%, preferably at least 50%, further preferably at least 70%, of the functional region.

It is further possible for the adhesion-promoting layer not to cover the at least one contacting region over the whole surface. Thus, it is possible for the adhesion-promoting layer not to cover the entire at least one contacting region when viewed perpendicularly to the plane spanned by the carrier substrate. A reliable and robust contacting of an electrical functional structure, which provides, for example, the touchpad functionality, is hereby made possible.

It is advantageous that the adhesion-promoting layer does not cover a region adjoining the at least one contacting region when viewed perpendicularly to a plane spanned by the carrier substrate.

It is further advantageous that the region adjoining the at least one contacting region has a width of at least 0.2 mm, preferably at least 0.5 mm, further preferably at least 1 mm, still further preferably at least 2 mm. By width is meant here the distance between the boundary surface which is formed by the at least one contacting region and the one region adjoining the at least one contacting region and the boundary surface which is formed by the adhesion-promoting layer and the one region adjoining the at least one contacting region.

A contacting of the electrical functional structure is hereby made easier, as the region in which the film does not adhere to the target substrate is enlarged. As this region directly adjoins the contacting region, it is made possible for example to raise the film in the contacting region during a contacting process, whereby the contacting structure is more accessible and thus the contacting is further made easier. Thus, it is possible for the region adjoining the at least one contacting region to be movable in such a way that the at least one contacting region can be raised.

According to a further embodiment example of the invention, the adhesion-promoting layer is a layer made of polymers and/or copolymers, in particular comprising polymethyl (meth)acrylate (PMMA), polyester, polyurethane (PU) or polyvinyl chloride (PVC).

Less preferably, the adhesion-promoting layer contains natural resins, preferably colophony, phenol resins, isocyanate (NCO)-crosslinked binders, for example melamine formaldehyde condensation resins (MF), melamine phenol formaldehyde resins (MPF), melamine polyesters, melamine urea formaldehyde resins (UMF), poly(organo)siloxanes or radiation-curing binders.

By binders is meant here substances which can be used to join solids, in particular with a fine granularity, to each other or to a base. Thus, it is possible for the binders to be added in liquid form to the solids to be bound.

The adhesion-promoting layer advantageously has a layer thickness between 0.1 µm and 50 µm, preferably between 0.25 µm and 25 µm, further preferably between 0.5 µm and 7 µm.

It is further advantageous if the adhesion-promoting layer comprises one or more layers. Thus, it is possible for the adhesion-promoting layer to comprise two layers, in particular a first adhesion-promoting layer and a second adhesion-promoting layer. It is hereby possible to optimize the adhesion of the film to the target substrate. Thus, the second adhesion-promoting layer, which is arranged in particular between the first adhesion-promoting layer and the target substrate, can be matched for example to the material of the target substrate, wherein the first adhesion-promoting layer is matched to the material of the layer of the film adjoining the first adhesion-promoting layer, for example a protective varnish layer. Through suitable choice of the first and second adhesion-promoting layers, the adhesion of the film to the target substrate can thus be optimized.

It is advantageous that the adhesion-promoting layer consists of a material which is highly transparent after application of the film to the target substrate, in particular that the adhesion-promoting layer consists of a material which has a transmittance for light in the wavelength range between 380 nm and 780 nm of more than 85%, preferably more than 90%, after application of the film to the target substrate. It can hereby be achieved, for example, that through the adhesion-promoting layer the intensity of light emitted by the target substrate in the wavelength range between 380 nm and 780 nm is not substantially reduced. Items of optical information of the target substrate are further clearly recognizable through the film applied to the target substrate. It can hereby be achieved, for example, that the resolution and color reproduction of a display to which the film is applied is not changed for a human observer.

When not yet applied to the target substrate the adhesion-promoting layer can have in particular a cloudy visual appearance and can thus be not (yet) highly transparent. The cloudy appearance can form, for example, due to differences in the refractive index of the adhesion-promoting layer and that of the surrounding air and/or due to surface roughnesses of the adhesion-promoting layer, in particular on the side of the adhesion-promoting layer facing away from the at least one electrically conductive layer. The surface roughnesses can in particular scatter incident light and hereby generate a cloudy impression. Such surface roughnesses can form in particular during the application of the adhesion-promoting layer because of the depositing methods used. For example, the surface roughnesses can be formed by a printed pattern of a gravure printing anilox roller or a screen printing tool. After application of the film to the target substrate, in contrast, the adhesion-promoting layer is highly transparent, as the adhesion-promoting layer is then in particular melted on by means of hot lamination and/or smoothed out by means of pressure in such a way that the surface roughnesses of the adhesion-promoting layer no longer appear in a disruptive manner. Depending on the refractive index of the target substrate, the difference in refractive index between the adhesion-promoting layer and the material adjoining it can also be cancelled out. The optical boundary surface between adhesion-promoting layer and target substrate is thereby no longer visible.

By transparent is meant here the property of materials to allow light from the wavelength range visible to the human eye, in particular from the wavelength range between 380 nm and 780 nm, to pass through. The term "highly transparent" therefore describes the property of materials to allow light from the wavelength range visible to the human eye, in particular from the wavelength range between 380 nm and 780 nm, to pass through with barely any attenuation and substantially unhindered. A highly transparent layer therefore has substantially no recognizable absorption of light for a human observer, with the result that the light intensity when the light passes through the layer is reduced in a barely recognizable manner for a human observer.

By cloudy is meant here the property of materials where light from the wavelength range visible to the human eye, in particular from the wavelength range between 380 nm and 780 nm, cannot pass through the materials unhindered. A cloudy layer, for example due to scattering properties, prevents light from passing through it unhindered. Light can also be absorbed and/or reflected in a cloudy layer. A cloudy layer can, for example, generate a milky visual impression for a human observer, with the result that further layers arranged under a cloudy layer are perceived, for example, blurred and/or hazy.

It is further advantageous that the adhesion-promoting layer consists of a material which is clear after application of the film to the target substrate, in particular that the adhesion-promoting layer consists of a material which deflects less than 8%, preferably less than 4%, of light in the wavelength range between 380 nm and 780 nm through scattering after application of the film to the target substrate. It can hereby be achieved, for example, that an image generated by a target substrate, such as for example a display, is substantially not influenced by the film applied to the target substrate for a human observer. Due to the low scattering of the material of the adhesion-promoting layer and thus of the adhesion-promoting layer itself it can thus be ensured that an image generated by a display is not perceived as out of focus or blurred by a human observer when the film is applied to the display. Thus, in particular in the case of high-resolution displays with pixel densities of more than 200 ppi (ppi=pixels per inch), a brilliant and true-to-the-original view of the image generated by the display can be achieved hereby through the film.

When not yet applied to the target substrate the adhesion-promoting layer can, as previously described, have in particular light-scattering properties because of surface roughnesses of the adhesion-promoting layer and thus a cloudy visual appearance. The adhesion-promoting layer becomes clear in particular when the film is applied to the target substrate and the adhesion-promoting layer is melted on and/or smoothed out for example by means of heat and/or pressure supplied by the hot lamination, with the result that the surface roughnesses of the adhesion-promoting layer no longer appear in a disruptive manner. This means that the adhesion-promoting layer becomes highly transparent and/or clear due to physical and/or chemical changes in the adhesion-promoting layer during or after the application of the film to the target substrate.

It is possible for the adhesion-promoting layer to be formed from a hot glue, a cold glue or a radiation-curing glue, in particular a glue that can be cured by means of electromagnetic radiation and/or electron radiation.

It is further possible for the adhesion-promoting layer to be designed patterned, in particular in the form of a rectangle, rounded rectangle or motif. Thus, it is possible for the pattern of the adhesion-promoting layer designed patterned to be adapted to structures of the target substrate.

It is also possible for the adhesion-promoting layer to be applied in a grid, in particular a one-dimensional or two-dimensional grid. Thus, it is possible for the adhesion-promoting layer to be applied in a dot grid or line grid. During the application of the film to the target substrate, the grid formed by the adhesion-promoting layer is smoothed, with the result that the transparency of the film is not negatively affected by the adhesion-promoting layer applied according to the grid.

After application to the target substrate the film advantageously has a transmittance for light in the wavelength range between 380 nm and 780 nm of more than 75%, preferably more than 80%, further preferably more than 85%, still further preferably more than 90%, at least in the one functional region of the at least one electrically conductive layer.

The transmittance here describes the permeability of the film for light from the wavelength range between 380 nm and 780 nm. Light incident on the film is partially reflected at the air-film boundary surface as well as at boundary surfaces between the layers of the film. The light incident on the film is further partially absorbed while traversing the film. The remaining portion of the light is transmitted through the film and exits again at the opposite side of the film. To determine the transmittance T, the quotient of the light intensity behind the film I and the light intensity in front of the film $I_0$ is found. The transmittance T is a measure of the intensity "allowed to pass through" and adopts values between 0 and 1. The transmittance is typically dependent on the wavelength of the incident light. The wavelength range is therefore indicated as well as the transmittance values.

As previously described, the adhesion-promoting layer can have a cloudy visual appearance before application of the film to a target substrate, for example because of surface roughnesses. In particular during the application process, these surface roughnesses are leveled out, with the result that the adhesion-promoting layer is highly transparent and/or clear after application to the target substrate, with the result that the cloudy visual impression of the adhesion-promoting layer disappears and the film as a whole has a transmittance for light in the wavelength range between 380 nm and 780 nm of more than 75%, preferably more than 80%, further preferably more than 85%, still further preferably more than 90%, at least in the one functional region of the at least one electrically conductive layer. As will be explained later, it is advantageous if the film is applied to a target substrate with known transmittance and then the total transmittance of the electrical functional element formed from the target substrate and the film is determined.

According to a further embodiment example of the invention, the film comprises a detachment layer, wherein the detachment layer covers the at least one contacting region at least in areas when viewed perpendicularly to a plane spanned by the carrier substrate. Thus, it is possible for the method further to comprise the following steps: e) applying a detachment layer in such a way that the detachment layer covers the at least one contacting region at least in areas when viewed perpendicularly to a plane spanned by the carrier substrate. Thus, it is possible for the detachment layer to prevent an adhesion of the at least one contacting region.

It is further advantageous that the carrier substrate and/or the at least one electrically conductive layer and/or the detachment layer and/or the protective varnish layer is/are formed transparent.

It is also possible for the detachment layer to cover the at least one contacting region over the whole surface.

It is further possible for the detachment layer to cover the region adjoining the at least one contacting region.

The detachment layer can further ensure that the film does not adhere to the target substrate in regions which have the detachment layer. The detachment layer can thus prevent the at least one contacting region from adhering to the target substrate, in particular it can prevent the at least one contacting region from adhering to the target substrate due to the hot lamination of the film to the target substrate.

The detachment layer preferably consists of waxes, polyethylene (PE), polypropylene (PP), cellulose derivatives or poly(organo)siloxanes. The above-named waxes can be natural waxes, synthetic waxes or combinations thereof. The above-named waxes are, for example, carnauba waxes. The above-named cellulose derivatives are, for example, cellulose acetate (CA), cellulose nitrate (CN), cellulose acetate butyrate (CAB) or mixtures thereof. The above-named poly(organo)siloxanes are, for example, silicone binders, polysiloxane binders or mixtures thereof.

Less preferably, the detachment layer contains natural resins, preferably colophony, phenol resins, halogenated homopolymers, for example polyvinyl chloride (PVC), polyvinyl fluoride (PVF), polytetrafluoroethane (PTFE), polyvinylidene fluoride (PVDF) or polyvinylidene chloride (PVDC), polyesters, for example polybutylene terephthalate (PBT), polycyclohexylene dimethylene terephthalate (PCT), polyethylene terephthalate (PET), polytrimethylene terephthalate (PTT), polyethylene naphthalate (PEN), polycarbonate (PC), polyester carbonate (PEC), polyacrylates (PAC) or unsaturated polyester resin (UP), polymeric carboxylic esters, for example polymethyl (meth)acrylates (PMMA), isocyanate (NCO)-crosslinked binders, for example melamine formaldehyde condensation resins (MF), melamine phenol formaldehyde resins (MPF), melamine polyesters, melamine urea formaldehyde resins (UMF), polyolefins which are not PP or PE, for example polymethylpentene (PMP), polyisobutylene (PIB) or polybutylene (PB), copolymers consisting of PVC, PMMA, PU, poly(organo)siloxanes and polyolefins which are not PP or PE.

Less preferably, the detachment layer furthermore contains radiation-curing binders.

The detachment layer preferably has a layer thickness between 0.1 µm and 10 µm, preferably between 0.1 µm and 5 µm. This small layer thickness is advantageous, so that an electrical contacting of the at least one contacting region covered by the detachment layer is possible, in particular by means of adapter elements and/or connection elements and/or contact elements, such as for example by means of contact springs, ZIF plugs (ZIF=zero insertion force), crimp contacts, CrimpFlex contacts, ACF bonding (anisotropic conductive film) or a conductive rubber multiple connection (ZEBRA). Here, the detachment layer is advantageously locally penetrated in particular by the adapter elements and/or connection elements and/or contact elements during the electrical contacting, with the result that the detachment layer locally no longer develops an action that prevents the electrical contacting, in particular that is electrically insulating. It is advantageous here if the electrically insulating detachment layer is destroyed by means of mechanical-physical forces during the contacting, in particular by the adapter elements and/or connection elements and/or contact elements, such that an electrical conductivity forms, in particular between the at least one contacting region and the adapter elements and/or connection elements and/or contact elements. For example, this is achieved by contact springs or by crimping. Further, a ZIF contacting is also mechanically "cutting", with the result that an electrical contacting of the at least one contacting region covered by the detachment layer is also made possible hereby. In the case of ACF bonding, metal pigments can pass through the detachment layer into the adhesive layer during pressing/stamping of the film, with the result that an electrical contacting is also possible by means of ACF bonding.

Further, it is also possible that an electrical contacting need not necessarily be effected by a galvanic connection between the at least one contacting region and the adapter elements and/or connection elements and/or contact elements and/or the contact layer, in particular of the target substrate. Thus, it is also possible for an electrical contact to be achieved via a capacitive coupling of two contact surfaces, such as for example between the at least one contacting region and a target contacting region, in particular a contact layer of the target substrate, with at least one insulating layer arranged in between.

According to a further embodiment example of the invention the film comprises a protective varnish layer.

The protective varnish layer advantageously covers the at least one electrically conductive layer at least in areas when viewed perpendicularly to a plane spanned by the carrier substrate. It is further advantageous that the following step is further carried out between step b) and step c):—applying a protective varnish layer in particular in such a way that the protective varnish layer covers the at least one electrically conductive layer at least in areas when viewed perpendicularly to a plane spanned by the carrier substrate. Thus, it is possible for the protective varnish layer to protect the at least one electrically conductive layer from mechanical, physical and/or chemical environmental influences.

It is also possible for the protective varnish layer to cover the at least one electrically conductive layer over the whole surface in the functional region when viewed perpendicularly to a plane spanned by the carrier substrate.

It is also possible for the film to comprise one or more protective varnish layers.

In particular protective varnish layers, which represent the outermost layer of the film or of an intermediate or end product, in particular of an electrical functional element to which the film has been applied, here protect the further layers of the film from mechanical, physical and/or chemical environmental influences or influences of further process steps.

It is advantageous that the protective varnish layer has a layer thickness between 0.1 µm and 50 µm, preferably between 0.25 µm and 25 µm, further preferably between 0.5 µm and 15 µm.

The protective varnish layer is preferably a transparent protective varnish layer, in particular made of PMMA, polyester, PU or PVC.

Less preferably, the protective varnish layer contains natural resins, preferably colophony, phenol resins, isocyanate (NCO)-crosslinked binders, for example MF, MPF, melamine polyesters, UMF, polyolefins which are not PP or PE, for example PMP, PIB or PB.

It is also advantageous that the protective varnish layer is arranged between the at least one electrically conductive layer and the adhesion-promoting layer. It is also possible for the protective varnish layer to be applied in such a way that the protective varnish layer is arranged between the at least one electrically conductive layer and the adhesion-promoting layer. Thus, it is possible for the protective varnish layer to be arranged on the side of the at least one electrically conductive layer facing away from the carrier substrate.

It further possible for the film to have a structure with the following sequence:
carrier substrate
at least one electrically conductive layer
protective varnish layer
adhesion-promoting layer.

It is further possible for the protective varnish layer to be arranged between the at least one electrically conductive layer and the carrier substrate. The electrically conductive layer here is embedded between the protective varnish layer and the adhesion-promoting layer and protected. The protective varnish layer and the adhesion-promoting layer here preferably consist of varnishes with similar physical properties, in particular with respect to mechanical deformability and stretchability. It is thereby possible for the embedded electrically conductive layer not to be damaged, for example not to tear, in the case of a strong deformation of the film, whereby its electrical functionality is preserved. The previously described embedding of the electrically conductive layer further also prevents a delamination of these layers.

It is also possible for the film to comprise a foundation varnish layer, in particular a foundation varnish layer that can be vaporized for metallization. The foundation varnish layer is advantageously arranged between the protective varnish layer and the at least one electrically conductive layer.

The foundation varnish layer is advantageously a layer made of polymers and/or copolymers, in particular comprising polymethyl (meth)acrylate (PMMA), polyester, polyurethane (PU) or polyvinyl chloride (PVC).

Less preferably, the foundation varnish layer contains natural resins, preferably colophony, phenol resins, isocyanate (NCO)-crosslinked binders, for example melamine formaldehyde condensation resins (MF), melamine phenol formaldehyde resins (MPF), melamine polyesters, melamine urea formaldehyde resins (UMF), poly(organo)siloxanes or radiation-curing binders.

The foundation varnish layer preferably has a layer thickness between 0.1 µm and 5 µm, preferably between 0.1 µm and 2 µm.

It further possible for the film to have a structure with the following sequence:
carrier substrate
protective varnish layer
foundation varnish layer
at least one electrically conductive layer
adhesion-promoting layer.

It is further advantageous if the film is a transfer film.

A transfer film advantageously has a carrier ply, in particular the carrier substrate, as well as a transfer ply that can be detached from the carrier ply, in particular the carrier substrate.

A separating layer, which makes it possible to detach the transfer ply from the carrier ply, in particular the carrier substrate, is advantageously arranged between the carrier ply, in particular the carrier substrate, and the transfer ply.

Thus, it is possible to apply only the transfer ply to a target substrate, in particular by means of hot stamping.

However, it is also possible for the carrier ply, in particular the carrier substrate, not to be detached after application to the target substrate, with the result that the carrier ply, in particular the carrier substrate, likewise remains on the target substrate.

It is further possible for the film to comprise a separating layer. It is it possible for the separating layer to be a single- or multi-layered separating layer. The separating layer is preferably arranged between the carrier substrate and the protective varnish layer. For example, it can hereby be achieved that the carrier substrate can be detached after application of the film to the target substrate. An even better deformability and/or stretchability of the applied film can hereby be achieved, as the comparatively thick and less deformable and/or stretchable carrier substrate has been removed. The protective varnish layer takes on the function of protecting the film.

The separating layer is preferably a wax layer and/or a polymer layer made of, for example, acrylates and/or melamine formaldehyde resin-crosslinked varnishes. The separating layer preferably has a layer thickness of less than 1 µm. The layer structure of the film here need not necessarily correspond to the layer structure according to claim 1.

It can advantageously be provided that, because of the separating layer arranged between the carrier substrate and the protective varnish layer, the adhesive force between the carrier substrate and the protective varnish layer is 20% to 80%, preferably 30% to 70%, smaller than the adhesive force between the protective varnish layer and the foundation varnish layer and/or the at least one electrically conductive layer and/or the adhesion-promoting layer.

Thus, it is possible, because of the separating layer arranged between the carrier substrate and the protective varnish layer, for the adhesive force between the carrier substrate and the protective varnish layer to be 20% to 80%, preferably 30% to 70%, smaller than the adhesive force between the layers of the transfer ply, in particular selected from the group protective varnish layer, foundation varnish layer, at least one electrically conductive layer, one or more decorative layers, adhesion-promoting layer, intermediate adhesive layer, dielectric layer, darkening layer and contact-strengthening layer. The adhesive forces were determined with the aid of the Zwick Z005 tensile testing machine from Zwick GmbH & Co. KG, Ulm, Germany. For this, the transfer film was bonded flat to the lower holder. The layer to be detached was then detached at right angles by the tensile test. The detachment forces were determined via the load cell.

Thus, it possible for the film to have a structure with the following sequence:
carrier substrate
separating layer
protective varnish layer
foundation varnish layer
at least one electrically conductive layer
adhesion-promoting layer.

In the embodiment variant of the film as a transfer film, as the adhesion-promoting layer does not cover the at least one contacting region, the electrical functional structure can also be contacted after application of the film to the target substrate, with the result that an electrical connection can be produced, for example, by means of the above-named types of contacting. The optional separating layer further makes it possible that the carrier substrate can be at least partially detached, whereby the subsequent possible contacting is further improved, as the film does not adhere up to the edge of the carrier substrate in this embodiment variant.

It is further possible, in particular after removal of the carrier substrate, to apply a strengthening element in order to increase the mechanical stability of the applied transfer plies.

According to a further embodiment variant, the target substrate has a contact layer, in particular for the electrical contacting of the at least one contacting region of the film.

The contact layer is preferably applied directly to the target substrate.

It is further possible for the contact layer to have at least one connection element.

Further, it is also possible for the contact layer to have at least one adapter element and/or contact element.

The target substrate thus itself preferably already has at least one connection element and/or adapter element and/or contact element, in particular for the electrical contacting of the at least one contacting region of the film.

The contact layer is advantageously arranged in at least one target contacting region of the target substrate. The at least one target contacting region of the target substrate preferably forms the counterpart of the at least one contacting region of the film. Thus, it is advantageous that the at least one target contacting region of the target substrate and the at least one contacting region of the film, preferably after application of the film to the target substrate, are congruent, in particular that the at least one target contacting region of the target substrate and the at least one contacting region of the film overlap at least in areas after application of the film.

It is further possible for the target substrate to comprise at least one third electrically conductive layer. The at least one third electrically conductive layer preferably has a plurality of conducting paths. Thus, it is possible for the at least one third electrically conductive layer to have electrically conductive structures, in particular conducting paths, which are preferably arranged in a grid. This grid can be regular or irregular. The grid can be constructed in particular from grid elements, such as lines and/or surface elements.

Further, it is also possible for the at least one third electrically conductive layer to have further electrical components.

The at least one third electrically conductive layer of the target substrate is advantageously electrically connected to the at least one contact layer.

Thus, it is possible, for example, for the target substrate to be equipped with conducting paths and/or further electrical components. These conducting paths can then advantageously be electrically connected to further electrical components in a known manner by means of plug contacts or other known contacting methods. This can preferably be effected by means of laser direct structuring (LDS) or also by means of printed contacts, in particular contacts printed by means of screen printing, or also by means of a contact layer, which is applied, for example, by means of lamination and/or hot stamping or cold stamping. Thus, it is possible, for example, for the target substrate to be a type of printed circuit board.

Thus, it is possible to connect the at least one third electrically conductive layer of the target substrate to the functional region of the electrically conductive layer of the film electrically over the contacting region of the film by means of the contact layer. The contact layer on the target substrate thus forms the counter contact for the contacting region of the film.

It is further advantageous if the contact layer, in particular the at least one connection element and/or adapter element and/or contact element, and/or the at least one third electrically conductive layer is/are produced and/or applied by means of laser direct structuring (LDS) and/or by means of printing, in particular by means of screen printing.

Further, it is also possible for the contact layer, in particular the at least one connection element and/or adapter element and/or contact element, to be applied by means of lamination and/or hot stamping or cold stamping.

It is further possible for the contact layer, in particular the at least one connection element and/or adapter element and/or contact element, on the target substrate to be formed from an electrically conductive paste, in particular carbon paste, which comprises silver (Ag), gold (Au), aluminum (Al), copper (Cu), chromium (Cr) and/or other conductive metals. It is further possible for the electrically conductive paste, in particular carbon paste, to comprise binders, in particular comprising colophony and/or phenol resins, polymers and copolymers. Binders of the electrically conductive paste, in particular carbon paste, are natural resins, preferably colophony, phenol resins, polymers and copolymers consisting of PVC, PMMA, PU, polyester, isocyanate (NCO)-crosslinked binders, for example MF, MPF, melamine polyesters, UMF. Binders of the electrically conductive paste comprising poly(organo)siloxanes and copolymers and/or radiation-curing binders thereof are less preferred.

It is further possible for the film to be printed with an adhesive varnish in the at least one contacting region, completely or partially patterned, for example in a grid. Thus, it is possible for the film to have an adhesive varnish in the at least one contacting region.

Alternatively, it is also possible for the film not to have the adhesive varnish in the at least one contacting region or for the adhesive varnish to be locally completely omitted in the region of the contacts.

During the application of the film to the target substrate provided with the contact layer, an electrical (press) contact thus preferably forms (by heat and pressure) between film and target substrate, in particular in the at least one contacting region and/or target contacting region. It is possible here for the electrical (press) contact to have a durable action due to the bonding, in particular due to the adhesive varnish.

It is further possible for an ACF bonding tape to be introduced between the at least one contacting region of the film and the at least one target contacting region of the target substrate. The electrical connection in the contacting region can hereby be further improved. It is advantageous here if the application process (heat and pressure) also corresponds to the usual ACF bonding process as far as possible.

It is further advantageous if the contact layer of the target substrate is designed in such a way that two or more films can be applied to the target substrate. Thus, it is possible for the contact layer of the target substrate to have connection elements and/or adapter elements and/or contact elements for the electrical contacting of at least two films.

Thus, it is also possible for the target substrate to have the contact layer for contacting a first film in a first target contacting region and the contact layer for contacting a second film in a second target contacting region.

The target substrate to which at least two films are to be applied advantageously already has a contact layer which is designed in such a way that a two-ply sensor consisting of a film for the x-ply and a film for the y-ply can be applied.

Thus, it is also possible for electrical contacts and contact supply lines for a two-ply sensor consisting of an x-ply and a y-ply already to be located, as described above, on the target substrate to which the at least two films are to be applied. The x-ply and the y-ply in each case are preferably formed from a film according to the invention. The first sensor ply, for example the x-ply, is preferably first applied to the target substrate by means of the film according to the invention and the electrical contact is produced. The first sensor ply is advantageously applied to the target substrate register-accurate relative to the contact layer, in particular the at least one connection element and/or adapter element and/or contact element, of the target substrate for the electrical contacting, in particular of the first sensor ply.

Thus, it is possible in a first step for a first film to be applied to the target substrate in such a way that the at least one contacting region of the first film overlaps, at least in areas, with the target contacting region of the contact layer for the contacting of the first film.

Then, in a separate step, the application of the second sensor ply, for example the y-ply, to the target substrate is preferably effected by means of the film according to the invention register-accurate relative to the first sensor ply or register-accurate relative to the contact layer, in particular the at least one connection element and/or adapter element and/or contact element, of the target substrate for the electrical contacting, in particular of the second sensor ply. It is possible here that a bonding, for example by means of OCA, between the sensor plies can be dispensed with. The register accuracy, i.e. the positional accuracy, of the second sensor ply relative to the first sensor ply is preferably ±350 µm, further preferably ±150 µm, in the x- and y-directions, in order to achieve the desired functionality of the sensor.

Thus, it is possible in a second step for a second film to be applied to the target substrate in such a way that the at least one contacting region of the second film overlaps, at least in areas, with the target contacting region of the contact layer for the contacting of the second film.

In the following, among other things, preferred embodiments of the at least one contacting region and/or the at least one contacting structure are described.

The at least one contacting structure for contacting the electrical functional structure is preferably an electrical connection, in particular a plug.

The at least one electrically conductive layer advantageously has a contact-strengthening layer.

It is further advantageous that the at least one electrically conductive layer has the contact-strengthening layer in the at least one contacting region at least in areas, wherein the contact-strengthening layer protects the at least one contacting region from mechanical, physical and/or chemical environmental influences.

Thus, it is possible for the following step to be carried out between step b) and step c):—applying a contact-strengthening layer (7) in such a way that the at least one electrically conductive layer (3) has a contact-strengthening layer (7), in particular that the at least one electrically conductive layer (3) has the contact-strengthening layer (7) at least in areas in the at least one contacting region (20).

The contact-strengthening layer improves the stability/durability of the at least one contacting region, as the contacting region is protected, for example, from corrosion or scratching by the contact-strengthening layer. Furthermore, the mechanical stability of the contacting region, in particular the bending stability and/or kinking stability, can also be improved.

It is further possible for the contact-strengthening layer to cover the at least one contacting region over the whole surface.

It is also possible for the at least one contacting region to have one or more contacting regions separated from each other. By separated is meant here that the contacting regions are spaced apart from each other, in particular that the contacting regions have a distance from each other of at least 0.1 mm, preferably at least 0.2 mm, further preferably at least 0.5 mm.

It is further advantageous that the contact-strengthening layer has a layer thickness between 0.1 µm and 100 µm, preferably between 0.25 µm and 25 µm, further preferably between 0.5 µm and 10 µm.

It is possible for the contact-strengthening layer to be formed from an electrically conductive paste, in particular carbon paste, which comprises silver (Ag), gold (Au), aluminum (Al), copper (Cu), chromium (Cr) and/or other conductive metals. It is further possible for the electrically conductive paste, in particular carbon paste, to comprise binders, in particular comprising colophony and/or phenol resins, polymers and copolymers.

Binders of the electrically conductive paste, in particular carbon paste, are natural resins, preferably colophony, phenol resins, polymers and copolymers consisting of PVC, PMMA, PU, polyester, isocyanate (NCO)-crosslinked binders, for example MF, MPF, melamine polyesters, UMF. Binders of the electrically conductive paste comprising poly(organo)siloxanes and copolymers thereof and/or radiation-curing binders are less preferred.

It is advantageous that the adhesion-promoting layer, the protective varnish layer, the detachment layer and/or the contact-strengthening layer is/are applied by means of gravure printing, screen printing, relief printing or casting techniques.

In the following, among other things, preferred embodiments of the at least one electrically conductive layer and/or the electrical functional structure are described:

According to a further embodiment example of the invention, the electrical functional structure forms a touch sensor panel, in particular a capacitive sensor panel, which provides a touchpad functionality. It is also possible for the electrical functional structure to form a resistive or inductive sensor panel.

By touch sensor panel is meant here a touch-sensitive sensor which makes it possible to control an electrical functional element, for example a PDA. By a touch sensor panel is likewise meant a multi-touch sensor panel which can process several simultaneous touches, for example to enlarge and rotate images which are displayed on a display arranged in particular under the touch sensor panel.

In a preferred embodiment, it is provided that the film comprises at least two electrically conductive layers, in particular a first electrically conductive layer and a second electrically conductive layer.

The at least two electrically conductive layers are advantageously arranged overlapping at least in areas when viewed perpendicularly to a plane spanned by the carrier substrate.

It is hereby possible to produce in particular multi-ply touch sensors which can also process several simultaneous touches, for example to enlarge and rotate images. For example, the second electrically conductive layer can be provided on a second carrier film, which is applied, in particular bonded, to the first conductive layer in particular by means of the adhesion-promoting layer and/or an intermediate adhesive layer and/or with the aid of primer layers and/or adhesive layers. These primer layers and/or adhesive layers can be formed from a hot glue, a cold glue or a radiation-curing glue, in particular a glue that can be cured by means of electromagnetic radiation and/or electron radiation.

During the application of the second electrical layer to the first electrically conductive layer, it is expedient if the relative positioning of the two electrically conductive layers is effected register-accurate relative to each other, in particular with a tolerance of less than 0.25 mm, preferably with a tolerance of less than 0.1 mm, in order to provide an uninterrupted touch functionality. Thus, it is possible for the at least two electrically conductive layers to be arranged register-accurate relative to each other, in particular for the at least two electrically conductive layers to be arranged relative to each other with a tolerance of less than 0.25 mm, preferably less than 0.1 mm. The electrically conductive layers here have, in particular, electrically conductive structures, in particular conducting paths, which are preferably arranged in a grid. This grid can be regular or irregular. The grid can be constructed in particular from grid elements, such as lines and/or surface elements. The grid elements can form so-called sensor cells here.

According to a further embodiment example of the invention, the at least one electrically conductive layer and/or the two electrically conductive layers has/have a plurality of conducting paths.

By conducting paths is meant here preferably structured electrically conductive layers and conductive regions of the at least one electrically conductive layer and/or the two electrically conductive layers. The conducting paths are in particular applied in such a way that sufficient transparency for the human eye is preserved, i.e. the conducting paths are designed in such a way that they are not perceived by a human observer, as the conducting paths lie below the resolving power of the human eye. Despite the narrow conducting paths used, sufficient electrical conductivity is achieved, which is comparable in particular to layers made of indium tin oxide (ITO). The coverage of the carrier substrate with the at least one electrically conductive layer, in particular the conducting paths, is preferably less than 30%, preferably less than 20%, further preferably less than 10%, still further preferably less than 5%.

The conducting paths are advantageously spaced apart from each other, in particular the conducting paths have a width between 0.2 μm and 20 μm, preferably between 4 μm and 15 μm, and a distance from each other greater than 10 μm, preferably greater than 20 μm, with the result that the conducting paths lie below the resolving power of the human eye.

It is advantageous if the conducting paths of the first electrically conductive layer and the second electrically conductive layer are in each case arranged according to a line grid, wherein in particular the line grids are rotated relative to each other through 90°. Thus, the first and second electrically conductive layers in each case have a line grid made of conducting paths spaced apart from each other. The first and second electrically conductive layers are preferably arranged one above the other in such a way that the two line grids are arranged at a right angle, thus rotated 90° relative to each other. In the edge regions of the two line grids, electrical supply lines and/or contacting elements are preferably provided. These edge regions are preferably arranged register-accurate relative to each other, in particular in the direction of the coordinate axes x and y, with a tolerance of less than 0.25 mm, preferably less than 0.1 mm, wherein the coordinate axes x and y span a plane which lies parallel to a plane spanned by the carrier substrate.

In a further preferred embodiment, the conducting paths of the first electrically conductive layer and of the second electrically conductive layer are structured, in particular structured in such a way that the conducting paths of the first electrically conductive layer and of the second electrically conductive layer form a plurality of surface elements, preferably of rhombus-shaped or diamond-shaped surface elements. Thus, it is possible, for example, for the first and second electrically conductive layers in each case to have a so-called diamond structure. This diamond structure is formed by a plurality of in particular rhombus-shaped surface elements along linear conducting paths. The first and second electrically conductive layers here in each case have a plurality of diamond structures spaced apart from each other. The first and second electrically conductive layers are arranged one above the other in such a way that the two diamond structures are arranged at a right angle to each other, thus rotated 90° relative to each other. The surface elements of the first electrically conductive layer here are arranged "in a gap" in the free intermediate spaces between the surface elements of the second electrically conductive layer. The linear conducting paths of the electrically conductive layers here intersect in the intermediate spaces between the surface elements. In this preferred embodiment variant, a precise position of the surface elements relative to each other is particularly important and the surface elements are advantageously arranged register-accurate relative to each other, in particular in the direction of the x- and y-coordinates, with a tolerance of less than 0.25 mm, preferably less than 0.1 mm.

It is possible here for the conducting paths to be molded in the region of the surface elements according to the shape of the surface elements, with the result that the material from which the electrically conductive layer is formed fills in the surface elements over the whole surface. It is further possible for the conducting paths to run along the surface elements, with the result that the conducting paths frame the surface elements at least in areas. Thus, the surface elements can be formed from a conductive layer over the whole surface or also from an electrically conductive layer, in particular in a grid, present only in areas, made of conductive grid elements and in particular transparent non-conductive surface regions between the grid elements. The grid forming the grid elements can be regular or irregular. In particular, the surface elements can be semi-transparent because of the gridding, and have a surface coverage with grid elements of less than 50%.

Further, it is also possible for the electrically conductive structures of the first and second conductive layers formed by the structured electrically conductive layers and/or the conductive regions of the electrically conductive layers in each case also to have different geometries and/or sizes.

The contacting regions, in particular the contacting structures, of the at least two electrically conductive layers are advantageously brought together in a common contacting region. It is hereby possible to make contacting from the outside easier.

It is further possible for the common contacting region to be contacted electrically by means of an adapter element. Thus, it is possible, for example, for an in particular flexible adapter element, which electrically contacts the contact points in the common contacting region and connects externally electrically conductively to a further contact element, to be secured on the common contacting region. The contacting between the common contacting region and the adapter element is preferably effected by means of conductive adhesive, in particular by means of ACF bonding (ACF=anisotropic conductive film). It is possible here for the conductive adhesive to represent a connection element. The further contact element can be, for example, an in particular standardized plug connector, for example a ZIF connector (ZIF=zero insertion force).

It is advantageous that the conducting paths are formed from metal, in particular from silver (Ag), gold (Au), aluminum (Al), copper (Cu) or chromium (Cr) in a layer thickness between 1 nm and 100 nm, preferably between 2.5 nm and 75 nm, further preferably between 5 nm and 50 nm. However, it is also possible for the conducting paths to have a layer thickness between 100 nm and 5 µm.

It is also possible for the conducting paths to be formed from an electrically conductive paste comprising silver (Ag), gold (Au), copper (Cu) and/or carbon.

It is further or also additionally possible for the at least one electrically conductive layer to have at least one layer made of ITO ($InSnO_x$=indium tin oxide=$In_2O_3$:$SnO_2$) and/or made of AZO ($AlZnO_x$=aluminum zinc oxide=Al:ZnO). The ITO and/or AZO layers here are preferably applied over the whole surface by means of magnetron sputtering, sputtering or (vacuum) vapor deposition and less preferably by means of CVD and PVD methods and preferably have a layer thickness of from 1 nm to 100 µm, further preferably from 10 nm to 10 µm.

The ITO and/or AZO layers are preferably arranged directly neighboring electrically conductive layers made of metallic substances.

In step b) the at least one electrically conductive layer is advantageously a metal layer and step b) further comprises the following steps:—vapor-depositing the metal layer;—structuring the metal layer by removal of the metal layer in areas, in particular by means of photolithographic techniques. Thus, to form the at least one electrically conductive layer, the carrier substrate is preferably provided with an electrically conductive layer over the whole surface, for example by vapor deposition or sputtering of a metal layer and then, by positive or negative etching or by means of a washing method, the electrically conductive layer is removed again in areas corresponding to the formation of the electrical functional structure and contacting structure. Further, it is also possible for the at least one electrically conductive layer to be applied to the carrier substrate already in the shaping according to the functional structure and/or contacting structure by means of vapor-deposition masks, by printing of electrically conductive material and/or by galvanic boosting of a printed structure.

The film preferably comprises a dielectric layer and/or a semi-conducting layer, which is arranged between a first electrically conductive layer of the at least one electrically conductive layer and a second electrically conductive layer of the at least one electrically conductive layer.

It is further possible for the at least one electrically conductive layer to have force sensors, in particular for measuring pressure. It is hereby possible that, in addition to the x- and y-coordinates of the position of the touch generated for example by a touch sensor panel, in particular by a capacitive sensor panel, on the plane defined by the x- and y-coordinates, the intensity of the touch can further be determined in the form of the z-coordinate (z-coordinate is perpendicular to x- and y-coordinates). x-, y- and z-information of the touch can hereby be generated. The z-information can be used, for example, to control an electrical functional element to which the film is applied depending on whether a predefined threshold value of the z-information is exceeded. Force sensors, in particular for measuring pressure, are preferably piezoelectric thin films. It is also possible for force sensors to be piezoresistive pressure sensors and/or piezoelectric pressure sensors. It is further possible for force sensors to be actuators, in particular buttons, wherein each of the actuators has at least two electrical states depending on the force acting on the actuators.

It is further possible for the at least one electrically conductive layer to have surface relief structures, in particular matte structures, at least in areas. It is hereby possible to deflect light incident on the at least one electrically conductive layer by diffraction, scattering and/or reflection, with the result that the impression that the electrically conductive layer reflects light, in particular in a direct mirror reflection, is avoided. Thus, for example, a display to which the film is applied appears homogeneously black in the switched-off state.

It is also possible for one or more optically active layers, in particular darkening layers and/or layers with light-scattering properties, to cover the at least one electrically conductive layer at least in areas when viewed perpendicularly to a plane spanned by the carrier substrate. A possible visibility of the at least one electrically conductive layer, in particular in a direct mirror reflection, can hereby be further reduced. Thus, for example, a darkening layer absorbs incident light, whereby the proportion of the light reflected by the at least one electrically conductive layer is reduced or the reflection is avoided entirely. The proportion of the light reflected by the at least one electrically conductive layer is likewise reduced by layers with light-scattering properties. Layers with light-scattering properties are, for example, layers which have matte structures with stochastically chosen relief parameters.

It is further advantageous that the carrier substrate has a layer thickness between 2 µm and 250 µm, preferably between 23 µm and 125 µm. However, it is also possible for the carrier substrate to have a layer thickness of less than 2 µm.

In total, the film advantageously has a thickness perpendicular to the plane spanned by the underside of the carrier substrate of at most 150 µm, preferably 100 µm, further preferably 75 µm.

The carrier substrate is preferably a transparent carrier substrate, in particular made of PET, PMMA, PC, acrylonitrile butadiene styrene (ABS), PU or glass.

It is possible for the carrier substrate to be formed from a hybrid material which comprises plastic layers and layers made of fiber material.

It is also possible for the carrier substrate to consist of fabrics, for example textile fabrics.

It is further possible for the target substrate to be a single- or multi-layered further film. Here, an intermediate product for further processing is preferably produced by the application of the film according to the invention to the target substrate in the form of the single- or multi-layered further film.

According to a further embodiment example of the invention, the film comprises at least one intermediate adhesive layer. It is hereby possible for one or more further layers to be applied to the film, wherein the adhesion of the one or more further layers is achieved by the intermediate adhesive layer.

The at least one electrically conductive layer is preferably arranged between the carrier substrate and the at least one intermediate adhesive layer.

It is further possible for the at least one intermediate adhesive layer to be arranged on the side of the carrier substrate facing away from the at least one electrically conductive layer. Thus, it is possible for the method further to comprise the following steps: f) applying an intermediate adhesive layer, in particular in such a way that the at least one electrically conductive layer is arranged between the carrier substrate and the at least one intermediate adhesive layer and/or that the at least one intermediate adhesive layer does not cover the at least one contacting region at least in areas when viewed perpendicularly to a plane spanned by the carrier substrate.

It is also advantageous if the at least one intermediate adhesive layer does not cover the at least one contacting region at least in areas when viewed perpendicularly to a plane spanned by the carrier substrate. Because the intermediate adhesive layer does not cover the at least one contacting region at least in areas, it is ensured that the electrical functional structure can be reliably and robustly contacted after application of the film to the target substrate.

It is also expedient if the intermediate adhesive layer does not cover the at least one contacting region over the whole surface.

It is further advantageous if the intermediate adhesive layer covers the functional region at least in areas.

It is also possible for the at least one intermediate adhesive layer to be arranged substantially in the same region as the adhesion-promoting layer when viewed perpendicularly to a plane spanned by the carrier substrate, in particular for the at least one intermediate adhesive layer to be arranged substantially congruent with the adhesion-promoting layer when viewed perpendicularly to a plane spanned by the carrier substrate.

The intermediate adhesive layer advantageously has a layer thickness between 0.1 µm and 50 µm, preferably between 0.25 µm and 25 µm, further preferably between 0.5 µm and 7 µm. The intermediate adhesive layer is preferably a primer layers and/or adhesive layer made of a hot glue, a cold glue or a radiation-curing glue, in particular a glue that can be cured by means of electromagnetic radiation and/or electron radiation. The intermediate adhesive layer is preferably applied by means of gravure printing, screen printing, relief printing or casting techniques.

It is also possible for the film to comprise one or more decorative layers.

The one or more decorative layers are preferably arranged on the side of the carrier substrate facing away from the at least one electrical conductive layer. For this, the film can in particular have an intermediate adhesive layer in order to improve the adhesion of the one or more decorative layers. Thus, for example, an intermediate adhesive layer, by means of which the one or more decorative layers are applied to the carrier substrate, can be applied to the carrier substrate and/or the at least one electrically conductive layer. The decorative layers can then be applied to the intermediate adhesive layer or directly to the carrier substrate by means of various methods. It is particularly advantageous if the decorative layers on the side of the carrier substrate facing away from the at least one electrical conductive layer have, as the final layer, a protective layer which protects the decorative layers in particular from the strong pressure and heat effects acting for example during injection-molding and/or laminating processes. Furthermore, the protective layer protects against mechanical damage which can occur during the processing process, such as e.g. scratches etc. This protective layer can also contain polymeric and in particular self-supporting films, preferably made of PET, PC or PMMA, or also made of glass or fabric, which remain on the decoration and form a constituent of the intermediate or end product.

The one or more decorative layers are advantageously arranged substantially in the same region as the adhesion-promoting layer and/or the intermediate adhesive layer, in particular the one or more decorative layers are arranged substantially congruent with the adhesion-promoting layer and/or the intermediate adhesive layer when viewed perpendicularly to a plane spanned by the carrier substrate.

Thus, it is possible for the one or more decorative layers to be partially applied to the side of the carrier substrate facing away from the at least one electrical conductive layer in such a way that they cover substantially the same surface area as the adhesion-promoter layer on the other side of the carrier substrate. It is thus achieved that the contacting region uncovered by the adhesion-promoter layer on the side of the carrier substrate facing away from the at least one electrical conductive layer remains free in the same (projected) surface region and the film can thereby form a so-called tail with the contacting region, which can be contacted electrically for example by means of a plug connection in a particularly simple manner in the subsequent processing steps.

It is also possible for the one or more decorative layers to be arranged on the side of the adhesion-promoting layer and/or of the intermediate adhesive layer facing away from the carrier substrate.

Further, it is also possible for the one or more decorative layers to be arranged on the side of the at least one electrically conductive layer facing away from the carrier substrate.

The one or more decorative layers here are preferably applied substantially congruent with the adhesion-promoting layer and in particular likewise leave the at least one contacting region uncovered. Here too, it can be advantageous if the decorative layers on the side of the at least one electrically conductive layer and/or of the intermediate adhesive layer facing away from the carrier substrate have, as the final layer, a protective layer which protects the decorative layers in particular from the strong pressure and heat effects acting for example during injection-molding and/or laminating processes. Furthermore, the protective layer protects against mechanical damage which can occur during the processing process, such as e.g. against scratches etc. This protective layer can also contain polymeric and in particular self-supporting films, preferably made of PET, PC or PMMA, or also made of glass or fabric, which remain on the decoration and form a constituent of the end product.

The at least one intermediate adhesive layer is advantageously arranged between the carrier substrate and the one or more decorative layers.

The one or more decorative layers preferably comprise at least one of the layers selected from the group protective layers, colored varnish layers, metal layers, reflective layers, replication varnish layers, transparent layers, carrier layers and/or layers generating an optically variable effect.

Thus, the one or more decorative layers can have, for example, a printed layer, in particular made of an opaque and/or colored ink, which forms a frame around the functional region. The decorative layers can also cover the film and in particular also the functional region over the whole surface or partially and/or be applied in a grid. The decorative layers can represent a uniform surface and/or an endless pattern and/or a single image motif. The decorative layers can be opaque and/or semi-transparent and/or transparent, in particular transparently dyed, over the whole surface or partially.

Thus, it is possible, for example, for the one or more decorative layers to be applied to, in particular stamped and/or printed on, the adhesion-promoting layer and/or to the intermediate adhesive layer. The one or more decorative layers can be applied to the side of the adhesion-promoting layer and/or of the intermediate adhesive layer facing away from the carrier substrate, for example, by means of hot stamping and/or by means of cold stamping and/or by means of thermotransfer methods and/or by means of different laminating methods and/or other known methods. It is hereby possible, for example, to provide the film with a decorative layer or a decoration, with the result that the film additionally has a decoration in addition to a function provided by the electrical functional structure in the form of a touch sensor panel. The one or more decorative layers can comprise further layers, such as for example protective varnish layers and/or colored layers and/or metal layers and/or transparent reflective layers and/or replication varnish layers and/or various types of layer structures generating an optically variable effect. The layer structure of the film here need not necessarily correspond to the layer structure according to claim 1.

It is further possible for the one or more decorative layers to comprise at least two decorative layers, in particular to comprise a first decorative layer and a second decorative layer.

It is equally possible for the one or more decorative layers to be arranged on the side of the carrier substrate facing away from the at least one electrical conductive layer and also on the side of the at least one electrically conductive layer facing away from the carrier substrate. Thus, it is possible, for example, for a first decorative layer to be arranged on a first side of the carrier substrate and for a second decorative layer to be arranged on a side of the carrier substrate opposite the first side, with the result that the one or more decorative layers are arranged on either side of the carrier substrate.

It is further advantageous if at least two decorative layers act with each other here in such a way that particular optical effects, for example optical depth effects and/or particular optical superimposition effects, are generated. For example, the first decorative layer facing the observer can represent a color filter layer for the second decorative layer facing away from the observer, thus lying underneath it in the viewing direction, which is a colored layer, for example. Superimposition effects or combination effects by means of two patterns which supplement each other to form a Moiré pattern or also result in other supplementing combination patterns when superimposed are equally possible.

Optically variable combination effects which first form due to the superimposition of the at least two decorative layers are further possible. It can be advantageous here that the decorative layers are spaced apart from each other, for example because, in particular, the carrier substrate and the electrically conductive layer and optionally still further layers, in particular transparent layers, are arranged between the decorative layers. Such a distance can be advantageous in particular for the generation of depth effects and/or optically variable effects. A depth effect can be generated, for example, by inserting optically transparent layers in front of the decorative layers and/or behind the decorative layers in the direction of view and/or as a constituent of the decorative layers. The optically transparent layers preferably have the same layer thickness as the respective decorative layers or a layer thickness thicker than the respective decorative layers by a multiple, in particular the layer thickness of the optically transparent layers is between 0.5 µm and 500 µm, preferably between 10 µm and 100 µm. The optically transparent layers preferably consist of optically transparent varnishes and/or optically transparent films preferably made of PET, PMMA or PC.

An optically variable effect is possible, for example, by arranging the above-named optically transparent layer as a spacer layer between a reflective layer and a semi-transparent reflective layer and by interference effects resulting within this layer structure, which are recognizable by a color change effect dependent on the viewing angle and/or dependent on the illumination angle. Such interference layer structures are already known as Fabry-Perot thin film structures.

It further advantageous if at least one of the one or more decorative layers has a surface relief structure, in particular a haptically and/or tactilely detectable surface relief structure, at least in areas.

Thus, it is also possible for surface morphologies, in particular surface relief structures, which in particular make haptic or tactilely perceptible effects possible, to be produced by the structuring of the optically transparent layers and/or of the protective layers and/or of the one or more decorative layers. Further, it also possible for the surface relief structures to generate diffractive and/or refractive optical effects. These surface relief structures can be produced by additional partially printed varnishes or mechanical structuring or optical structuring of the layer surface. A mechanical structuring can be a replication with a correspondingly molded stamping tool. An optical structuring can be a laser ablation. Furthermore, photolithographic methods can also be used to produce these structures. The structure depths for such haptic effects are in particular 1 μm to 2000 μm, preferably 50 μm to 2000 μm. The structure depths for diffractive or refractive effects are in particular 0.1 μm to 20 μm, preferably 0.1 μm to 5 μm.

It is equally possible to merely simulate such haptic surface relief structures, because real haptic structures are often mechanically sensitive, in particular to scratching and/or wear, and also become dirty more easily than a smooth surface. For this reason, it makes sense, as described above, to introduce the haptic structures into a corresponding surface and/or to apply them thereto. A transparent cover ply, which seals the haptic structure and has an outwardly smooth surface, can then be applied to this surface. This cover ply is preferably highly transparent and thicker than the height of the haptic structures, preferably at least twice as thick. Furthermore, the cover ply preferably has a refractive index that deviates by at least 0.2 from that of the layer underneath it having the haptic structure, in order thereby to create an optical boundary surface, whereby the visibility of the haptic structure is increased. For this, the cover ply can contain nanoscale particles for modulating the refractive index consisting of one or more constituents selected from $TiO_2$, $SiO_2$, and Sn or metal chalcogenides (oxides, sulfides), as well as metals Au, Ag, Cu.

The tactilely perceptible and/or the merely optically simulated haptic surface relief structure here can correspond to the functional touch sensor panels, i.e. highlight or mark their functional region, with the result that a "blind" feeling of the touch function is made possible. However, it is equally possible for the tactilely perceptible and/or the merely optically simulated haptic structure to be provided over the whole surface, in order to achieve a particular surface characteristic of the target substrate, in particular matching its other visual appearance. The two possibilities can also be present combined. Thus, it is possible, for example, to combine a wood decoration with a haptic wood texture, which is modified in the region of the touch function, in particular in the functional region, in terms of the structure depth and/or another structure parameter, with the result that the touch sensor panel can be felt by a user within the texture.

It is also possible for the film to have a structure with the following sequence:
  carrier substrate
  separating layer
  protective varnish layer
  foundation varnish layer
  at least one electrical conductive layer
  intermediate adhesive layer
  one or more decorative layers
  adhesion-promoting layer.

It is also possible for the film on the side of the carrier substrate facing away from the at least one electrical conductive layer to have an adhesive layer.

The film can thus have the adhesion-promoting layer on one side of the carrier substrate and the adhesive layer on the other side of the carrier substrate, with the result that the film can be applied to a further substrate by means of the adhesive layer. The application of the film to the further substrate can be effected, for example, by means of hot lamination or by means of back injection molding. In particular in the case of a back injection molding of the film, the at least one electrically conductive layer and/or the one or more decorative layers is/are protected by the carrier substrate from the injected injection-molding material and in particular from the harsh process conditions with high pressure and high temperature during the injection-molding process. The layer structure of the film here need not necessarily correspond to the layer structure according to claim 1.

It is further advantageous if the film has at least one register mark for determining the relative location or position of the film, in particular of the functional region and/or of the at least one contacting region of the at least one electrically conductive layer. By register or register-accuracy is meant the positionally accurate arrangement of layers lying one above the other or next to each other relative to each other, while keeping to a desired positional tolerance. Thus, a register mark can ensure that the film can be applied to a target substrate positionally accurately, while keeping to a desired positional tolerance. The register mark is preferably molded from a printing substance and/or from a magnetic or conductive material. Thus, for example, the marks can be optically readable register marks which differ from the background by their color value, their opacity or their reflection properties. However, the register marks can also be register marks that can be detected by means of a magnetic sensor or a sensor detecting the electrical conductivity. The register marks are detected, for example, by means of an optical sensor, in particular a camera, a magnetic sensor or a mechanical sensor, a capacitive sensor, or a sensor detecting the conductivity and the application of the film can then be controlled by means of the register marks. The positionally accurate arrangement of the film on the target substrate is thus made possible by the register marks. An identical production quality of, for example, touchscreens can hereby be improved and at the same time the waste due to incorrect placement of the film on the target substrate can be further reduced.

The film is preferably a hot-laminating film.

In the following, among other things, preferred embodiments of the method for producing an electrical functional element as well as the electrical functional element are described:

It is further advantageous that in step b) the film is applied to the target substrate from a roll by means of hot lamination, in particular at a film web speed between 1.5 m/min and 3.5 m/min. It is possible here for the roll beneficially to comprise a film web with several or a plurality of films, in particular according to one of claims 1 to 53. It hereby becomes possible to further improve in particular an industrial mass production. Thus, it is possible, for example, to apply the film to a target substrate over the whole surface by means of a hot-laminator, with the result that the outlay in terms of time, personnel and logistics are further reduced and at the same time an identical production quality can be ensured.

It is further advantageous that in step b) the film is applied to the target substrate from a sheet by means of hot lamination. It is possible here for the sheet beneficially to comprise several or a plurality of films, in particular according to one of claims 1 to 53. It hereby becomes possible to further improve in particular an industrial mass production. Thus, it is possible, for example, to apply the film to a target substrate over the whole surface by means of a hot-laminator, with the result that the outlay in terms of time, personnel and logistics can be further reduced and at the same time an identical production quality can be ensured.

It is also possible for the sheet beneficially to comprise only one film, in particular according to one of claims 1 to 53. Several such sheets with one film each can be present here as a stack in particular in a magazine and be fed correspondingly individually to a hot-laminating machine, which can function for example in a lifting or unwinding process, and/or to an injection-molding machine for application to the target substrate. The position-accurate application to the target substrate is then effected, as previously described, via the register marks on the film.

It is further advantageous if one or more separated films, in particular according to one of claims 1 to 53, are arranged detachably before the application to the target substrate on an intermediate substrate which can be present as a roll or as a sheet. The intermediate substrate here can be, for example, a silicone-coated paper or a film web provided with a detachment layer. In a subsequent hot-transfer step and/or in a subsequent injection-molding process, one or more films can then be transferred from the intermediate substrate to the target substrate together or in each case separately by means of acting heat and/or pressure. The intermediate substrate can then be peeled off in particular from the film securely adhering to the target substrate.

It is further possible for the hot lamination to be effected at a temperature in the range between 80° C. and 300° C., preferably between 200° C. and 290° C., further preferably between 240° C. and 270° C., and/or to be effected with a stamping pressure in the range between 200 bar and 2000 bar, preferably between 500 bar and 1500 bar.

It is also possible, as an alternative to the hot lamination in step b), for the film to be applied to the target substrate by injection of an injection-molding material, wherein in particular the injection-molding material forms the target substrate. Thus, it is possible for the film to be securely joined to the injection-molding material by the adhesion-promoting layer.

It is also possible for the film to be joined to a further substrate by injection of an injection-molding material. The layer structure of the film here need not necessarily correspond to the layer structure according to claim 1.

It is further advantageous, in particular in the case of the design of the film as a transfer film, for the film to be applied to the target substrate in step b) by means of hot stamping. It is possible here for the film to be applied to the target substrate from a roll or from a sheet by means of hot stamping.

It is possible here for the roll beneficially to comprise a film web with several or a plurality of films, in particular according to one of claims 1 to 61, and/or for the sheet beneficially to comprise several or a plurality of films, in particular according to one of claims 1 to 61. It hereby becomes possible to further improve in particular an industrial mass production. Thus, it is possible, for example, to apply the film to a target substrate over the whole surface by means of a hot-stamping machine, with the result that the outlay in terms of time, personnel and logistics are further reduced and at the same time an identical production quality can be ensured.

It is further expedient if the stamping temperature lies in a range of from 80° C. to 250° C., preferably in a range of from 100° C. to 200° C., and/or if the stamping pressure lies in a range of from 0.5 kN/cm$^2$ to 10 kN/cm$^2$. Further, it is also expedient if the stamping time lies in a range of from 1 ms to 2000 ms, preferably in a range of from 1 ms to 500 ms.

It is further possible for the further substrate and/or the target substrate to be flat and/or to have a one-dimensionally curved and/or a two-dimensionally curved and/or a three-dimensionally curved shape.

It is also possible for film and/or the electrical functional element, in particular the electrical functional element formed from the target substrate and the film, to be reshaped, in particular three-dimensionally reshaped. The reshaping advantageously takes place by means of reshaping processes, preferably by means of deep-drawing, thermoforming, high-pressure forming and/or by means of an injection-molding process. The target substrate and/or intermediate substrate here preferably has a layer thickness of at most 1 mm, preferably 500 µm, with the result that the electrical functional element formed from the film and the target substrate can be reshaped.

In the following, among other things, preferred reshaping processes for reshaping the film and/or the electrical functional element are described, wherein in particular the electrical functional element is formed by the film arranged, in particular applied, to a target substrate:

The film and/or the electrical functional element is/are preferably reshaped by means of deep-drawing. The reshaping of the film and/or of the electrical functional element is advantageously effected here by means of vacuum, in particular at a negative pressure of at most 1 bar, and/or by means of positive-pressure support, in particular at a positive pressure between 1 bar and 3 bar, in a reshaping mold corresponding to the desired reshaping geometry.

It is further possible for the film and/or the electrical functional element to be reshaped by means of thermoforming. The reshaping process for the film and/or the electrical functional element or the process parameters of the reshaping process advantageously correspond to those of the deep-drawing, wherein the reshaping is effected with an additional temperature support, in particular at a temperature between 120° C. and 300° C., preferably between 190° C. and 250° C., for example if ABS material is used. It is possible here for either the carrier substrate and/or the target substrate to contain ABS material.

It is also possible for the film and/or the electrical functional element to be reshaped by means of high-pressure forming. The reshaping of the film and/or of the electrical functional element is advantageously effected here by means of positive-pressure support, in particular at a positive pressure between 1 bar and 300 bar, preferably between 10 bar and 150 bar, in a reshaping mold corresponding to the desired reshaping geometry. It is expedient here that the reshaping is effected with an additional temperature support, preferably at temperatures in the range of the glass transition temperature of the film used. The temperature here is advantageously between 120° C. and 300° C., preferably between 190° C. and 250° C., for example if ABS material is used.

Three-dimensional stretches of up to 200% are preferably achieved by means of the above-named reshaping processes. It is also possible, in particular in the case of optimization of the parameters for the respective system, to achieve stretches of up to 300%, wherein stretches between 20% and 50% are sufficient in many application cases.

It is further possible for the films and/or electrical functional elements reshaped or pre-shaped by means of the above-named reshaping processes to be spatterdashed and/or back injection molded in a subsequent injection-molding process.

Further, it is also possible for the film and/or the electrical functional element to be reshaped and/or deformed by means of an injection-molding process. The film and/or the electrical functional element here is/are advantageously introduced into the injection mold in the flat state via a roll or via a sheet or via a single label and deformed by means of the injection-molding method, in particular wherein the shaping is effected by closing the mold as well as also by injection of the molding material. The injection pressure in particular is dependent on the component geometry and/or the component size here. For example, it is possible for the injection pressure to be 500 bar and the injection temperature to be between 180° C. and 380° C., wherein injection pressure and injection temperature are dependent on the injection-molding material. Further, it is also expedient that the film introduced into the injection mold and/or the electrical functional element is/are heated before the process of closing the injection mold by heating the film and/or the electrical functional element, for example at temperatures between 30° C. and 300° C., preferably between 80° C. and 150° C. It is also possible for the film and/or the electrical functional element to be fitted or fixed into the cavity by means of clip frames and/or vacuum and/or positive pressure.

It is also advantageous to reshape the film and/or the electrical functional element by means of "overlaying" the film and/or the electrical functional element over an already three-dimensionally pre-shaped component. The "overlaying" of the film and/or of the electrical functional element is advantageously effected by controlling a vacuum suction of the film and/or of the electrical functional element against the already three-dimensionally pre-shaped component with simultaneous positive pressure in one process. Here, the already three-dimensionally pre-shaped component to be overlaid is preferably acted on by temperature beforehand. It is expedient here if the positive pressure is between 1 bar and 50 bar, preferably between 3 bar and 15 bar, and/or the temperature is between 30° C. and 300° C., preferably between 100° C. and 180° C.

The film and/or the electrical functional element preferably have a stretchability of more than 20%. Such high stretchabilities cannot be achieved, for example by means of the above-named reshaping and/or deforming processes, in the case of conventional functional films, in particular as the carrier film made of, for example, PET is not deformable enough and/or the conductive structures break even after slight deformation, in particular in the case of stretches greater than 20%. It has been shown here that the stretching is improved by the film according to the invention. Thus, through the multi-layered structure of the film according to the invention, in particular through the at least one electrically conductive layer embedded between several varnish layers according to a sandwich system, as previously described, it is achieved that the mechanical stretching and/or deformation can be influenced in a targeted manner, in that for example particular regions of the film can be designed more flexible or less flexible by adapting the layer thicknesses and/or the varnish formulations. The desired stretchability of more than 20% is thus preferably achieved here.

In the case of the above-named three-dimensional deformations it is also advantageous if the electrical functional structure of the film and/or of the electrical functional element can be contacted electrically, in particular galvanically, from the outside, for which the electrical contacts have to be accessible for a contacting. Alternatively, an inductive and/or capacitive coupling, in particular a coupling via an antenna, can be realized. As set out above, a robust and reliable contacting of the electrical functional structure is made possible by the film according to the invention.

It is further possible for the adhesion-promoting layer to consist of a material the visual appearance of which changes from cloudy to highly transparent and/or clear during and/or after step b). Thus, it is possible, during the application of the film to the target substrate, for the adhesion-promoting layer to be melted on because of added heat and/or for the adhesion-promoting layer to be smoothed out by means of pressure, with the result that the surface roughness of the adhesion-promoting layer present when the film is not applied is leveled out during and/or after the application. The visual appearance of the adhesion-promoting layer hereby changes from cloudy to highly transparent and/or clear.

After application of the film to a target substrate, the film with the target substrate forms an electrical functional element. After application of the film to the target substrate, the adhesion-promoting layer of the film is advantageously highly transparent, in particular the adhesion-promoting layer of the film has a transmittance for light in the wavelength range between 380 nm and 780 nm of more than 85%, preferably more than 90%, and/or the adhesion-promoting layer of the film is a clear adhesion-promoting layer, in particular less than 8%, preferably less than 4%, of light in the wavelength range between 380 nm and 780 nm is deflected by the adhesion-promoting layer of the film through scattering. It is also possible for the film to have a transmittance for light in the wavelength range between 380 nm and 780 nm of more than 75%, preferably more than 80%, further preferably more than 85%, still further preferably more than 90%, at least in the one functional region of the at least one electrically conductive layer. For example, a brilliant and true-to-the-original view of an image generated by a display to which the film is applied can hereby be achieved.

It is further possible for the electrical functional element to be a functional element for processing information, in particular a mobile telephone, such as for example a smartphone or a PDA, a tablet computer, a cash machine, a ticket machine, a gaming machine, a games console, an operating part of a household appliance or of a motor vehicle or, for example, a touchscreen. It is also possible for the electrical functional element to be an input device, in particular a touch panel. However, it is also possible for the electrical functional element to be an intermediate product which is used for or in an end product in further processing steps. Thus, for example, the film can be applied to a glass layer and the electrical functional element formed from the glass layer and the film can be used, for example, in a ticket machine.

BRIEF DESCRIPTION OF THE DRAWINGS

Embodiment examples of the invention are explained by way of example in the following with the aid of the attached, not to-scale, figures.

FIG. 11b schematically shows an enlarged section from FIG. 11a

DETAILED DESCRIPTION

Figure 1A:
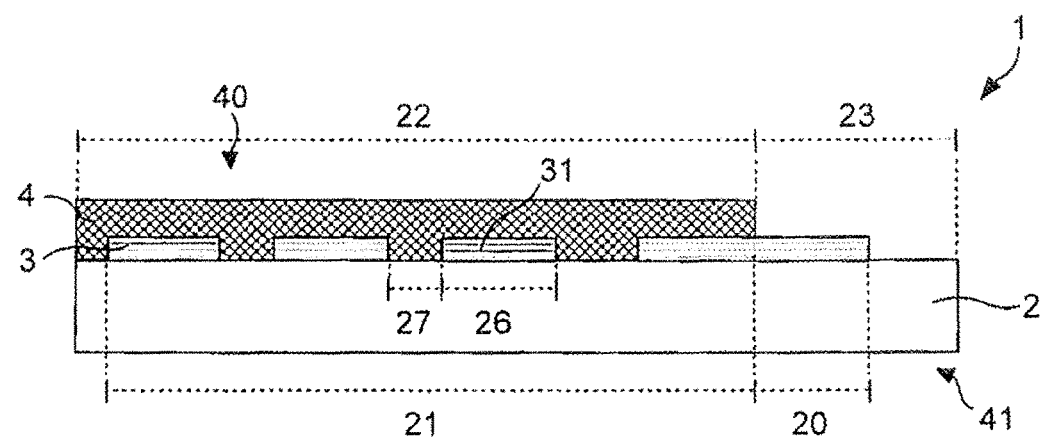
FIG. 1a to FIG. 1f schematically show sectional representations of films

FIG. 1a shows a film 1 with a carrier substrate 2, an electrically conductive layer 3 and an adhesion-promoting layer 4.

The carrier substrate 2 is preferably a layer made of PET, PMMA, PC, ABS, PU, glass or fabric. It is also possible for the carrier substrate 2 to be formed from a hybrid material which comprises plastic layers and layers made of fabric, in particular fiber material, such as for example paper, cotton, or other natural or synthetic fibers. The carrier substrate 2 preferably has a layer thickness between 2 μm and 250 μm, preferably between 23 μm and 125 μm. The carrier substrate 2 shown in FIG. 1a is a transparent layer made of PET with a layer thickness of 75 μm.

By transparent is meant here the property of materials to allow light from the wavelength range visible to the human eye, in particular from the wavelength range between 380 nm and 780 nm, to pass through.

The electrical conductive layer 3 is preferably a layer made of metal, in particular made of silver (Ag), gold (Au), aluminum (Al), copper (Cu) or chromium (Cr). The electrically conductive layer 3 preferably has a layer thickness between 1 nm and 100 nm, further preferably between 2.5 nm and 75 nm, still further preferably between 5 nm and 50 nm. It is also possible for the layer thickness of the electrically conductive layer 3 to be between 100 nm and 5 μm. The electrically conductive layer 3 can further be formed from an electrically conductive paste comprising silver (Ag), gold (Au), copper (Cu) and/or carbon. The electrically conductive layer 3 shown in FIG. 1a is a layer made of Ag with a layer thickness of 50 nm.

The electrically conductive layer 3 is molded in such a way that the electrically conductive layer 3 has a plurality of conducting paths, which have a width 26 between 0.2 μm and 20 μm, preferably between 4 μm and 15 μm, and have a distance 27 from each other greater than 10 μm, preferably greater than 20 μm, with the result that the conducting paths lie below the resolving power of the human eye. By conducting paths is meant here preferably structured electrically conductive layers and conductive regions of the at least one electrically conductive layer 3. The conducting paths are applied in such a way that sufficient transparency for the human eye is preserved, i.e. the conducting paths are designed in such a way that they are not perceived by a human observer, as the conducting paths lie below the resolving power of the human eye. Despite the narrow conducting paths used, sufficient electrical conductivity is achieved, which is comparable in particular to layers made of indium tin oxide (ITO). The coverage of the carrier substrate 2 with the at least one electrically conductive layer 3, in particular the conducting paths, is preferably less than 30%, preferably less than 20%, further preferably less than 10%, still further preferably less than 5%. In FIG. 1a, the width 26 of the conducting paths formed by the electrically conductive layer 3 is 5 μm and the distance 27 between the conducting paths formed by the electrically conductive layer 3 is 15 μm.

The electrically conductive layer 3, in the functional region 21, forms an electrical functional structure, which forms a touch sensor panel, in particular a capacitive sensor panel. Further, it is also possible for the electrical functional structure to form a resistive or inductive sensor panel. The touch sensor panel provides a touchpad functionality. By touch sensor panel is meant here a touch-sensitive sensor which makes it possible to control an electrical functional element, such as for example a smartphone, a games console or a ticket machine. By a touch sensor panel is likewise meant a multi-touch sensor panel which can process several simultaneous touches, for example to enlarge and rotate images which are displayed on a display, not represented in more detail here, arranged in particular under the touch sensor panel.

The electrically conductive layer 3 further has a contacting region 20. The contacting region 20 forms a contacting structure for the electrical contacting of the functional structure. The contacting structure in the functional region 20 is, for example, an electrical connection in the form of a plug. It is further possible for the contacting structure to have so-called pins, contacts and/or studs. The contacting region 20 in FIG. 1a has a surface area of 0.3 mm×2.0 mm. It is also possible for the electrically conductive layer 3 to form one or more contacting regions 20 separated from each other. By separated is meant here that the contacting regions are spaced apart from each other and thereby also electrically insulated from each other, in particular that the contacting regions have a distance from each other of at least 0.1 mm, preferably at least 0.2 mm, further preferably at least 0.5 mm.

The adhesion-promoting layer 4 is preferably a layer made of polymers and/or copolymers, in particular comprising PMMA, polyester, PU or PVC, with a layer thickness between 0.1 μm and 50 μm, preferably between 0.25 μm and 25 μm, further preferably between 0.5 μm and 7 μm. The adhesion-promoting layer 4 shown in FIG. 1a is a layer made of PVC copolymers with a layer thickness of 4 μm.

As shown in FIG. 1a, the electrically conductive layer 3 is arranged between the carrier substrate 2 and the adhesion-promoting layer 4. The adhesion-promoting layer 4 is thus arranged on the side of the at least one electrically conductive layer 3 facing away from the carrier substrate 2. The film 1 has an upper side 40 and an underside 41, wherein the adhesion-promoting layer 4 is arranged on the upper side 40. As shown in FIG. 1a, the adhesion-promoting layer 4 is arranged on the surface of the film 1.

The adhesion-promoting layer 4 is arranged in the region 22. The region 22 completely covers the functional structure formed by the electrically conductive layer 3 in the functional region 21 in FIG. 1a. The adhesion-promoting layer 4 is not arranged in the region 23. The region 23 comprises the contacting region 20 of the electrically conductive layer 3, with the result that the adhesion-promoting layer 4 does not cover the contacting region 20 over the whole surface. When the film 1 is applied to a target substrate, the region 23 does not adhere to the target substrate and therefore the contacting region 20 in particular is accessible after application of the film 1 to the target substrate and the electrical functional structure can be reliably contacted.

However, it is also possible for the adhesion-promoting layer 4 not to completely cover the functional region 21. Thus, the adhesion-promoting layer 4 can cover the functional region 21 for example by at least 30%, preferably at least 50%, further preferably at least 70%.

The adhesion-promoting layer 4 preferably consists of a material which is highly transparent after application of the film 1 to a target substrate. The term "highly transparent" describes the property of materials to allow light from the wavelength range visible to the human eye, in particular from the wavelength range between 380 nm and 780 nm, to pass through with barely any attenuation and substantially unhindered. A highly transparent layer therefore has substantially no recognizable absorption of light for a human observer, with the result that the light intensity when the light passes through the layer is reduced in a barely recognizable manner for a human observer.

Thus, the adhesion-promoting layer 4 preferably consists of a material which has a transmittance for light in the wavelength range between 380 nm and 780 nm of more than 85%, preferably more than 90%, after application to the target substrate.

The adhesion-promoting layer 4 preferably consists of a material which is clear after application of the film 1 to a target substrate, with the result that less than 8%, preferably less than 4%, of light in the wavelength range between 380 nm and 780 nm is deflected by the adhesion-promoting layer 4 through scattering after application of the film 1 to the target substrate.

As previously explained, when not yet applied to the target substrate the adhesion-promoting layer 4 can have in particular light-scattering properties because of surface roughnesses of the adhesion-promoting layer 4, which can form, for example, due to traces of the process steps for depositing the adhesion-promoting layer 4. The adhesion-promoting layer 4 becomes highly transparent and/or clear in particular when the film 1 is applied to the target substrate and the adhesion-promoting layer 4 is melted on and/or smoothed out for example by means of heat and/or pressure supplied by the hot lamination, with the result that the surface roughnesses of the adhesion-promoting layer 4 no longer appear in a disruptive manner. This means that the adhesion-promoting layer 4 becomes highly transparent and/or clear due to physical and/or chemical changes in the adhesion-promoting layer 4 during or after the application of the film 1 to the target substrate.

The partially applied adhesion-promoting layer 4 is preferably a layer made of a hot glue, a cold glue or a radiation-curing glue, in particular a glue that can be cured by means of electromagnetic radiation and/or electron radiation. Radiation-curing glues are cured, for example, by means of UV light and/or IR light (UV=ultraviolet; IR=infrared).

Figure 1B:
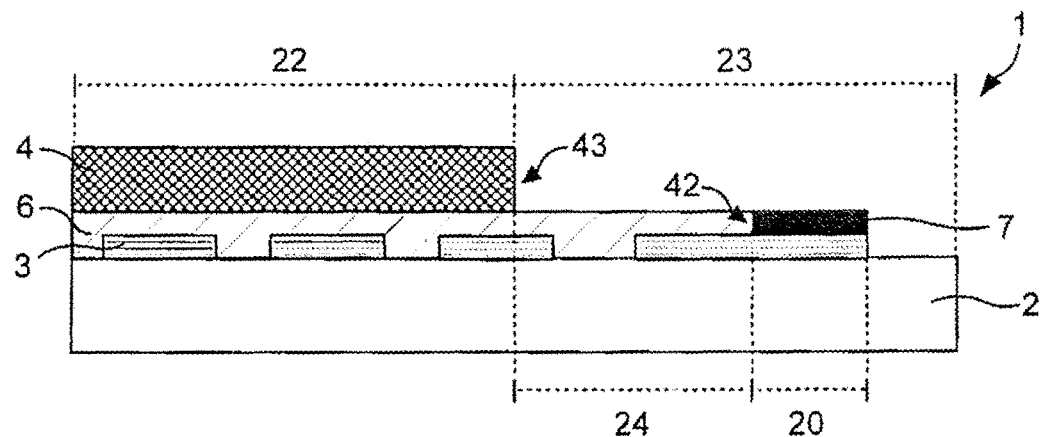

FIG. 1b shows a film 1 comprising a carrier substrate 2, an electrically conductive layer 3, a protective varnish layer 6, a contact-strengthening layer 7 and an adhesion-promoting layer 4.

The protective varnish layer 6 is preferably a layer made of PMMA, polyester, PU or PVC, with a layer thickness between 0.1 μm and 50 μm, preferably between 0.25 μm and 25 μm, further preferably between 0.5 μm and 15 μm. The protective varnish layer 6 shown in FIG. 1b is a transparent layer made of PAC with a layer thickness of 5 μm.

The protective varnish layer 6 covers the electrically conductive layer 3, but not the contacting region 20. Thus, the protective varnish layer 6 covers the functional region 21 formed by the electrically conductive layer 3, but not the contacting region 20. The protective varnish layer 6, as shown in FIG. 1b, is arranged on the side of the electrically conductive layer 3 facing away from the carrier substrate 2. The protective varnish layer 6 is thus arranged between the electrically conductive layer 3 and the adhesion-promoting layer 4.

The contact-strengthening layer 7 is preferably a layer made of an electrically conductive paste, in particular carbon paste, which comprises silver (Ag), gold (Au), aluminum (Al), copper (Cu), chromium (Cr) and/or other conductive metals. It is further possible for the electrically conductive paste, in particular carbon paste, to comprise binders, in particular comprising colophony and/or phenol resins, polymers and copolymers.

By binders is meant substances which can be used to join solids, in particular with a fine granularity, to each other or to a base. Thus, it is possible for the binders to be added in liquid form to the solids to be bound.

Binders of the electrically conductive paste, in particular carbon paste, are natural resins, preferably colophony, phenol resins, polymers and copolymers consisting of PVC, PMMA, PU, polyester, isocyanate (NCO)-crosslinked binders, for example MF, MPF, melamine polyesters, UMF. Binders of the electrically conductive paste comprising poly(organo)siloxanes and copolymers thereof and/or radiation-curing binders are less preferred.

Varnishes and pastes can be solvent-based, for example, or can be present on an aqueous basis as an emulsion, dispersion or suspension.

The contact-strengthening layer 7 preferably has a layer thickness between 0.1 μm and 100 μm, preferably between 0.25 μm and 25 μm, further preferably between 0.5 μm and 10 μm.

The contact-strengthening layer 7 shown in FIG. 1b is a layer made of a carbon paste with a layer thickness of 4.5 μm.

The contact-strengthening layer 7 here is applied in the contacting region 20 of the electrically conductive layer 3. The electrically conductive layer 3 has the contact-strengthening layer 7 in the contacting region 20. As shown in FIG. 1b, the contact-strengthening layer 7 is applied over the whole surface in the contacting region. However, it is also possible for the contact-strengthening layer 7 to be applied only in areas in the contacting region 20. The contact-strengthening layer 7 protects the contacting region 20 or the contacting structure formed in the contacting region 20 from mechanical, physical and/or chemical environmental influences.

The adhesion-promoting layer 4, as shown in FIG. 1b, is present in the region 22 and not present in the region 23. The adhesion-promoting layer 4 is thus not present in the region 24, which is encompassed by the region 23, when viewed perpendicularly to a plane spanned by the carrier substrate 2. The region 24 adjoins the contacting region 20 and does not have the adhesion-promoting layer 4. The adhesion-promoting layer 4 is applied only in the region 22 and does not cover the region 24 adjoining the contacting region 20. During application of the film 1 to a target substrate, the film 1 therefore adheres to the target substrate only in the region 22. In the region 23, which encompasses the regions 20 and 24, the film 1 does not adhere to the target substrate, with the result that the contacting region 20 is accessible. Further, the region 23 can be raised, wherein the region 24 adjoining the contacting region 20, for example, performs a hinge function to raise the region 23.

The region 24 preferably has a width of at least 0.2 mm, preferably at least 0.5 mm, further preferably at least 1 mm, still further preferably at least 2 mm. The region 24 shown in FIG. 1b has a width of 1 mm. The width of the region 24 can be chosen depending on the requirements of the target substrate to which the film 1 is to be applied or depending on the further processing step after application of the film 1 to the target substrate. By width is meant here the distance between the boundary surface 42 which is formed by the contacting region 20 and the region 24 adjoining the contacting region 20 and the boundary surface 43 which is formed by the adhesion-promoting layer 4 and the region 24 adjoining the contacting region 20.

With respect to the design of the further layers in FIG. 1b, reference is made here to the above statements.

Figure 1C:
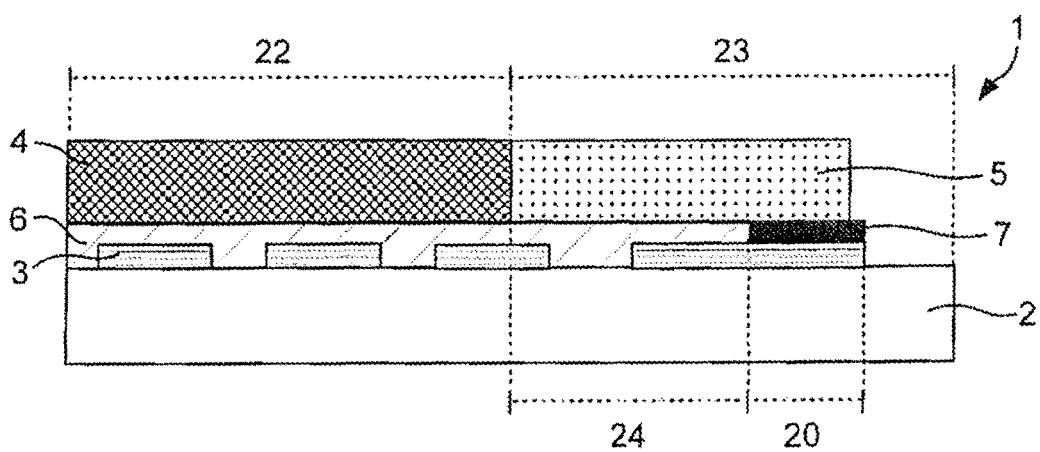

FIG. 1c shows a film 1 with a carrier substrate 2, an electrically conductive layer 3, an adhesion-promoting layer 4, a detachment layer 5, a protective varnish layer 6 and a contact-strengthening layer 7.

The detachment layer 5 is preferably a layer made of waxes, polyethylene (PE), polypropylene (PP), cellulose derivatives or poly(organo)siloxanes. The above-named waxes can be natural waxes, synthetic waxes or combinations thereof. The above-named waxes are, for example, carnauba waxes. The above-named cellulose derivatives are, for example, cellulose acetate (CA), cellulose nitrate (CN), cellulose acetate butyrate (CAB) or mixtures thereof. The above-named poly(organo)siloxanes are, for example, silicone binders, polysiloxane binders or mixtures thereof. The detachment layer 5 preferably has layer thicknesses between 0.1 µm and 10 µm, preferably between 0.01 µm and 5 µm. The detachment layer 5 shown in FIG. 1c is a layer made of a PE-wax dispersion with a layer thickness of less than 1 µm.

The detachment layer 5, as shown in FIG. 1c, covers the region 24 adjoining the contacting region 20 over the whole surface. The contacting region 20 is covered by the detachment layer 5 only in areas. However, it is also possible for the detachment layer to cover the contacting region 20 over the whole surface. It is also possible for the detachment layer to be applied over the whole surface or at least in areas in the contacting region 20, but not in the region 24 adjoining the contacting region 20.

An adhesion of the regions to which the detachment layer 5 is applied to a target substrate to which the film 1 is applied is prevented by the detachment layer 5. Thus, after application to a target substrate, the film 1 shown in FIG. 1c adheres to the target substrate in the region 22, but not in the region 23, which encompasses the regions 20 and 24. The detachment layer 5 can thus ensure that the regions which have the detachment layer 5 do not adhere to the target substrate, for example by hot lamination to a target substrate.

With respect to the design of the further layers in FIG. 1c, reference is made here to the above statements.

The film 1, after application to a target substrate, advantageously has at least a transmittance for light in the wavelength range between 380 nm and 780 nm of more than 75%, preferably more than 80%, further preferably more than 85%, still further preferably more than 90%, in the functional region formed by the electrically conductive layer 3.

The transmittance here describes the permeability of the film 1 for light from the wavelength range between 380 nm and 780 nm. Light incident on the film 1 is partially reflected at the air-film 1 boundary surface as well as at boundary surfaces between the layers of the film 1. The light incident on the film 1 is further partially absorbed while traversing the film 1. The remaining portion of the light is transmitted through the film 1 and exits again at the opposite side of the film 1. To determine the transmittance T, the quotient of the light intensity behind the film I and the light intensity in front of the film $I_0$ is found. The transmittance T is a measure of the intensity "allowed to pass through" and adopts values between 0 and 1. The transmittance is typically dependent on the wavelength of the incident light.

As previously explained, the adhesion-promoting layer 4 can have a cloudy visual impression, which is brought about in particular because of surface roughnesses of the adhesion-promoting layer 4, before application of the film 1 to a target substrate. After application of the film 1 to the target substrate, these surface roughnesses are leveled out, for example, by heat supplied during the application process, which allows the adhesion-promoting layer 4 to melt, and/or by exerted pressure, which smooths out the adhesion-promoting layer by pressing against the target substrate. The adhesion-promoting layer hereby becomes highly transparent and/or clear in particular after application to the target substrate, with the result that the cloudy visual impression disappears and high transmittance values of the applied film 1 can be achieved. The transmittance of the film 1 is therefore preferably measured, as explained in the following, after application to a target substrate.

If the film 1 is applied, for example, to a target substrate made of PMMA and then the total transmittance of the electrical functional element formed from the target substrate and the film 1 is determined, a total transmittance of 84.6% results. This total transmittance results both in the case of a measurement from the side of the PMMA target substrate 10 and from the side of the carrier substrate 2 of the film 1. The PMMA target substrate here has a transmittance of 93.6%. The Byk Gardner Haze-Gard Plus measuring device from BYK-Gardner GmbH, Geretsried, Germany, was used to measure the total transmittance as well as the transmittance of the PMMA target substrate.

Figure 1D:
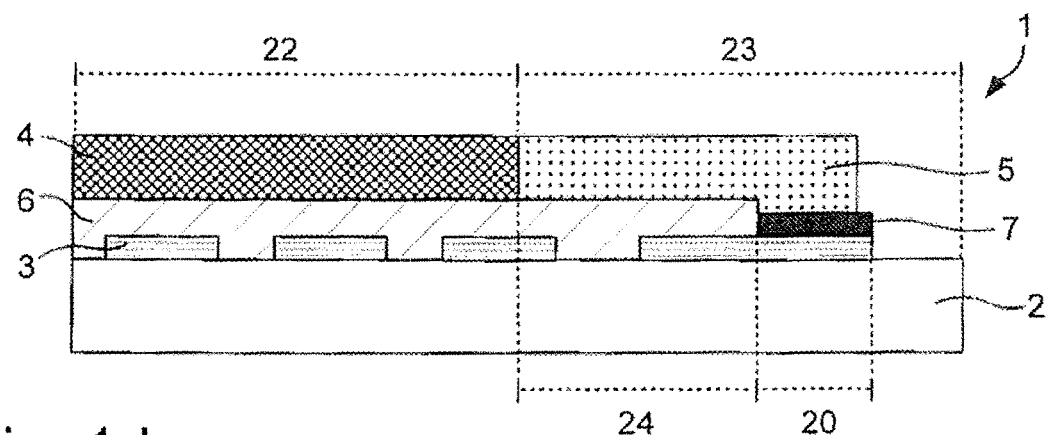

FIG. 1d shows a film 1 with a carrier substrate 2, an electrically conductive layer 3, an adhesion-promoting layer 4, a detachment layer 5, a protective varnish layer 6 and a contact-strengthening layer 7.

The film 1 shown in FIG. 1d here corresponds to the film shown in FIG. 1c, with the difference that the protective varnish layer 6 in FIG. 1d is designed with a greater layer thickness. Thus, the protective varnish layer 6 shown in FIG. 1d has a layer thickness of 10 μm.

Figure 1E:
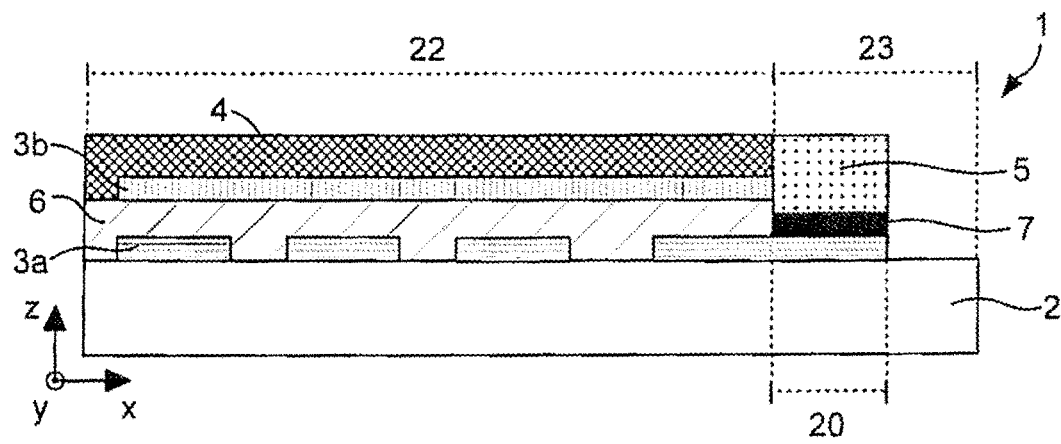

FIG. 1e shows a film 1 with a carrier substrate 2, a first electrically conductive layer 3a, a protective varnish layer 6, a second electrically conductive layer 3b, an adhesion-promoting layer 4, a detachment layer 5 and a contact-strengthening layer 7.

The first electrically conductive layer 3a is molded in such a way that the first electrically conductive layer 3a has a plurality of conducting paths which run in the y-direction and are formed in the shape of strips. The second electrically conductive layer 3b is molded in such a way that the second electrically conductive layer 3b has a plurality of conducting paths which run in the x-direction and are likewise formed in the shape of strips. The conducting paths of the first electrically conductive layer 3a can here be formed as sensor conducting paths and the conducting paths of the second electrically conductive layer can be formed as driver conducting paths, wherein the first electrically conductive layer 3a from the second electrically conductive layer 3b are electrically insulated from each other by the protective varnish layer 6. It is further possible for the conducting paths of the first and of the second electrically conductive layer to be molded diamond-shaped. It is further possible for the conducting paths of the first electrically conductive layer 3a to form the y-sensors of a touch sensor and for the conducting paths of the second electrically conductive layer 3b to form the x-sensors of the touch sensor. It is also possible for the conducting paths of the first electrically conductive layer and the conducting paths of the second electrically conductive layer to be molded differently, in particular for the conducting paths to have different widths and/or different distances. With respect to the further design of the conducting paths, reference is made here to the above statements.

As shown in FIG. 1e, the film 1 has the adhesion-promoting layer 4 in the region 22 and not in the region 23. The detachment layer 5 is further applied to the contact-strengthening layer 7 in the contacting region 20, wherein the detachment layer covers the contacting region 20 over the whole surface. After application to a target substrate, the film 1 adheres to the target substrate in the region 22, and in the region 23, which encompasses the region 20, the film 1 does not adhere to the target substrate, with the result that the contacting region 20 is accessible.

With respect to the design of the further layers in FIG. 1e, reference is made here to the above statements.

Figure 1F:
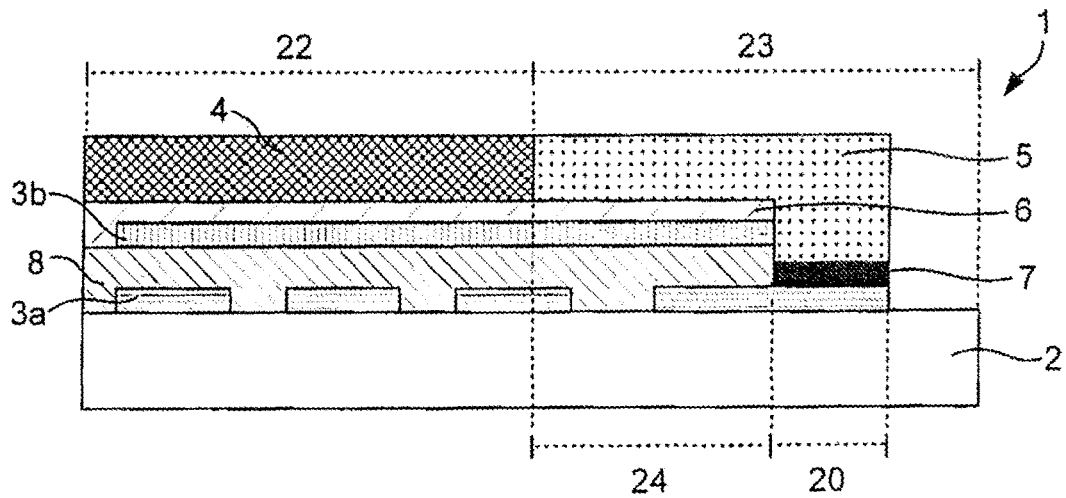

FIG. 1f shows a film 1 with a carrier substrate 2, a first electrically conductive layer 3a, a dielectric layer 8, a second electrically conductive layer 3b, a protective varnish layer 6, an adhesion-promoting layer 4, a detachment layer 5 and a contact-strengthening layer 7.

With respect to the design of the layers 2, 3a, 3b, 4, 5, 6, and 7 in FIG. 1f, reference is made here to the above statements. As shown in FIG. 1f, a dielectric layer 8 is arranged between the first electrically conductive layer 3a and the second electrically conductive layer 3b. The dielectric layer is preferably a layer made of PE, PTFE or ceramic, with a layer thickness between 0.1 μm and 100 μm, preferably between 0.25 μm and 25 μm, further preferably between 0.5 μm and 10 μm. The dielectric layer shown in FIG. 1f is a layer made of PE with a layer thickness of 6 μm. It is further possible for the layer 8 to be a semi-conductive or insulating layer.

As is shown in FIG. 1f, the film 1 has the adhesion-promoting layer 4 in the region 22 and not in the region 23. The detachment layer 5, as shown in FIG. 1f, is present both in the contacting region 20 and in the region 24 adjoining the contacting region 20. The detachment layer is applied over the whole surface in the regions 20 and 24. After application to a target substrate, the film 1 adheres to the target substrate in the region 22, and in the region 23, which encompasses the regions 20 and 24, the film 1 does not adhere to the target substrate, with the result that the contacting region 20 is accessible. After application to the target substrate, the film 1 can further be raised in the region 23, with the result that a reliable and robust contacting is made possible. The region 24 here can act as a movable hinge in order to raise the contacting region 20.

Figure 2A:
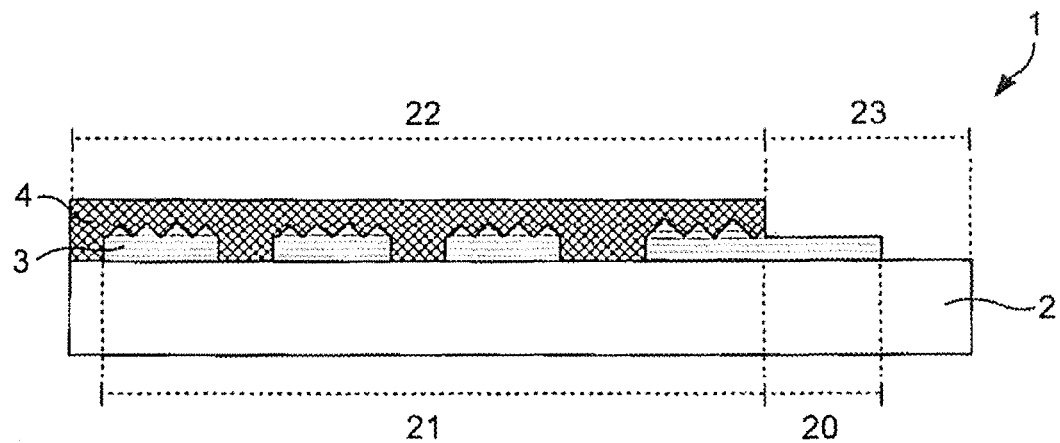
FIG. 2a and FIG. 2b schematically show sectional representations of films
Figure 2B:
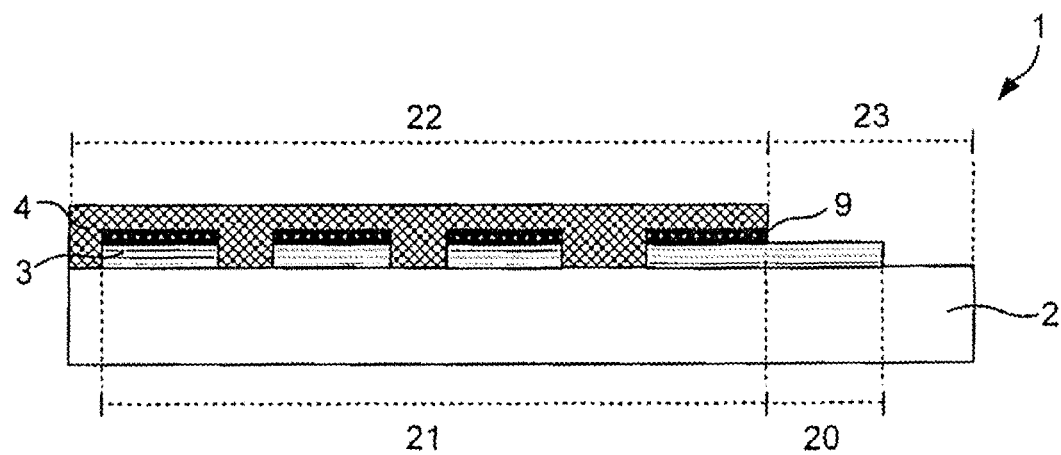

FIG. 2a and FIG. 2b show further embodiment variants of the film 1 according to the invention, which comprise a carrier substrate 2, an electrically conductive layer 3 and an adhesion-promoting layer 4.

Surface relief structures are molded into the electrical conductive layer 3 shown in FIG. 2a. The electrically conductive layer 3 in FIG. 2a is, for example, a metal layer made of aluminum, which is first applied to the carrier substrate 2 over the whole surface in areas. Then the surface relief structures of the metal layer 3 can be produced by etching the metal by means of acid, by laser structuring of the surface or by mechanical surface treatment. The above-named laser structuring of the surface is effected, for example, by removal processes, in particular ablation, of the metal on the surface of the metal layer by means of a solid-state laser, such as an Nd:YAG laser. The above-named mechanical surface treatment is preferably rubbing, sanding, brushing or similar mechanical roughening methods. Such a surface treatment of the metal layer can be effected over the whole surface of the entire metal layer 3 or only be effected in areas. In FIG. 2a the metal layer 3 has surface relief structures in the entire functional region 21, but not in the contacting region 20. After the surface treatment, the metal layer 3 is structured such that the conducting paths result. The metal layer 3 can be structured, i.e. removed in areas, for example, by demetallization methods, such as for example etching or washing, such that the conducting paths result.

As shown in FIG. 2a, the adhesion-promoting layer 4 is present in the region 22 and not present in the region 23, with the result that after application to a target substrate the film 1 adheres to the target substrate in the region 22 and does not adhere to the target substrate in the region 23, which encompasses the contacting region 20. The contacting region 20 is thus accessible after application to the target substrate.

With respect to the further design of the layers 3 and 4 or the design of the layer 2 in FIG. 2a, reference is made here to the above statements.

The film 1 shown in FIG. 2b corresponds to the film 1 shown in FIG. 2a, with the difference that the electrically conductive layer 3 does not have any surface relief structures, but a darkening layer 9 is applied to the electrically conductive layer 3. The darkening layer 9 is preferably a layer made of a dark paint, which absorbs light incident on the darkening layer 9. The darkening layer 9 here can be applied by means of conventional coating methods, such as printing, coating with a doctor blade or spin coating. The electrically conductive layer 3 and the carrier substrate 2 can also have, for example, a different wettability, wherein the wettability of a colored varnish providing the darkening layer 9 is chosen such that it adheres well exclusively to the conducting paths formed by the electrically conductive layer 3. The darkening layer 9 can also be applied selectively to the conducting paths by means of a thermotransfer method. Thus, the conducting paths can be heated selectively by a lamp, wherein melted-on chromophoric material preferably deposits on the heated conducting paths. However, it is also possible for the layer 9 to be a layer with light-scattering properties. For this, the layer with light-scattering properties preferably has a surface relief structure, in particular a matte structure with stochastically chosen relief parameters. However, it is further possible for the layer 9 to be a layer which has light-absorbing surface relief structures, such as for example moth-eye structures.

Figure 3:
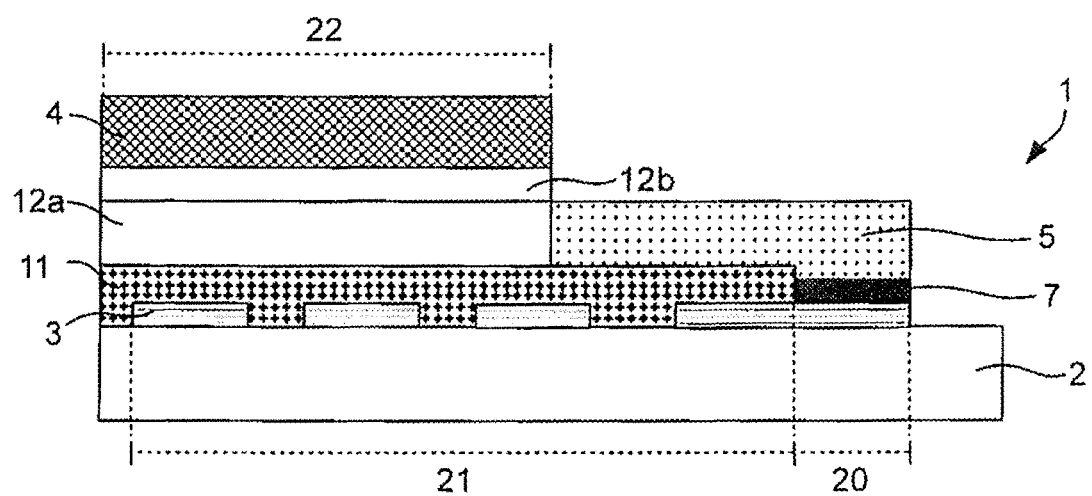
FIG. 3 schematically shows a sectional representation of a film

FIG. 3 shows a film 1 with a carrier substrate 2, an electrically conductive layer 3, an intermediate adhesive layer 11, the decorative layer 12a and 12b, an adhesion-promoting layer 4, a detachment layer 5 and a contact-strengthening layer 7.

The intermediate adhesive layer 11, as shown in FIG. 3, is arranged on the side of the electrically conductive layer facing away from the carrier substrate 2. The intermediate adhesive layer 11 further covers the functional region 21 formed by the electrically conductive layer 3, but not the contacting region 20. The the intermediate adhesive layer 11 is further arranged between the electrically conductive layer and the first decorative layer 12a.

The intermediate adhesive layer 11 is preferably a primer layer and/or an adhesive layer made of a hot glue, a cold glue or a radiation-curing glue, in particular a glue that can be cured by means of electromagnetic radiation and/or electron radiation. It is also possible for the intermediate adhesive layer 11 to comprise PMMA, polyester, PU or PVC. The intermediate adhesive layer 11 is preferably applied by means of gravure printing, screen printing, relief printing or casting techniques in a layer thickness between 0.1 µm and 50 µm, preferably between 0.25 µm and 25 µm, further preferably between 0.5 µm and 7 µm. The intermediate adhesive layer 11 shown in FIG. 3 is a hot-glue layer with a layer thickness of 5 µm.

As shown in FIG. 3, the decorative layers 12a and 12b are arranged in the same region 22 as the adhesion-promoting layer 4, with the result that the decorative layers 12a and 12b are arranged congruent with the adhesion-promoting layer 4 and/or the intermediate adhesive layer 11 when viewed perpendicularly to a plane spanned by the carrier substrate 2. It is hereby achieved that the contacting region is accessible for a reliable and robust contacting of the electrical functional structure despite the additional decorative layers 12a and 12b.

The decorative layer 12a shown in FIG. 3 is preferably a replication varnish layer. The replication varnish layer consists, for example, of a thermoplastic varnish, into which a surface relief structure is molded at least in areas by means of heat and pressure through the action of a stamping tool. Further, it is also possible for the replication varnish layer to be formed by a UV-crosslinkable varnish and for the surface relief structure to be molded into the replication varnish layer by means of UV replication. The surface relief structure here is molded onto the uncured replication varnish layer through the action of a stamping tool and the replication varnish layer is cured directly during or after the molding by irradiation with UV light. It is further advantageous that the replication varnish layer has a layer thickness between 0.2 µm and 4 µm, preferably 0.3 µm and 2 µm, further preferably 0.4 µm and 1.5 µm. The decorative layer 12a shown in FIG. 3 is a replication varnish layer made of a UV-crosslinkable varnish with a layer thickness of 1.25 µm.

The decorative layer 12b shown in FIG. 3 is preferably a reflective layer. The reflective layer is preferably a metal layer made of chromium, aluminum, gold, copper, silver or an alloy of such metals, which is vapor-deposited under vacuum in a layer thickness of from 0.01 µm to 0.15 µm. Further, it is also possible for the reflective layer to be formed by a transparent reflective layer, preferably a thin or finely structured metallic layer or a dielectric HRI or LRI layer (high refractive index—HRI, low refractive index—LRI). Such a dielectric reflective layer consists, for example, of a vapor-deposited layer made of a metal oxide, metal sulfide, e.g. titanium oxide, etc. with a thickness of from 10 nm to 150 nm.

Further, it is also possible for the reflective layer to be implemented merely in areas. Thus, it is possible for there to be a partial metallization which forms, for example, a metallic text or nanotext. The decorative layer 12b shown in FIG. 3 is a metal layer made of copper in a layer thickness of 10 nm.

With respect to the design of the further layers in FIG. 3, reference is made here to the above statements.

Figure 4A:
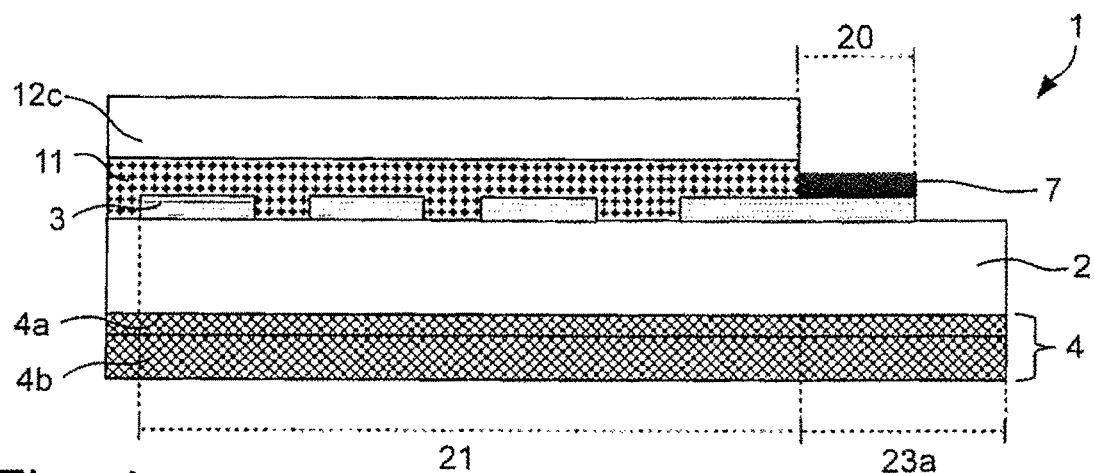
FIG. 4a to FIG. 4c schematically show sectional representations of films

FIG. 4a shows a film 1 with a carrier substrate 2, an electrically conductive layer 3, an intermediate adhesive layer 11, a decorative layer 12c, an adhesion-promoting layer 4 and a contact-strengthening layer 7.

As shown in FIG. 4a, the adhesion-promoting layer 4 is arranged on the side of the carrier substrate 2 facing away from the electrically conductive layer. The the adhesion-promoting layer 4 is further applied over the whole surface when viewed perpendicularly to a plane spanned by the carrier substrate 2. However, it is also possible for the adhesion-promoting layer 4 not to be arranged in the region 23a which overlaps the contacting region 20 of the electrically conductive layer 3. The adhesion-promoting layer 4, as shown in FIG. 4a, further comprises the layers 4a and 4b. It is hereby possible to optimize the adhesion of the film 1 to a target substrate. Thus, the layer 4a can be optimized for the material of the carrier substrate 2 and the layer 4b can be optimized for the material of the target substrate to which the film 1 is to be applied by means of the adhesion-promoting layer 4.

The intermediate adhesive layer 11, as shown in FIG. 4a, is arranged on the side of the electrically conductive layer 3 facing away from the carrier substrate 2. The intermediate adhesive layer 11 further covers the functional region 21 formed by the electrically conductive layer 3, but not the contacting region 20. The the intermediate adhesive layer 11 is further arranged between the electrically conductive layer and the first decorative layer 12c.

The decorative layer 12c, as shown in FIG. 4a, is arranged in the same region are as the intermediate adhesive layer 11, with the result that the decorative layer 12c is arranged congruent with the intermediate adhesive layer 11 when viewed perpendicularly to a plane spanned by the carrier substrate 2. It is hereby achieved in particular that the contacting region 20 can be reliably and robustly contacted despite the additional decorative layer 12c.

The decorative layer 12c is preferably a transparent colored varnish layer. For this, the decorative layer 12c contains dyes and/or pigments, which give the decorative layer 12c, for example, a color filter effect.

The decorative layer 12c preferably forms a pattern. A pattern can be, for example, a graphically designed outline, a figurative representation, an image, a motif, a symbol, a logo, a portrait, an alphanumeric character, a text and the like. It is also possible for the pattern to have differently colored pattern elements.

However, it is also possible for the decorative layer 12c to be a printed layer, in particular made of an opaque and/or colored ink. The printed layer can, for example, form a frame around the functional region 21, or be printed patterned, for example linear.

With respect to the design of the further layers in FIG. 4a, reference is made here to the above statements.

Figure 4B:
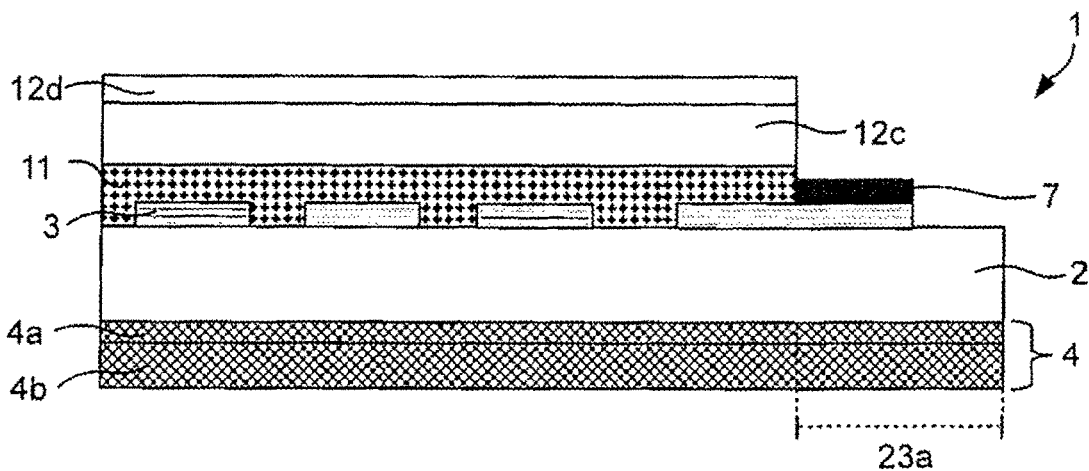

FIG. 4b shows a film 1 with a carrier substrate 2, an electrically conductive layer 3, an intermediate adhesive layer 11, the decorative layers 12c and 12d, an adhesion-promoting layer 4 and a contact-strengthening layer 7.

The decorative layer 12d is preferably a transparent carrier layer made of PET, PMMA, PC, ABS, PU, glass, fabric or a hybrid material which comprises plastic layers and layers of fabric, in particular fiber material, such as for example paper, cotton, or other natural or synthetic fibers. The carrier layer preferably has a layer thickness between 2 µm and 250 µm, preferably between 23 µm and 125 µm. The decorative layer 12d shown in FIG. 4b is a transparent layer made of PET with a layer thickness of 25 µm. As shown in FIG. 4b, the decorative layer 12d is also arranged congruent with the intermediate adhesive layer 11, with the result that the contacting region continues to remain accessible and the electrical functional structure can be reliably and robustly contacted.

With respect to the design of the further layers in FIG. 4b, reference is made here to the above statements.

Figure 4C:
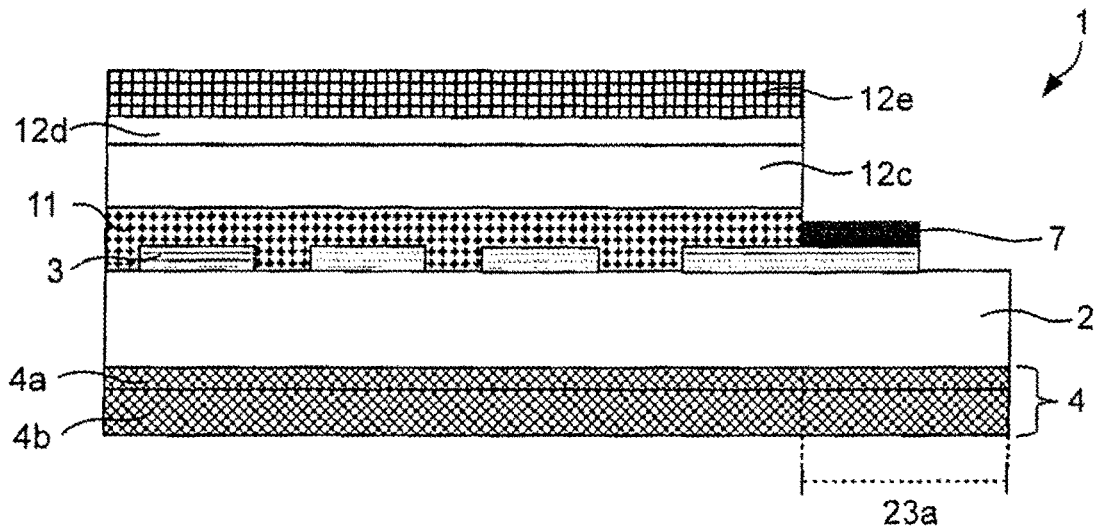

FIG. 4c shows a film 1 with a carrier substrate 2, an electrically conductive layer 3, an intermediate adhesive layer 11, the decorative layers 12c, 12d and 12e, an adhesion-promoting layer 4 and a contact-strengthening layer 7.

The decorative layer 12e is preferably a transparent colored varnish layer. For this, the decorative layer 12e contains dyes and/or pigments, which give the decorative layer 12e, for example, a color filter effect. If, for example, the decorative layer 12c is likewise molded as a transparent colored varnish layer, as explained above, the interaction of the two decorative layers 12c and 12e generates, for the observer, a color filter effect, in particular a color mixing effect. However, it is also possible, for example, for the decorative layer 12c and the decorative layer 12e to be printed layers which, in each case, form a pattern. The two decorative layers 12c and 12e here can interact with each other in such a way that, for the observer, a Moiré effect is generated and thus a predetermined Moiré pattern becomes recognizable. The decorative layer 12d here can act, for example, as a transparent spacer layer. The decorative layer 12e, as shown in FIG. 4b, is also arranged congruent with the intermediate adhesive layer 11, with the result that the contacting region remains accessible.

With respect to the design of the further layers in FIG. 4c, reference is made here to the above statements.

Figure 5A:
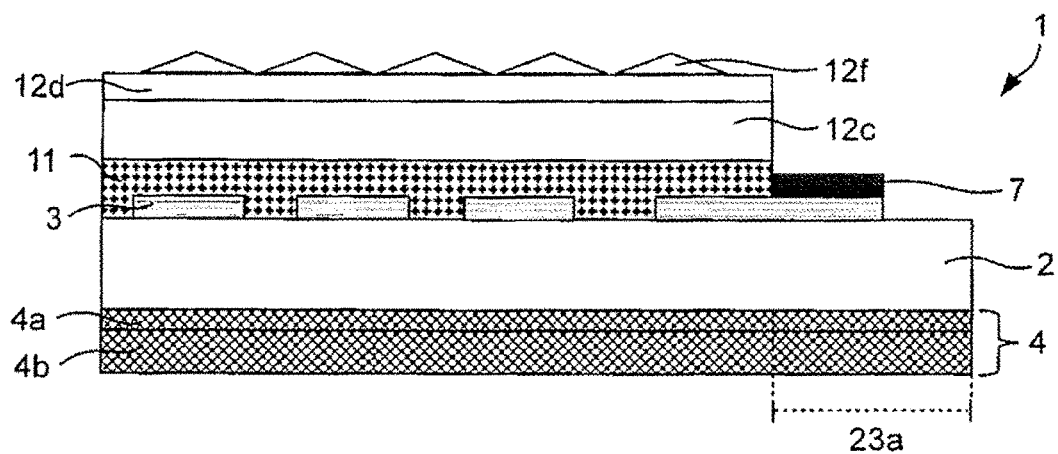
FIG. 5a to FIG. 5c schematically show sectional representations of films

FIG. 5a shows a film 1 with a carrier substrate 2, an electrically conductive layer 3, an intermediate adhesive layer 11, the decorative layers 12c, 12d and 12f, an adhesion-promoting layer 4 and a contact-strengthening layer 7.

The adhesion-promoting layer 4, as shown in FIG. 5a, can be applied over the whole surface. However, it is also possible for the adhesion-promoting layer 4 not to be present in the region 23a. The accessibility of the contacting region is hereby further improved, as the corresponding surface region 23a remains free on both sides, which can be contacted electrically in a particularly simple manner, for example by means of a plug connection, in following processing steps.

The decorative layer 12f is preferably an optically transparent varnish layer, which is partially printed. The decorative layer 12f generates a haptic and/or tactile effect because of the surface relief structures. The decorative layer 12f is thus haptically and/or tactilely detectable. Further, it is also possible for the surface relief structures of the decorative layer 12f to generate diffractive and/or refractive optical effects. It is also possible for the surface relief structures to be produced by mechanical structuring or optical structuring, in particular by means of a laser, of the layer surface. A mechanical structuring can be a replication with a correspondingly molded stamping tool. An optical structuring can be a laser ablation. Furthermore, photolithographic methods can also be used to produce these structures. The structure depths of the surface relief structures for a haptic and/or tactile detectability preferably lie between 1 µm and 2000 µm, further preferably between 50 µm and 2000 µm. Structure depths for diffractive or refractive effects preferably lie between 0.1 µm and 20 µm, further preferably 0.1 µm to 5 µm.

As shown in FIG. 5a, the decorative layer 12f is arranged on the decorative layer 12d. The decorative layers 12c, 12d and 12f are further arranged on the same side of the carrier substrate 2.

With respect to the design of the further layers in FIG. 5a, reference is made here to the above statements.

Figure 5B:
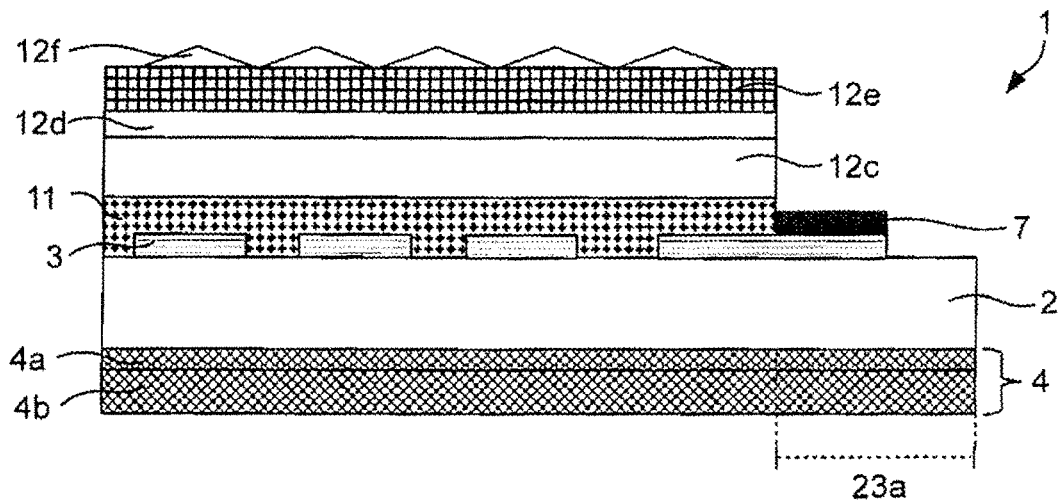

FIG. 5b shows a film 1 with a carrier substrate 2, an electrically conductive layer 3, an intermediate adhesive layer 11, the decorative layers 12c, 12d, 12e and 12f, an adhesion-promoting layer 4 and a contact-strengthening layer 7.

With respect to the design of the layers in FIG. 5b, reference is made here to the above statements.

Figure 5C:
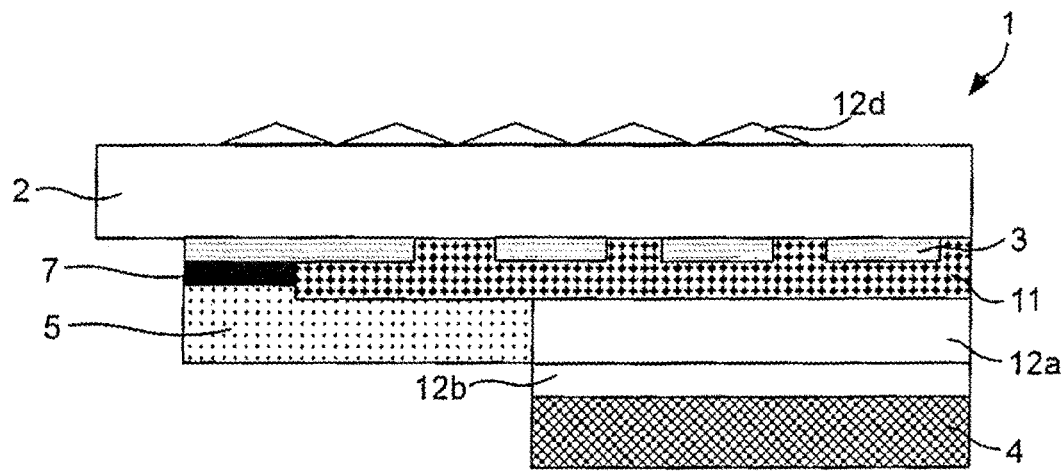

FIG. 5c shows a film 1 with a carrier substrate 2, an electrically conductive layer 3, an intermediate adhesive layer 11, the decorative layers 12a, 12b and 12f, an adhesion-promoting layer 4, a detachment layer 5 and a contact-strengthening layer 7.

As shown in FIG. 5c, the decorative layer 12f is arranged on the side of the carrier substrate 2 facing away from the electrically conductive layer 3. The decorative layers 12a and 12b in contrast are arranged on the side of the carrier substrate 2 facing towards the electrically conductive layer 3 or on the side of the electrically conductive layer 3 facing away from the carrier substrate 2.

With respect to the design of the layers in FIG. 5c, reference is made here to the above statements.

Figure 6A:
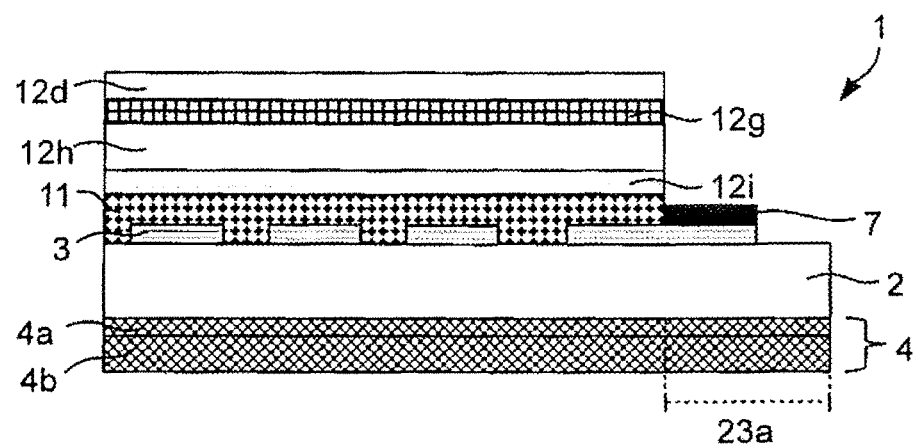
FIG. 6a to FIG. 6c schematically show sectional representations of films

FIG. 6a shows a film 1 with a carrier substrate 2, an electrically conductive layer 3, an intermediate adhesive layer 11, the decorative layers 12d, 12g, 12h and 12i, an adhesion-promoting layer 4 and a contact-strengthening layer 7.

The decorative layers 12d, 12g, 12h and 12i, as shown in FIG. 6a, are arranged in the same region as the intermediate adhesive layer 11, thus the decorative layers 12d, 12g, 12h and 12i are arranged congruent with the intermediate adhesive layer 11 when viewed perpendicularly to a plane spanned by the carrier substrate 2. It is hereby achieved in particular that the contacting region 20 can be reliably and robustly contacted despite the additional decorative layers 12d, 12g, 12h and 12i.

The decorative layers 12g, 12h and 12i here form, for example, a thin-film layer system. The decorative layer 12g is a semi-transparent reflective layer, preferably a very thin and thus semi-transparent metal layer, for example a layer made of chromium with a layer thickness of 5 nm. The decorative layer 12h is a spacer layer, preferably made of a transparent dielectric, for example $MgF_2$, $SiO_2$ or a polymer. The layer thickness of the spacer layer here is preferably chosen such that it satisfies the $\lambda/2$ or $\lambda/4$ condition for $\lambda$ in the visible light wavelength range for a defined viewing angle, i.e. the optical depth of the decorative layer 12h lies in the range of a half or a quarter of light wavelengths and thus, in the case of the interference of the light reflected back by the boundary surface between the decorative layer 12g and the spacer layer 12h on the one hand and the boundary surface between the spacer layer 12h and the decorative layer 12i on the other hand, a color shift effect dependent on the viewing angle is generated in the range of the light visible to the human eye. The decorative layer 12i is a metallic reflective layer, preferably an opaque metal layer, for example a layer made of aluminum with a layer thickness of 30 nm.

With respect to the design of the further layers in FIG. 6a, reference is made here to the above statements.

Figure 6B:
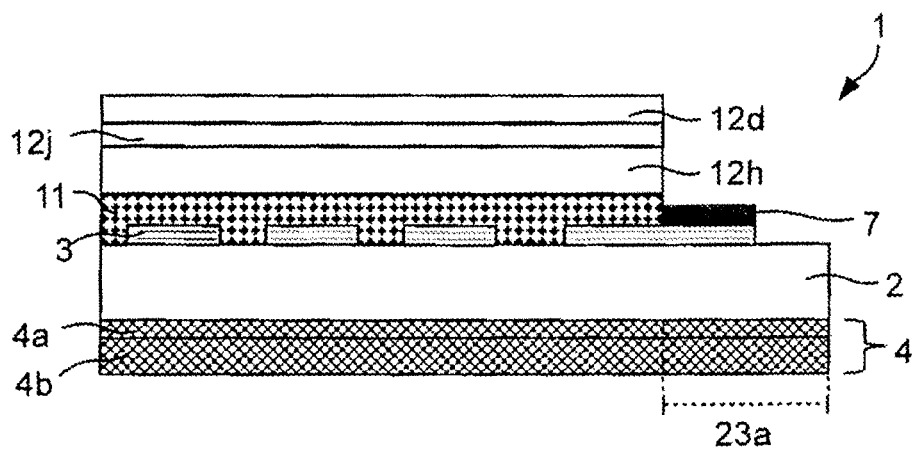
Figure 6C:
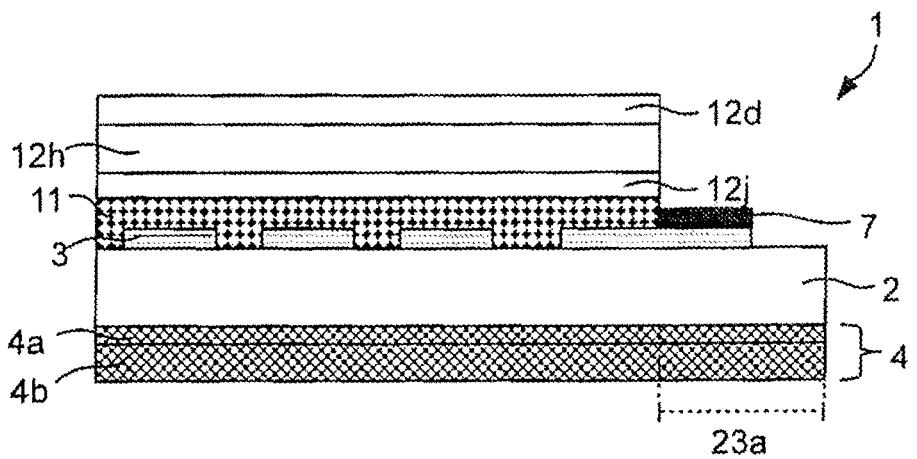

FIG. 6b and FIG. 6c in each case show a film 1 with a carrier substrate 2, an electrically conductive layer 3, an intermediate adhesive layer 11, the decorative layers 12d, 12j and 12h, an adhesion-promoting layer 4 and a contact-strengthening layer 7.

The decorative layer 12h is a transparent layer which acts as a spacer layer. An optical depth effect is generated by the spacer layer 12h. As shown in FIG. 6b and FIG. 6c, the decorative layer 12h can be arranged behind and/or in front of the decorative layer 12j in the direction of view. However, it is also possible for the decorative layer 12h to be arranged, for example, between two decorative layers. The optically transparent layer 12h has a layer thickness which is a multiple of the layer thickness of the decorative layer 12j. However, it is also possible for the layer thickness of the decorative layer 12h to be substantially equal to the layer thickness of the decorative layer 12j. The layer thickness of the optically transparent layers 12h is preferably between 0.5 µm and 500 µm, further preferably between 10 µm and 100 µm. The optically transparent layers 12h consists, for example, of optically transparent varnishes and/or optically transparent films, in particular made of PET, PMMA or PC.

The decorative layer 12j can be, for example, a metallic layer, for example a layer made of aluminum with a layer thickness of 20 nm. The decorative layer 12j is advantageously implemented in areas and forms a pattern.

With respect to the design of the further layers in FIG. 6b and FIG. 6c, reference is made here to the above statements.

Figure 7:
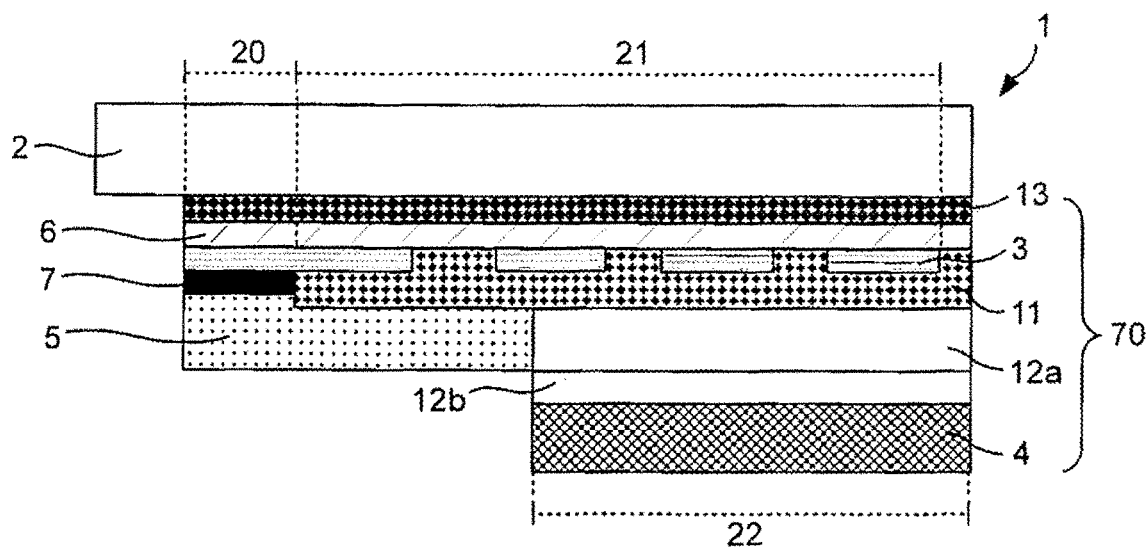
FIG. 7 schematically shows a sectional representation of a film

FIG. 7 shows a film 1 with a carrier substrate 2, a separating layer 13, a protective varnish layer 6, an electrically conductive layer 3, an intermediate adhesive layer 11, a detachment layer 5, the decorative layers 12a and 12b, an adhesion-promoting layer 4 and a contact-strengthening layer 7.

The separating layer 13 is preferably a wax layer and/or a polymer layer made of, for example, acrylates and/or melamine formaldehyde resin-crosslinked varnishes. The separating layer 13 preferably has a layer thickness of less than 1 µm. The separating layer 13 shown in FIG. 7 is a wax layer with a layer thickness of 0.5 µm.

Thus, it is possible for the film 1 to be a transfer film, which has a carrier ply, in particular the carrier substrate 2, as well as a transfer ply 70 that can be detached from the carrier ply, in particular the carrier substrate 2. The separating layer 13, which makes it possible to detach the transfer ply 70 from the carrier ply, in particular the carrier substrate 2, is advantageously arranged between the carrier ply, in particular the carrier substrate 2, and the transfer ply 70. It is hereby possible to apply only the transfer ply 70 to a target substrate, in particular by means of hot stamping. In FIG. 7 the transfer ply 70 is formed by the separating layer 13, the protective varnish layer 6, the electrically conductive layer 3, the intermediate adhesive layer 11, the detachment layer 5, the decorative layers 12a and 12b, the adhesion-promoting layer 4 and the contact-strengthening layer 7. The separating layer 13 can be removed after application of the transfer ply of the film 1 to a target substrate.

It is further possible for the separating layer 13 to be a single- or multi-layered separating layer. The separating layer 13 is preferably arranged between the carrier substrate 2 and the protective varnish layer 6. It is hereby possible, after application of the film 1 to a target substrate and after removal of the carrier substrate 2 and the separating layer 13, for the protective varnish layer 6 to form the outermost ply and to protect the electrically conductive layer 3 from environmental influences. Further, it can hereby be achieved that the carrier substrate 2 can be detached after application of the film 1 to the target substrate. An even better deformability and/or stretchability of the applied film can hereby be achieved, as the comparatively thick and less deformable and/or stretchable carrier substrate 2 has been removed. The protective varnish layer 6 takes on the function of protecting the film 1.

With respect to the design of the further layers in FIG. 7, reference is made here to the above statements.

Figure 8:
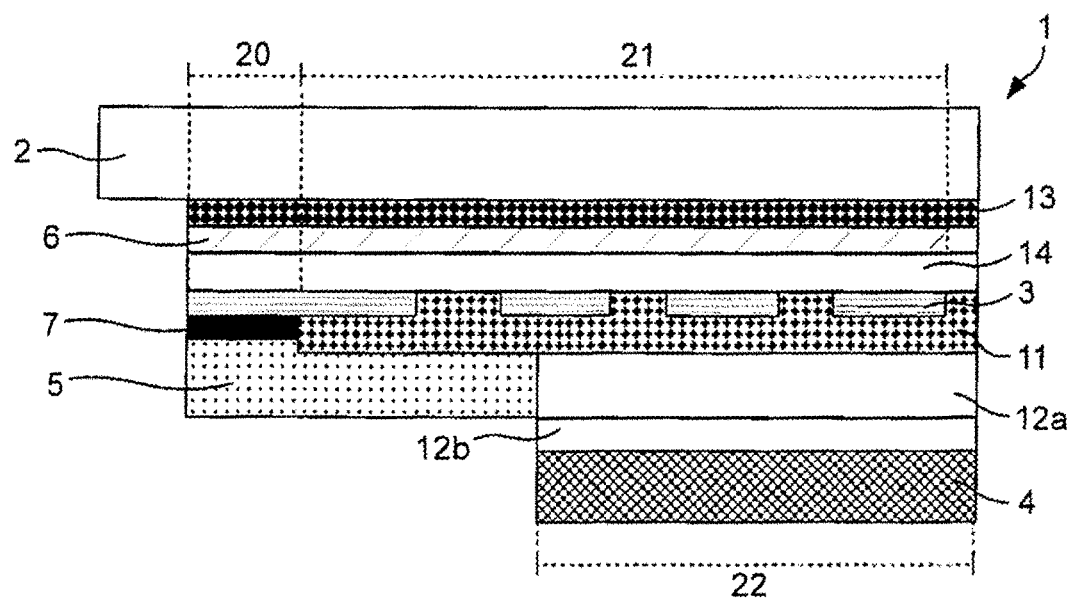
FIG. 8 schematically shows a sectional representation of a film

FIG. 8 shows a film 1 with a carrier substrate 2, a separating layer 13, a protective varnish layer 6, a foundation varnish layer 14, an electrically conductive layer 3, an intermediate adhesive layer 11, a detachment layer 5, the decorative layers 12a and 12b, an adhesion-promoting layer 4 and a contact-strengthening layer 7.

The foundation varnish layer 14 is advantageously a foundation varnish layer that can be vaporized for metallization, which is arranged in particular between the protective varnish layer 6 and the electrically conductive layer 3.

The foundation varnish layer 14 is preferably a layer made of polymers and/or copolymers, in particular comprising polymethyl (meth)acrylate (PMMA), polyester, polyurethane (PU) or polyvinyl chloride (PVC). Less preferably, the foundation varnish layer 14 contains natural resins, preferably colophony, phenol resins, isocyanate (NCO)-crosslinked binders, for example melamine formaldehyde condensation resins (MF), melamine phenol formaldehyde resins (MPF), melamine polyesters, melamine urea formaldehyde resins (UMF), poly(organo)siloxanes or radiation-curing binders.

Further, the foundation varnish layer 14 preferably has a layer thickness between 0.1 µm and 5 µm, further preferably between 0.1 µm and 2 µm.

The foundation varnish layer 14 shown in FIG. 8 is a layer made of PMMA with a layer thickness of 1.5 µm.

It can advantageously be provided that, because of the separating layer 13 arranged between the carrier substrate 2 and the protective varnish layer 6, the adhesive force between the carrier substrate 2 and the protective varnish layer 6 is 20% to 80%, preferably 30% to 70%, smaller than the adhesive force between the protective varnish layer 6 and the foundation varnish layer 14 and/or the at least one electrically conductive layer 3 and/or the adhesion-promoting layer 4.

Thus, it is possible, because of the separating layer 13 arranged between the carrier substrate 2 and the protective varnish layer 6, for the adhesive force between the carrier substrate 2 and the protective varnish layer 6 to be 20% to 80%, preferably 30% to 70%, smaller than the adhesive force between the layers of the transfer ply, in particular selected from the group protective varnish layer, foundation varnish layer, at least one electrically conductive layer, one or more decorative layers, adhesion-promoting layer, intermediate adhesive layer, dielectric layer, darkening layer and contact-strengthening layer. The adhesive forces were determined with the aid of the Zwick Z005 tensile testing machine from Zwick GmbH & Co. KG, Ulm, Germany. For this, the transfer film was bonded flat to the lower holder. The layer to be detached was then detached at a right angle by the tensile test. The detachment forces were determined via the load cell.

With respect to the design of the further layers in FIG. 7, reference is made here to the above statements.

Figure 9:
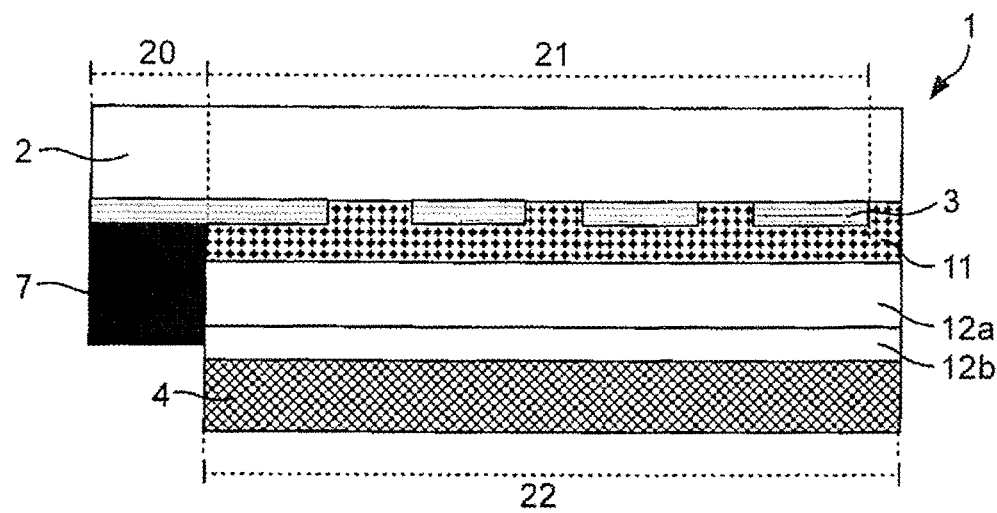
FIG. 9 schematically shows a sectional representation of a film

FIG. 9 shows a film 1 with a carrier substrate 2, an electrically conductive layer 3, an intermediate adhesive layer 11, the decorative layers 12a and 12b, an adhesion-promoting layer 4 and a contact-strengthening layer 7.

As shown in FIG. 9, the carrier film 2 terminates at both ends flush with the further layers of the film 1. The adhesion-promoting layer 4, as shown in FIG. 9, is present in the region 22 and not present in the region 20.

It is further possible for the film 1 to be printed with an adhesive varnish in the contacting region 20, completely or partially patterned, for example in a grid. Thus, it is possible for an adhesive varnish to be applied to the contact-strengthening layer 7.

The adhesive varnish is preferably an electrically conductive adhesive varnish.

Alternatively, it is also possible for the film 1 not to have the adhesive varnish in the contacting region 20. During the application of the film 1 to a target substrate, the electrical (press) contact thus forms (by heat and pressure) between film 1 and target substrate, in particular in the contacting region 20. It is possible here for the electrical (press) contact to have a durable action due to the bonding, in particular due to the adhesive varnish.

With respect to the design of the layers in FIG. 9, reference is made here to the above statements.

Figure 10:
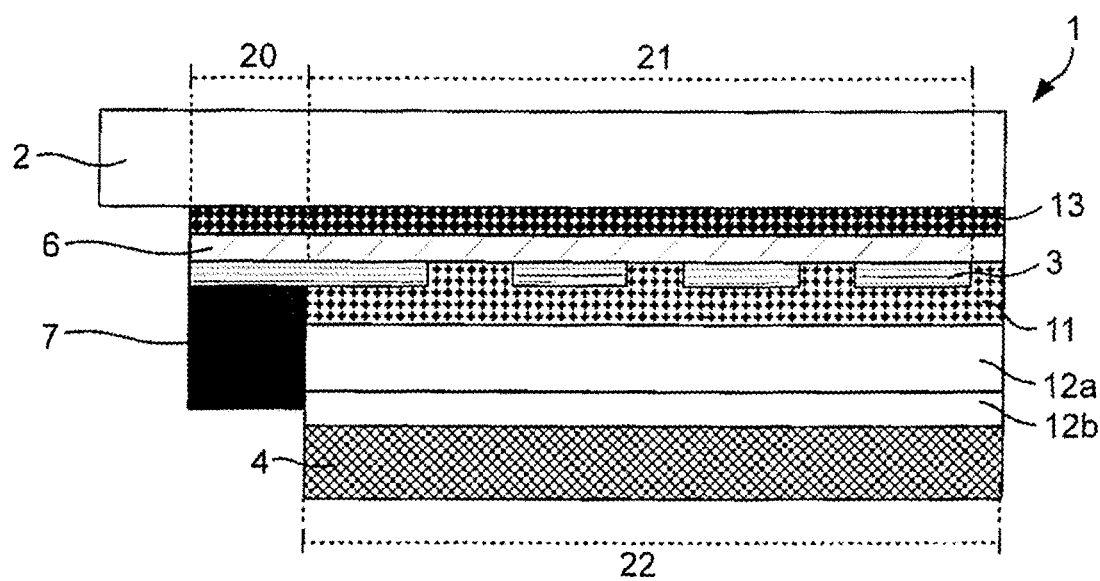
FIG. 10 schematically shows a sectional representation of a film

FIG. 10 shows a film 1 with a carrier substrate 2, a separating layer 13, a protective varnish layer 6, an electrically conductive layer 3, an intermediate adhesive layer 11, the decorative layers 12a and 12b, an adhesion-promoting layer 4 and a contact-strengthening layer 7.

The film 1 shown in FIG. 10, like the film shown in FIG. 9, can also be printed with an adhesive varnish completely or partially patterned in the contacting region 20. As shown in FIG. 10, the carrier layer 2 overhangs the further layers of the film on one side. It is hereby made possible that the carrier film 2 can be easily detached after an application of the film 1 to a target substrate. A detachment of the carrier layer 2 is made possible by the separating layer 6 arranged between the carrier layer 2 and the protective varnish layer 6.

With respect to the design of the layers in FIG. 10, reference is made here to the above statements.

Figure 11A:
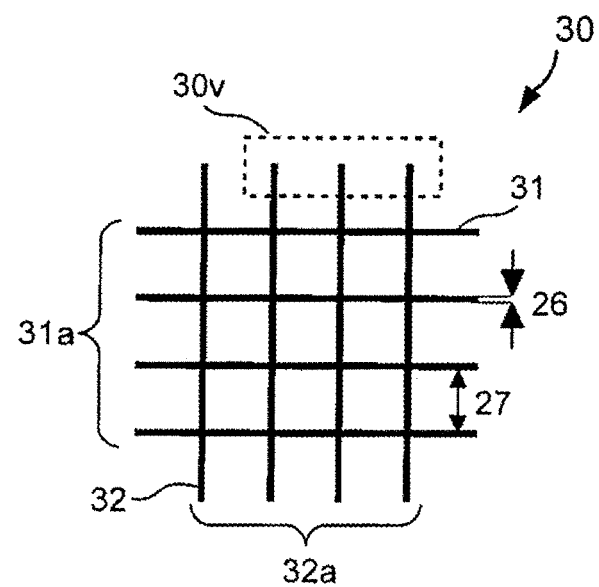
FIG. 11a schematically shows conducting paths in a top view

FIG. 11a shows conducting paths 31, 32 in a top view. The conducting paths 31, 32 here are formed by correspondingly molded electrically conductive layers 30 made of silver. The conducting paths 31, 32 have a width 26 between 0.2 μm and 20 μm, preferably between 4 μm and 15 μm, and a distance 27 from each other greater than 10 μm, preferably greater than 20 μm, with the result that the conducting paths 31, 32 lie below the resolving power of the human eye. The conducting paths 31a are formed by a first electrically conductive layer and the conducting paths 32a are formed by a second electrically conductive layer. The conducting paths 31a here form driver conducting paths and the conducting paths 32a form sensor conducting paths. The driver conducting paths are, for example, acted on by an alternating current by means of a driver circuit. The capacitance generated at the intersection points of the conducting paths 31a and 32a is changed when the film which has the electrically conductive layers 30 is touched, for example by a finger. This is detected by the sensor conducting paths 32a by means of a sensor circuit connected to the sensor conducting paths 32a and the location of the touch or the capacitance change is determined.

Figure 11B:
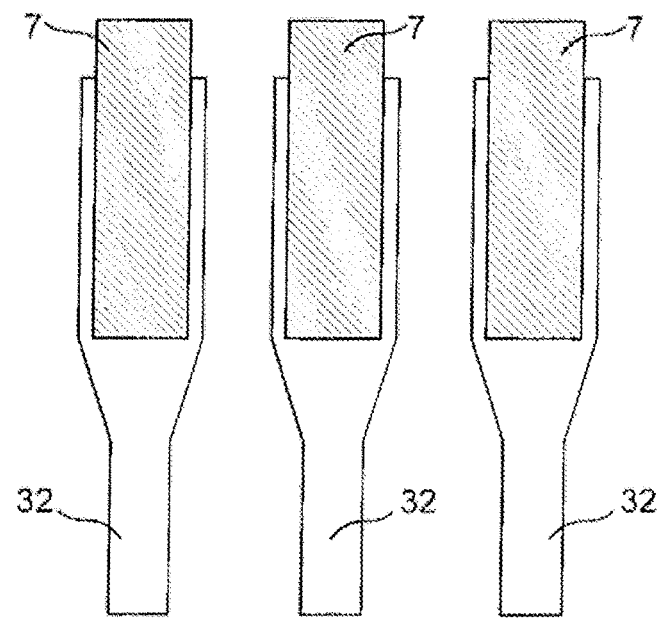

FIG. 11b shows an enlarged section 30v from FIG. 11a. The conducting paths 32 formed by the electrically conductive layer, as shown in FIG. 11b, form three contacting regions separated from each other. The three contacting regions have, for example, a minimum distance from each other of 0.5 mm, in order thereby to effect in particular an electrical insulation of the contacting regions. The contact-strengthening layer 7 is applied to the conducting paths 32. The contact-strengthening layer 7 shown in FIG. 11b is a layer made of a carbon conductive varnish with a layer thickness of 4.5 μm. The regions of surface shown in FIG. 11b occupied by the contact-strengthening layer 7 have a size of 0.3 mm×2.0 mm. The regions of surface occupied by the contact-strengthening layer 7 overhang the conducting paths 32 broadened in the end region at least in areas. It is hereby possible to broaden the contacting region formed by the conducting paths 32, as long as an electrical connection between the contacting region and the contact-strengthening layer 7 is guaranteed.

Figure 12:
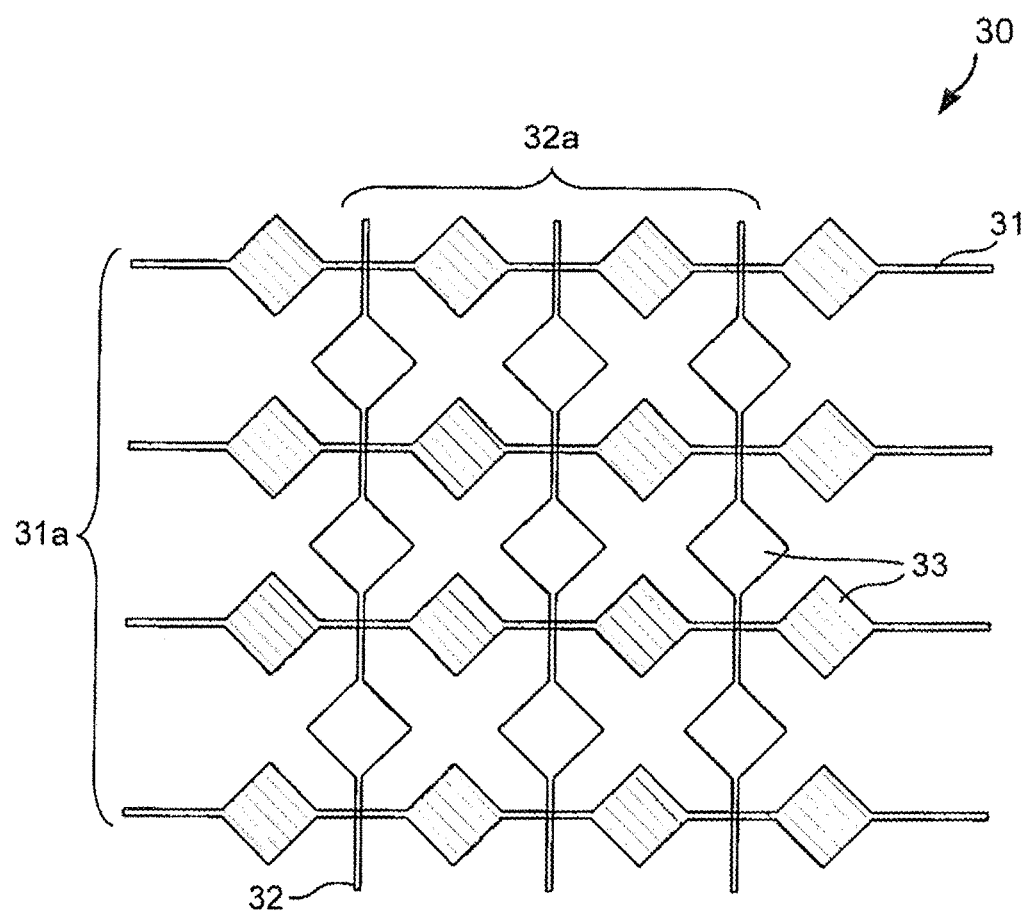
FIG. 12 schematically shows conducting paths in a top view

FIG. 12 shows a further embodiment variant of the conducting paths 31, 32 in a top view. The conducting paths 31, 32 here are formed by correspondingly molded electrically conductive layers 30 made of silver. As shown in FIG. 12, the conducting paths 31a of the first electrically conductive layer and the conducting paths 32a of the second electrically conductive layer are structured, in particular structured in such a way that the conducting paths 31a, 32a of the first and of the second electrically conductive layer form a plurality of surface elements 33.

The surface elements 33 in FIG. 12 are formed rhombus-shaped or diamond-shaped, with the result that the first and second electrically conductive layers in each case have a so-called diamond structure. This diamond structure, as shown in FIG. 12, is formed by a plurality of rhombus-shaped surface elements 33 along linear conducting paths 31, 32. The first and second electrically conductive layers here in each case have a plurality of diamond structures spaced apart from each other. The first and second electrically conductive layers are arranged one above the other in such a way that the two diamond structures are arranged at a right angle to each other, thus rotated 90° relative to each other. The surface elements 33 of the first electrically conductive layer here are arranged "in a gap" in the free intermediate spaces between the surface elements 33 of the second electrically conductive layer, wherein the linear conducting paths 31, 32 of the electrically conductive layers intersect in the intermediate spaces between the surface elements. In this embodiment variant, a precise position of the surface elements 33 relative to each other is particularly important and the surface elements 33 are preferably arranged register-accurate relative to each other with a tolerance of less than 0.25 mm, preferably less than 0.1 mm.

As shown in FIG. 12, the conducting paths 31, 32 in the region of the surface elements 33 are molded according to the shape of the surface elements 33 such that the surface elements are filled with the material of the electrically conductive layers over the whole surface. It is also possible for the conducting paths merely to run along the surface elements, with the result that the surface elements are merely framed by the conducting paths at least in areas. The conducting paths then, for example, run straight sometimes and then run in a triangle in the regions of the surface elements. The conducting paths 31, 32, as shown in FIG. 12, are further arranged according to a regular grid, wherein the electrically conductive layers appear at least semi-transparent because of the gridding.

Figure 13:
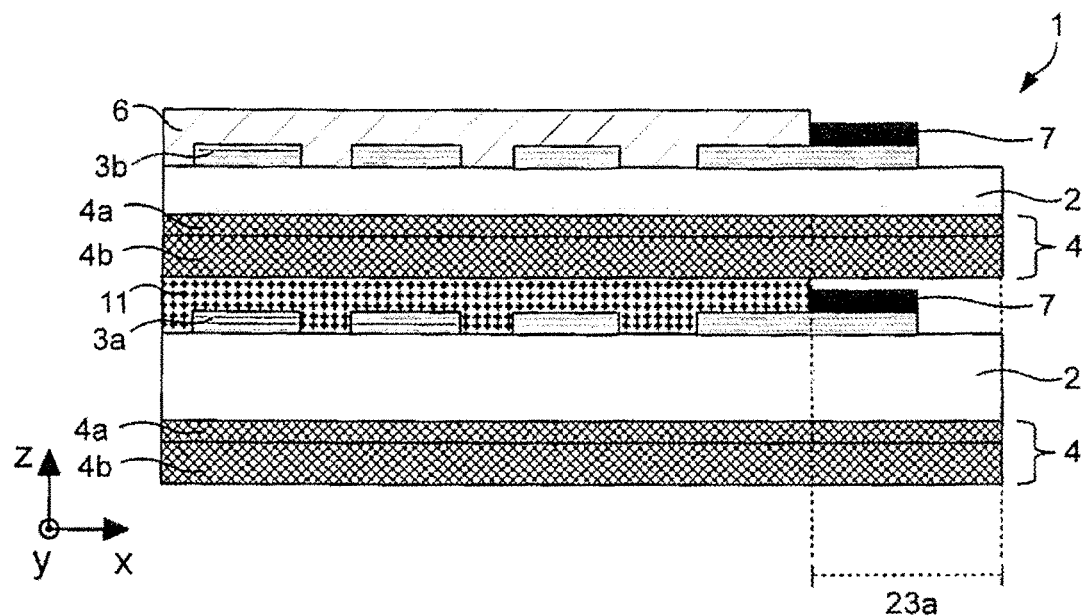
FIG. 13 schematically shows a sectional representation of a film

FIG. 13 shows a film 1 with a first electrically conductive layer 3a, a second electrically conductive layer 3b, the carrier substrates 2, a protective varnish layer 6, the adhesion-promoting layers 4, an intermediate adhesive layer 11 and the contacting regions 7.

As shown in FIG. 13, the electrically conductive layers 3a and 3b are provided in each case on one carrier substrate 2. The protective varnish layer 6 is applied to the second electrically conductive layer 3b in areas, but not to the contacting region. The intermediate adhesive layer 11 is applied to the first electrically conductive layer 3a in areas. The intermediate adhesive layer 11 covers the functional region formed by the electrically conductive layer 3, but not the contacting region. As shown in FIG. 13, the carrier substrate 2 with the second electrically conductive layer 3b is applied to the first electrically conductive layer 3a by means of the adhesion-promoting layer 4 and the intermediate adhesive layer 11. The intermediate adhesive layer 11 can also be a protective varnish layer, with the result that the first and the second electrically conductive layers 3a and 3b are merely arranged one above the other by means of the adhesion-promoting layer 4. The electrically conductive layers 3a and 3b are arranged overlapping in FIG. 13. The first electrically conductive layer 3a and the second electrically conductive layer 3b are preferably positioned register-accurate relative to each other, in particular with a tolerance of less than 0.25 mm, preferably with a tolerance of less than 0.1 mm. The electrically conductive layers 3a, 3b here, as already explained, preferably have conducting paths, which are arranged in a grid. This grid can be regular or irregular. The grid can be constructed in particular from grid elements, such as lines and/or surface elements. The grid elements here can form so-called sensor cells.

With respect to the design of the further layers in FIG. 13, reference is made here to the above statements.

Figure 14:
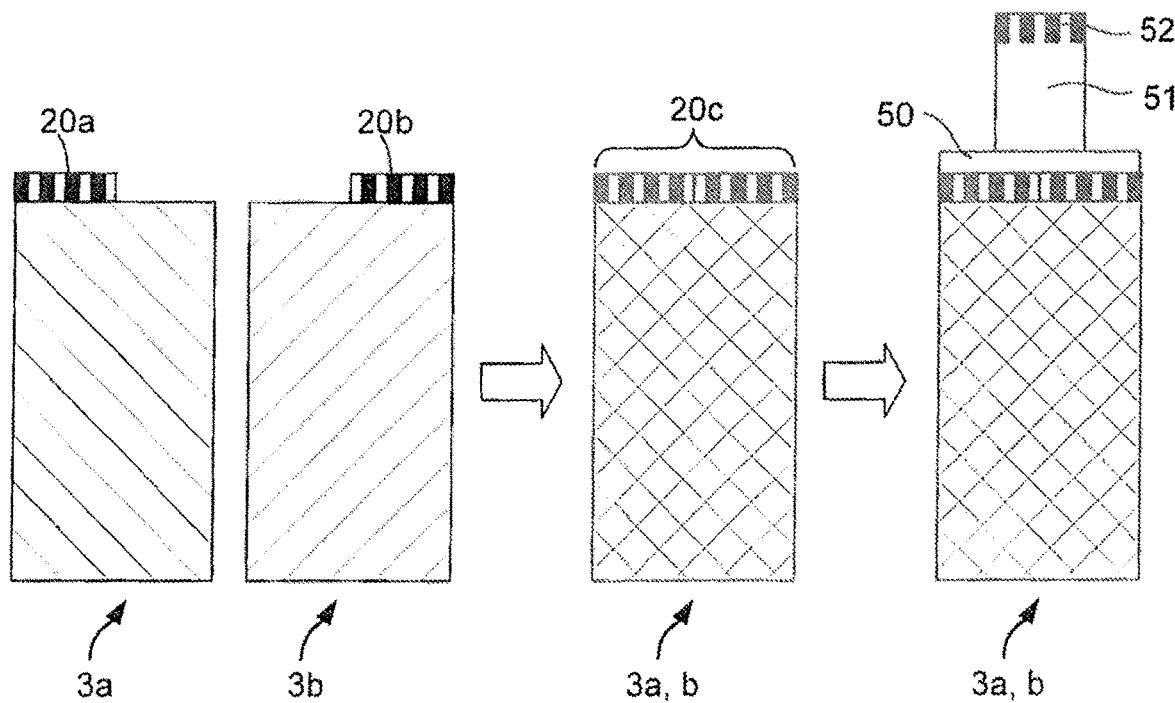
FIG. 14 schematically shows top views of films

FIG. 14 shows top views of electrically conductive layers 3a, 3b. Thus, 3a relates to a first electrically conductive layer which is contactable in the in the contacting region 20a. 3b further relates to a second electrically conductive layer which is contactable in the contacting region 20b. The electrically conductive layers 3a, 3b, as shown for example in FIG. 13, can in each case be arranged on a carrier substrate 2. If the two electrically conductive layers 3a and 3b are now arranged one above the other, as indicated in top view in 3a, b, the two contacting regions 20a, 20b are now arranged next to each other and thus form a common contacting region 20c. With respect to the arrangement of the electrically conductive layers 3a and 3b one above the other, reference is made here to the above statements. The common contacting region 20c is contacted electrically, for example, by means of an adapter element 51. The adapter element 51 is preferably a flexible adapter element 51, which electrically contacts the contact points in the common contacting region 20c and connects externally electrically conductively to a further contact element 52. The contacting between the common contacting region 20c and the adapter element 51 is preferably effected by means of a connection element 50 made of conductive adhesive, in particular by means of ACF bonding (ACF=anisotropic conductive film). The further contact element 52 can be, for example, an in particular standardized plug connector, for example a ZIF connector (ZIF=zero insertion force).

Figure 15A:
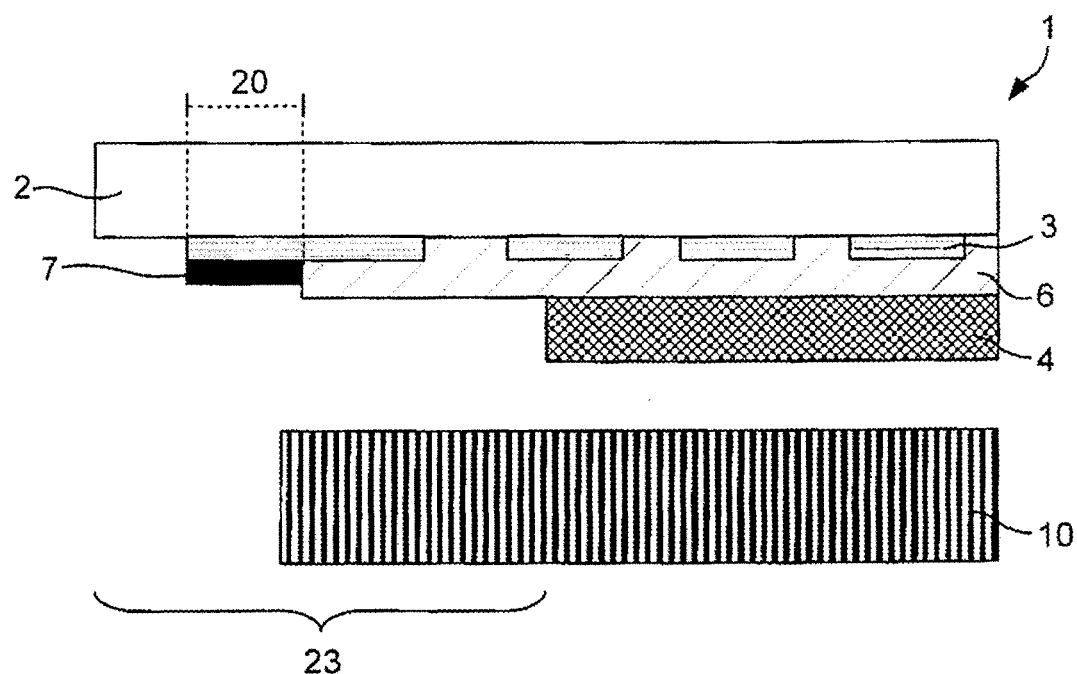
FIG. 15a and FIG. 15b schematically show method steps for producing an electrical functional element FIG. 16a and FIG. 16b schematically show method steps for producing an electrical functional element FIG. 17a and FIG. 17b schematically show method steps for producing an electrical functional element FIG. 18a and FIG. 18b schematically show method steps for producing an electrical functional element FIG. 19a and FIG. 19b schematically show method steps for producing an electrical functional element FIG. 20a and FIG. 20b schematically show method steps for producing an electrical functional element FIG. 21a and FIG. 21b schematically show method steps for producing an electrical functional element FIG. 22a and FIG. 22b schematically show method steps for producing an electrical functional element FIG. 23a to FIG. 23d schematically show top views of a target substrate, films and an electrical functional element FIG. 24a to FIG. 24e schematically show method steps for producing a film FIG. 25a and FIG. 25b schematically show a method step for producing a film FIG. 26a to FIG. 26c schematically show method steps for reshaping a film and/or an electrical functional element
Figure 15B:
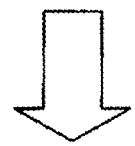
Figure 15B:
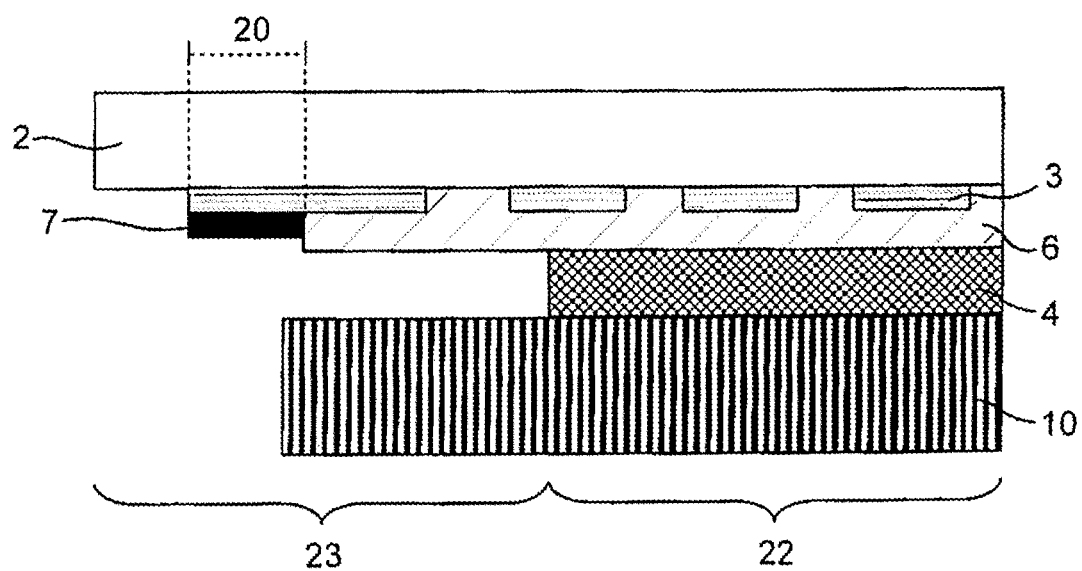

FIG. 15a and FIG. 15b show method steps for producing an electrical functional element. FIG. 15a shows the use of a film 1 according to the invention for application to a target substrate 10. The target substrate 10 can be, for example, a display. With respect to the design of the layers of the film 1, reference is made here to the above statements. As shown in FIG. 15a, the film does not have an adhesion-promoting layer 4 in the region 23. The region 23 thus forms a tail region, in which the contacting region 20 lies. As shown in FIG. 15b, the film 1 is applied to the target substrate 10, whereby an electrical functional element is formed. If, for example, the electrical functional structure forms a touch sensor panel, in particular a capacitive sensor panel, which provides a touchpad functionality, and the target substrate is a display, for example a touchscreen can be produced. In the state shown in FIG. 15a where the film 1 is not applied, it is possible for the adhesion-promoting layer 4 to have a cloudy visual appearance, for example because of a surface roughness of the adhesion-promoting layer 4. After application of the film 1 to the target substrate 10, as shown in FIG. 15b, the adhesion-promoting layer 4 is now preferably highly transparent and clear, as for example the surface roughness of the adhesion-promoting layer 4 has been smoothed out by the application process. The application of the film 1 can be effected by hot lamination. It is further possible for the film 1 to be applied to the target substrate 10 from a roll by means of hot lamination. The film web speed here is preferably between 1.5 m/min and 3.5 m/min. The hot lamination is preferably effected at a temperature in the range between 80° C. and 300° C., preferably between 200° C. and 290° C., further preferably between 240° C. and 270° C., and/or with a stamping pressure in the range between 200 bar and 2000 bar, preferably between 500 bar and 1500 bar.

The electrical functional element shown in FIG. 15b can be raised in the tail region 23, with the result that the contacting region 20 is reliably accessible and can be contacted reliably in further steps. In the region 22, which has the adhesion-promoting layer 4, the film 1 adheres to the target substrate 10. In the region 22 the adhesion of the film 1 is at least so strong that the film 1 does not detach from the target substrate 10 in the case of normal use. For example, the adhesion is tesa-secure, i.e. the adhesive force is so great that the film 1 cannot be removed from the target substrate 10 by tearing in a 90° peeling process with a tesa 4104 adhesive tape from tesa, Norderstedt, Germany, secured to the film 1. The layers 2, 3, 6 and 4 of the film 1 are designed transparent, with the result that the target substrate 10 is easily recognizable to a human observer through the film 1. If the target substrate 10 is, for example, a thin glass layer or a transparent layer made of PMMA, the electrical functional element formed by the film 1 and the thin glass layer or the PMMA layer is transparent overall. Thus, the electrical functional element made of the film 1 and the PMMA layer can have, for example, a transmittance for light, in particular from the wavelength range between 300 nm and 800 nm, preferably between 380 nm and 780 nm, of 84.6%, wherein the PMMA layer alone has a transmittance of 93.6%.

Figure 16A:
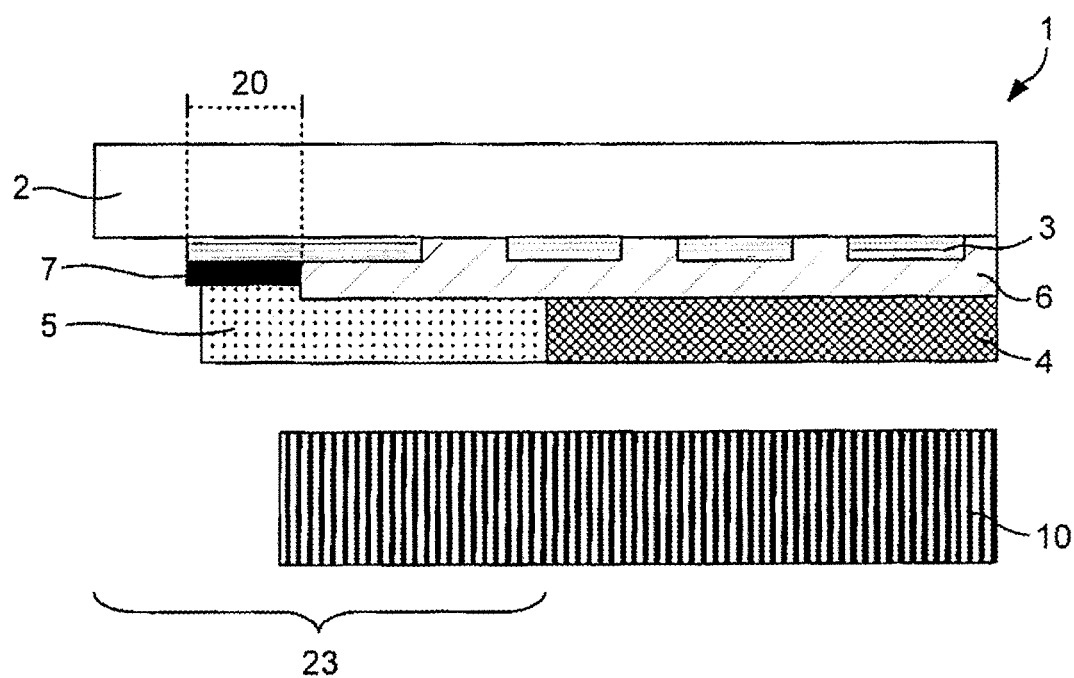
Figure 16B:
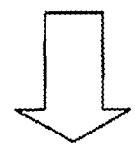
Figure 16B:
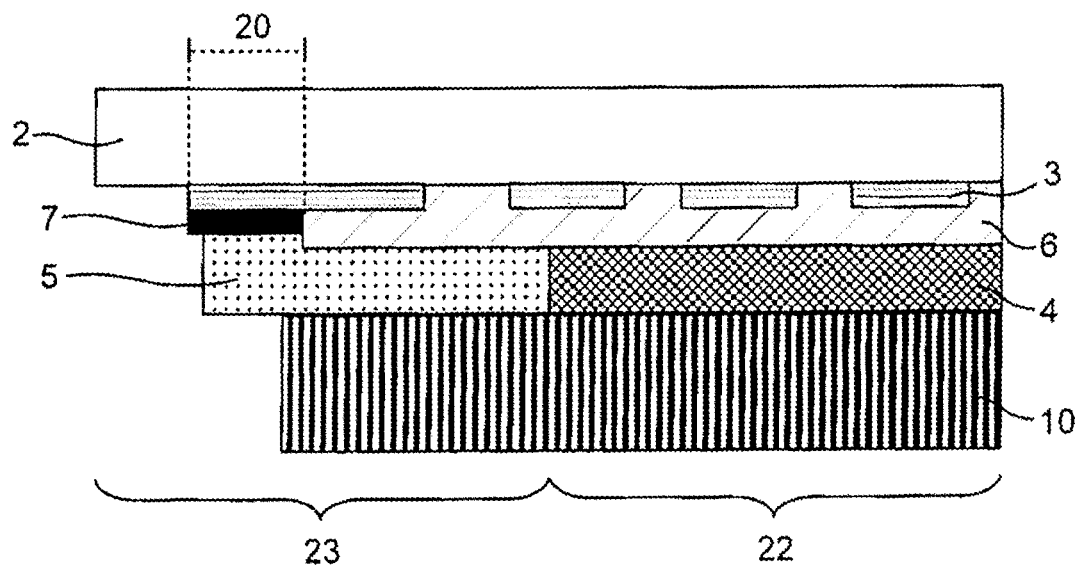

FIG. 16a and FIG. 16b show method steps for producing an electrical functional element. FIG. 16a and FIG. 16b corresponding to FIG. 15a and FIG. 15b, with the difference that the film 1 additionally comprises the detachment layer 5. The detachment layer 5 ensures that the film 1 does not adhere to the target substrate 10 in the region 23. With respect to the design of the detachment layer 5, reference is made here to the above statements. The film 1 shown in FIG. 16b can therefore, exactly like the film shown in FIG. 15b, be raised in the region 23, which comprises the contacting region 20. In the region 22, in contrast, the film 1 adheres to the target substrate 10.

Figure 17A:
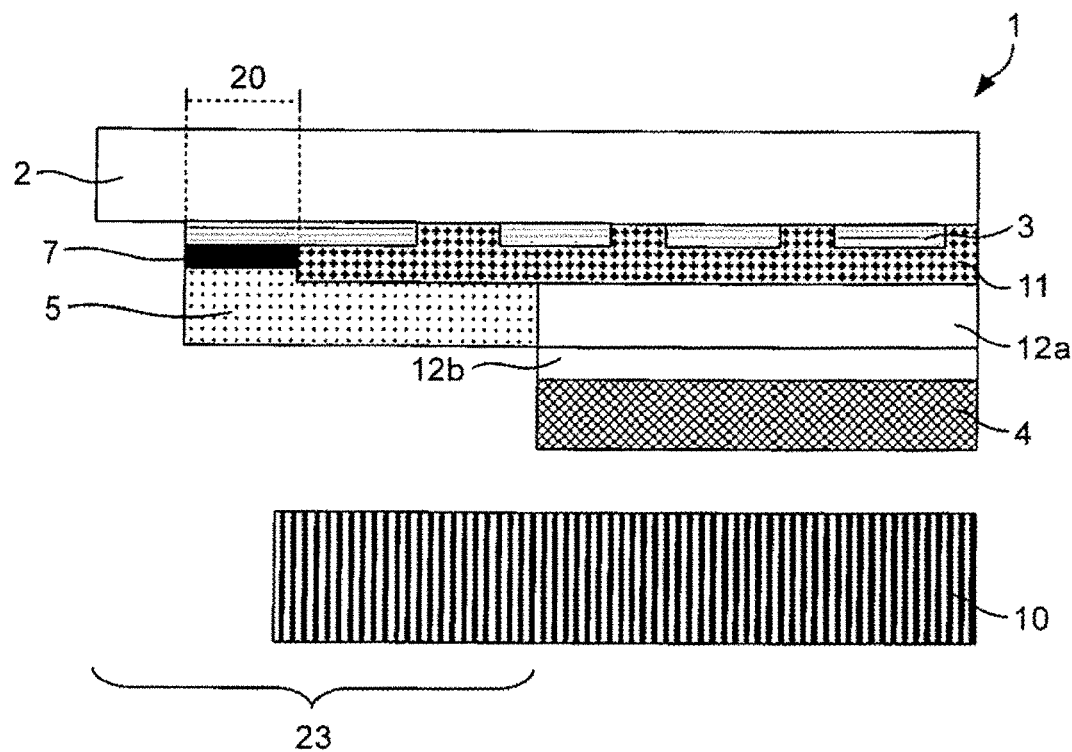
Figure 17B:
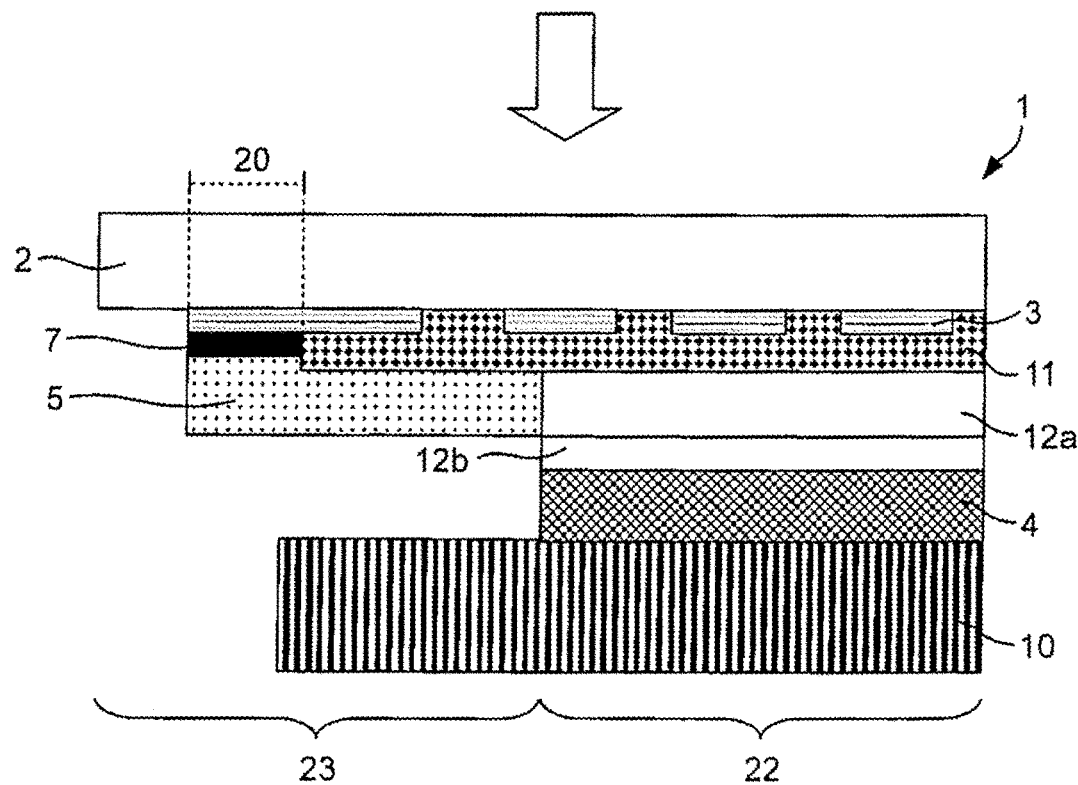

FIG. 17a and FIG. 17b show method steps for producing an electrical functional element. FIG. 17a and FIG. 17b corresponding to FIG. 15a and FIG. 15b, with the difference that the film 1 additionally comprises the detachment layer 5, the intermediate adhesive layer 11 and the decorative layers 12a and 12b. With respect to the design of the layers 5, 11, 12a and 12b, reference is made here to the above statements. The film 1 shown in FIG. 17b can therefore, exactly like the film shown in FIG. 15b, be raised in the region 23, which comprises the contacting region 20. In the region 22, in contrast, the film 1 adheres to the target substrate 10.

Figure 18A:
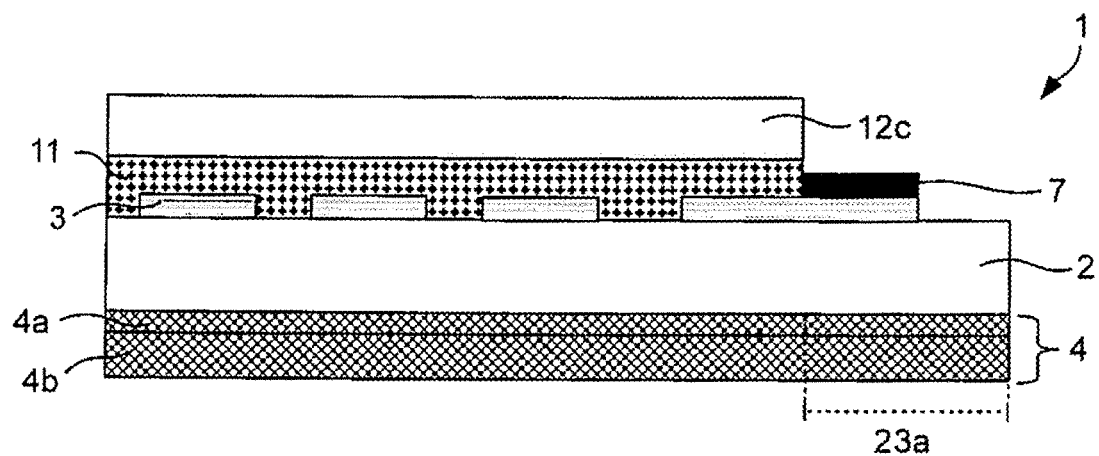
Figure 18B:
Figure 18B:
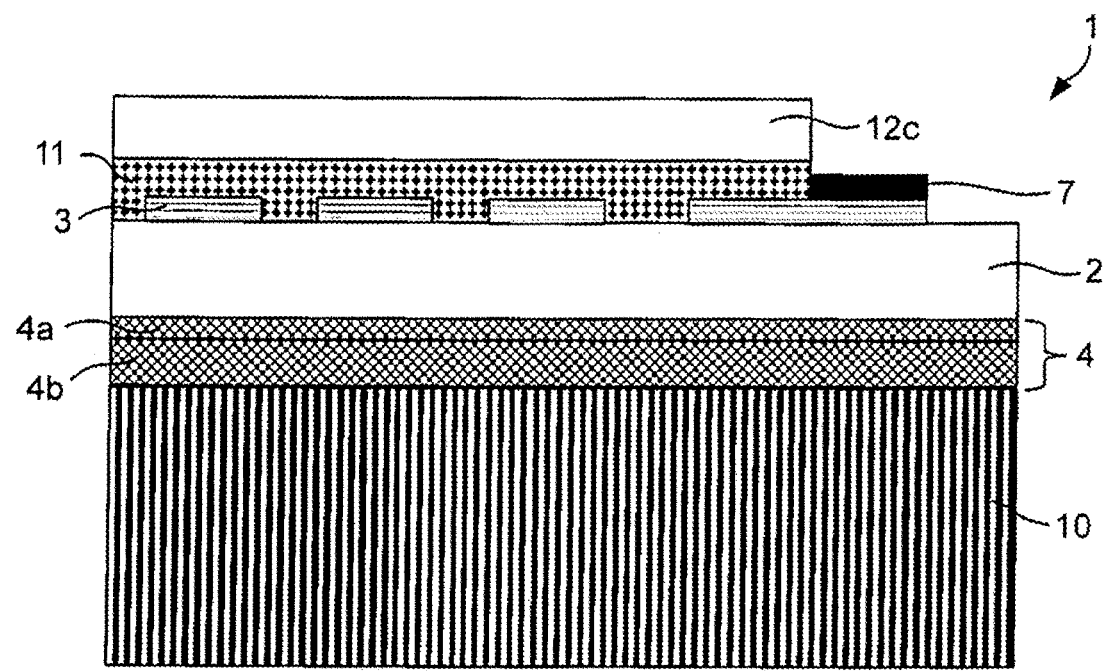

FIG. 18a and FIG. 18b show method steps for producing an electrical functional element. FIG. 18a shows the use of a film 1 according to the invention for application to a target substrate 10. With respect to the design of the layers of the film 1, reference is made here to the above statements. As shown in FIG. 18a, the film 1 has an adhesion-promoting layer 4 over the whole surface, but the intermediate adhesive layer 11 and the decorative layer 12c are not applied in the contacting region. However, it is also possible for the adhesion-promoting layer 4 not to be present in the region 23a, with the result that the contacting region can be raised, for example, to further facilitate the contacting of the target substrate 10. As shown in FIG. 18b, the film 1 is applied to the target substrate 10, whereby an electrical functional element is formed. In the state shown in FIG. 18a where the film 1 is not applied, it is possible for the adhesion-promoting layer 4 to have a cloudy visual appearance, for example because of a surface roughness of the adhesion-promoting layer 4. After application of the film 1 to the target substrate 10, as shown in FIG. 18b, the adhesion-promoting layer 4 is now preferably highly transparent and clear, as for example the surface roughness of the adhesion-promoting layer 4 has been smoothed out by the application process. The application of the film 1 can be effected, as already explained, by hot lamination. It is also possible, as an alternative to the hot lamination, for the film 1 to be applied to the target substrate 10 by injection of an injection-molding material, wherein in particular the injection-molding material forms the target substrate 10. Thus, it is possible for the film 1 to be securely joined to the injection-molding material by the adhesion-promoting layer 4.

Depending on the design of the target substrate 10, it is possible, for example, for the electrical functional element formed from the film 1 and the target substrate 10 to be a mobile telephone, such as for example a smartphone or a PDA, a tablet computer, a cash machine, a ticket machine, a gaming machine, a games console, an operating part of a household appliance or of a motor vehicle or, for example, a touchscreen. It is also possible for the electrical functional element to be an input device, in particular a touch panel. It is also possible for the electrical functional element formed from the film 1 and target substrate 10 to be an intermediate product which is used for or in an end product in further processing steps. The above-named electrical functional elements are preferably used for processing information, wherein the information is detected, for example, by the electrical functional structure formed as a touch sensor panel, in the form of the touch position.

Figure 19A:
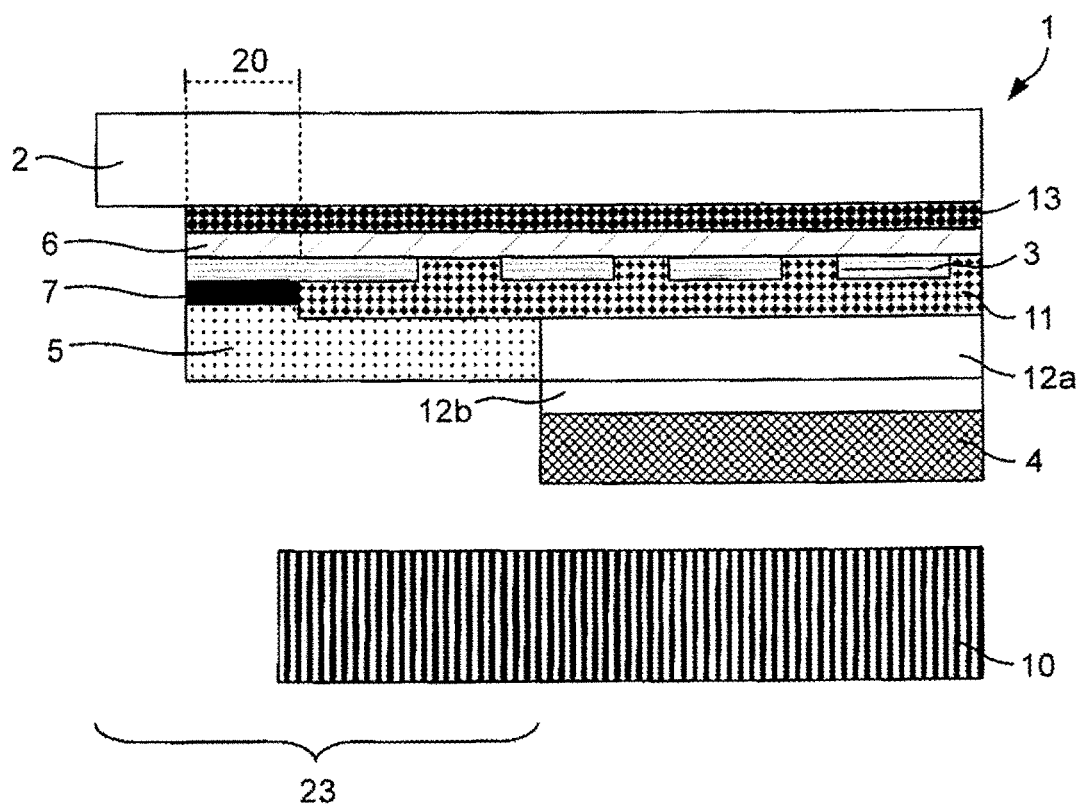
Figure 19B:
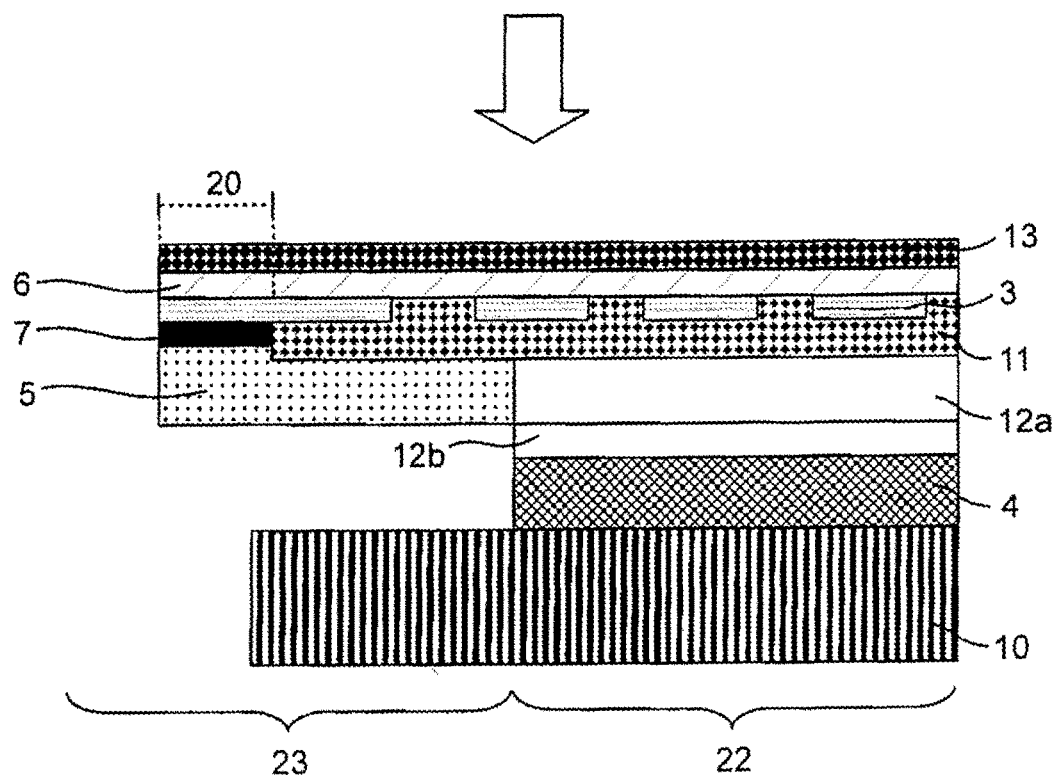

FIG. 19a and FIG. 19b show method steps for producing an electrical functional element. FIG. 19a shows the use of a film 1 according to the invention for application to a target substrate 10. With respect to the design of the layers of the film 1, reference is made here to the above statements. As shown in FIG. 19a, the film 1 does not have an adhesion-promoting layer 4 in the region 23. The region 23 thus forms a tail region, in which the contacting region 20 lies. As shown in FIG. 19b, the film 1 is applied to the target substrate 10, whereby an electrical functional element is formed. In the state shown in FIG. 19a where the film 1 is not applied, it is possible for the adhesion-promoting layer 4 to have a cloudy visual appearance, for example because of a surface roughness of the adhesion-promoting layer 4. After application of the film 1 to the target substrate 10, as shown in FIG. 19b, the adhesion-promoting layer 4 is now preferably highly transparent and clear, as for example the surface roughness of the adhesion-promoting layer 4 has been smoothed out by the application process. The application of the film 1 can be effected by hot stamping. It is possible here for the film to be applied to the target substrate from a roll or from a sheet by means of hot stamping. The hot stamping is preferably effected at a stamping temperature between 80° C. and 250° C., preferably between 100° C. and 200° C., and/or at a stamping pressure between 0.5 kN/cm$^2$ to and 10 kN/cm$^2$. Further, it is also expedient if the stamping time lies in a range of from 1 ms to 2000 ms, preferably in a range of from 1 ms to 500 ms. After application of the film 1 to the target substrate, as shown in FIG. 19b, the carrier substrate 2 is removed. As set out above, the carrier substrate 2 can be detached, as, because of the separating layer 13 arranged between the carrier substrate 2 and the protective varnish layer 6, the adhesive force between the carrier substrate 2 and the protective varnish layer 6 is 20% to 80%, preferably 30% to 70%, smaller than the adhesive force between the protective varnish layer 6 and the further applied layers of the film, in particular the electrically conductive layer 3 of the intermediate adhesive layer 11 and/or the decorative layers 12a and 12b and/or the adhesion-promoting layer 4. Preferably, because of the separating layer 13 arranged between the carrier substrate 2 and the protective varnish layer 6, the adhesive force force between the carrier substrate 2 and the protective varnish layer 6 is also smaller than the adhesive force between the applied layers of the film, in particular the electrically conductive layer 3 of the intermediate adhesive layer 11 and/or the decorative layers 12a and 12b and/or the adhesion-promoting layer 4, and the target substrate 10, with the result that when the carrier substrate 2 is peeled off the applied layers of the film 1 do not detach from the target substrate 10.

The electrical functional element shown in FIG. 19b can be raised in the tail region 23, with the result that the contacting region 20 is reliably accessible and can be contacted reliably in further steps. In the region 22, which has the adhesion-promoting layer 4, the film 1 adheres to the target substrate 10. In the region 22 the adhesion of the film 1 is at least so strong that the film 1 does not detach from the target substrate 10 in the case of normal use.

Figure 20A:
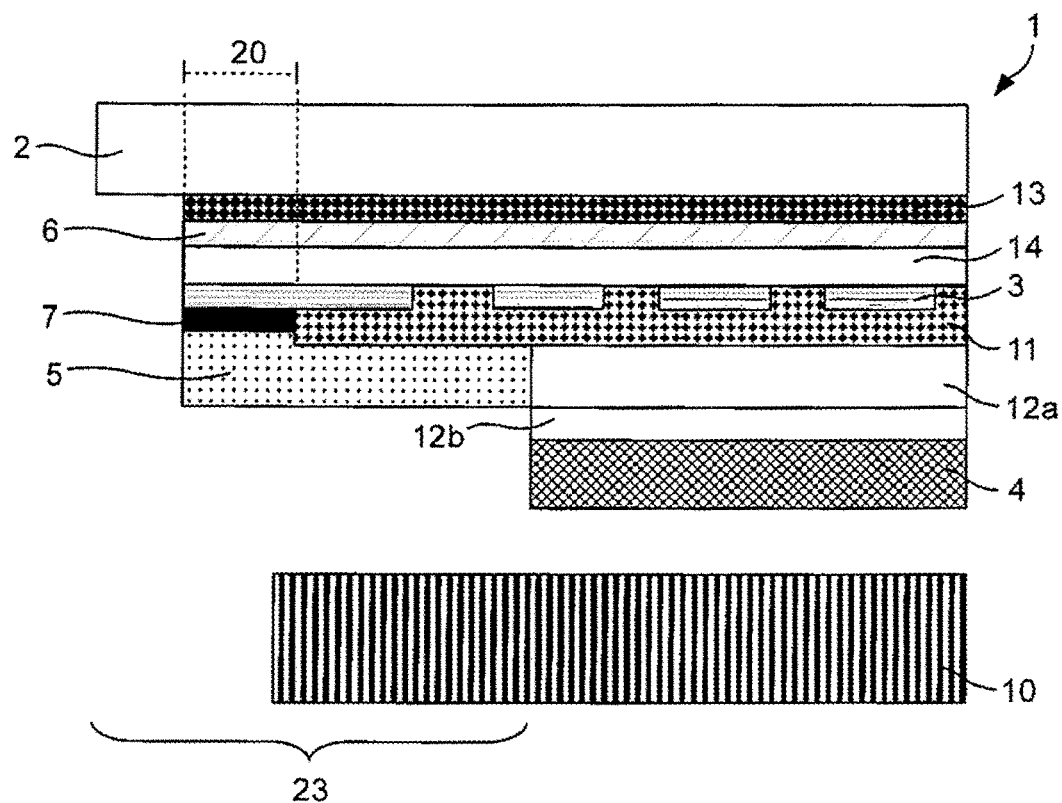
Figure 20B:
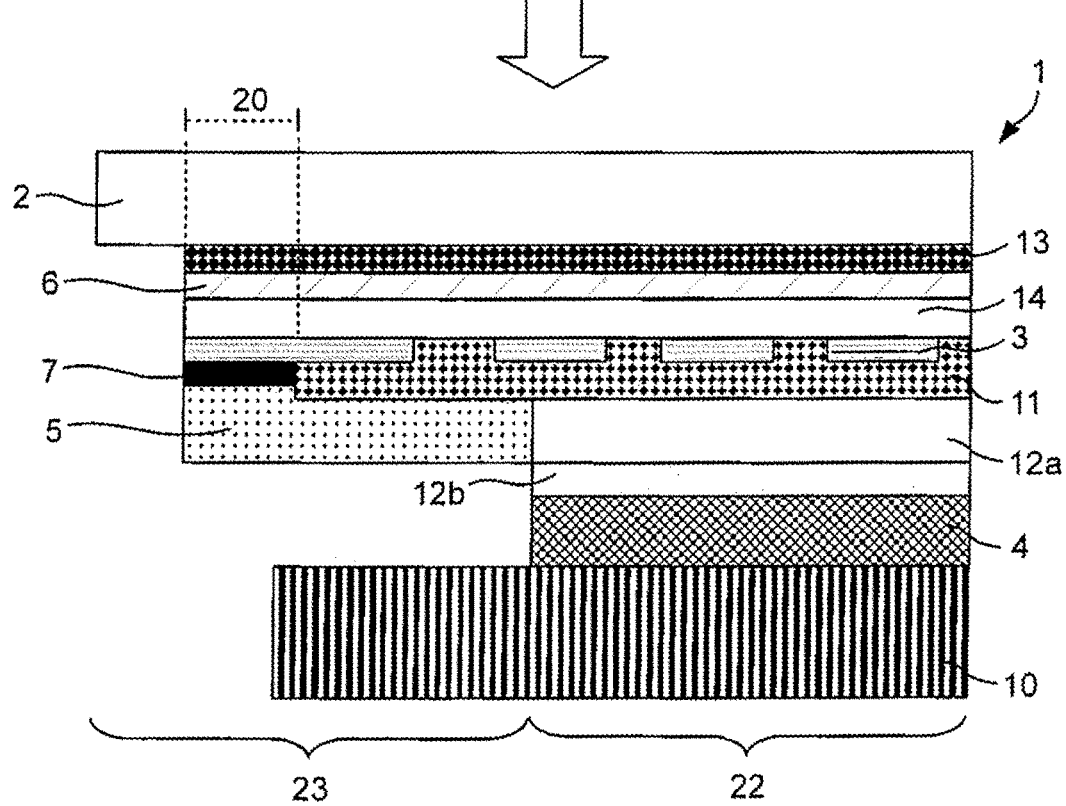

FIG. 20a and FIG. 20b show method steps for producing an electrical functional element. FIG. 20a and FIG. 20b corresponding to FIG. 19a and FIG. 19b, with the difference that the film 1 additionally comprises the foundation varnish layer 14. With respect to the design of the layers, reference is made here to the above statements. Further, as shown in FIG. 20b, the carrier substrate 2 is not removed after application of the film 1 to the target substrate. The film 1 shown in FIG. 20b can therefore, exactly like the film shown in FIG. 19b, be raised in the region 23, which comprises the contacting region 20. In the region 22, in contrast, the film 1 adheres to the target substrate 10.

Figure 21A:
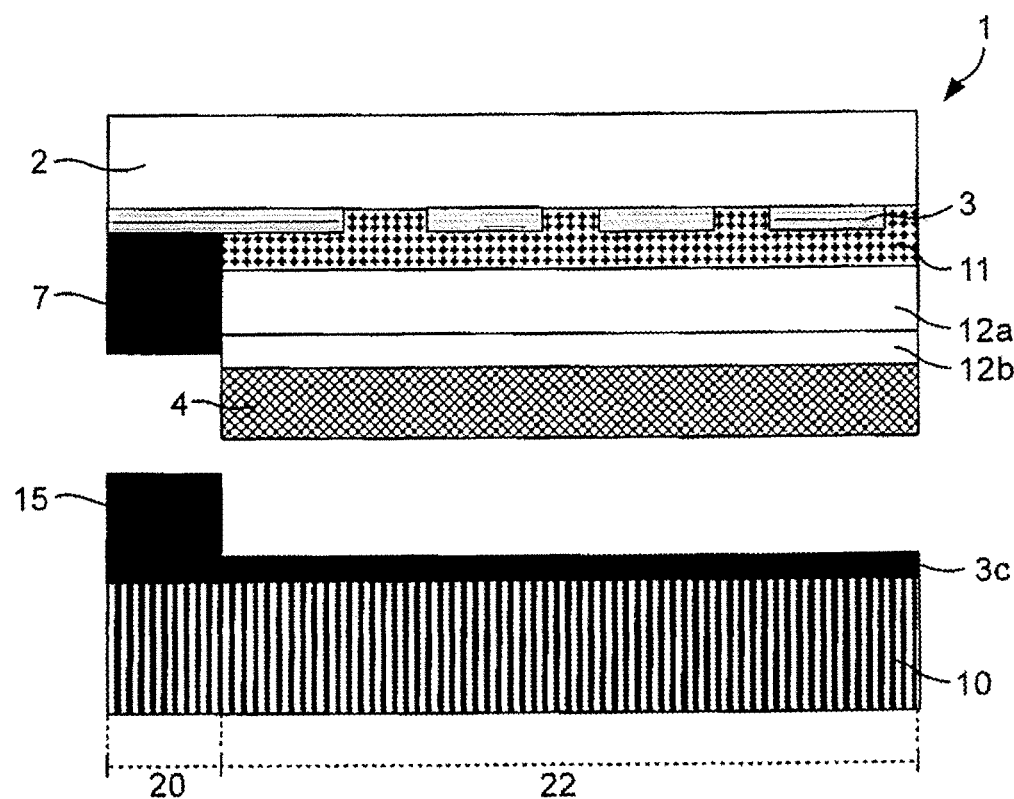
Figure 21B:
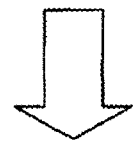

FIG. 21a and FIG. 21b show method steps for producing an electrical functional element. FIG. 21a shows the use of a film 1 according to the invention for application to a target substrate 10. With respect to the design of the layers of the film 1, reference is made here to the above statements. As shown in FIG. 21a, the film 1 does not have an adhesion-promoting layer 4 in the region 20.

As shown in FIG. 21a, the target substrate 10 has a contact layer 15, in particular for the electrical contacting of the at least one contacting region 20 of the film 1. The contact layer 15 is preferably applied directly to the target substrate 10. It is further possible for the contact layer 15 to have at least one connection element, in particular an electrical connection, such as for example a plug. It is also possible for the contact layer 15 to have at least one adapter element and/or contact element. The target substrate 10 thus preferably itself already has a contacting structure, in particular for the electrical contacting of the at least one contacting region 20 of the film 1, in the form of the contact layer 15.

As shown in FIG. 21a, the contact layer 15 is arranged in the region 20. The region 20 thus forms a target contacting region, which forms the counterpart of the contacting region 20 of the film 1. The target contacting region of the target substrate 10 and the contacting region 20 of the film 1, as shown in FIG. 21a, are congruent in particular after application of the film 1 to the target substrate 10. Further, it is also possible for the target contacting region of the target substrate 10 and the contacting region 20 of the film 1 to overlap at least in areas after application of the film 1.

The target substrate 10, as shown in FIG. 21a, further has an electrically conductive layer 3c. The electrically conductive layer 3c preferably has a plurality of conducting paths, which are preferably arranged in a grid. This grid can be regular or irregular. The grid can be constructed in particular from grid elements, such as lines and/or surface elements.

Further, it is also possible for the electrically conductive layer 3c to have further electrical components, such as for example antennae, capacitances and inductances.

As shown in FIG. 21a, the electrical conductive layer 3c is electrically, in particular galvanically, connected to the contact layer 15. It is also possible for the electrical conductive layer 3c to be connected to the contact layer 15 via a capacitive and/or inductive coupling.

The contact layer 15 and/or the electrically conductive layer 3c in FIG. 21a is/are preferably applied to the target substrate 10 by means of printing, in particular by means of screen printing. Further, it is also possible for the contact layer 15 and/or the electrically conductive layer 3c to be produced by means of laser direct structuring (LDS) on the target substrate 10.

The contact layer 15 preferably consists of an electrically conductive paste, in particular carbon paste, which preferably comprises silver (Ag), gold (Au), aluminum (Al), copper (Cu), chromium (Cr) and/or other conductive metals. It is further possible for the electrically conductive paste, in particular carbon paste, to comprise binders, in particular comprising colophony and/or phenol resins, polymers and copolymers. Binders of the electrically conductive paste, in particular carbon paste, are natural resins, preferably colophony, phenol resins, polymers and copolymers consisting of PVC, PMMA, PU, polyester, isocyanate (NCO)-crosslinked binders, for example MF, MPF, melamine polyesters, UMF. Binders of the electrically conductive paste comprising poly(organo)siloxanes and copolymers thereof and/or radiation-curing binders are less preferred.

As shown in FIG. 21b, the film 1 is applied to the target substrate 10, wherein the target substrate 10, as set out above, has the contact layer 10 and the electrically conductive layer 3c.

Through the application of the film 1 to the target substrate 10, by means of the contact layer 15, the electrically conductive layer 3c of the target substrate 10 is electrically connected to the functional structure of the electrically conductive layer 3 of the film 1 over the contacting region 20 of the film 1. The contact layer 15 on the target substrate 10 thus forms the counter contact for the contacting region 20 of the film 1.

It is further possible for the film 1 to be printed with an adhesive varnish in the contacting region 20, completely or partially patterned, for example in a grid. During the application of the film 1 to the target substrate 10 provided with the contact layer 15, an electrical (press) contact thus preferably forms (by heat and pressure) between film 1 and target substrate 10, in particular in the at least one contacting region 20 and/or target contacting region. Thus, it is possible for an electrical contact between the contact layer 15 of the target substrate 10 and the contacting region 20 of the film 1 to form. The electrical (press) contact is durably strengthened by the bonding, in particular by the adhesive varnish. The adhesive varnish is advantageously an electrically conductive adhesive varnish.

It is further possible for an ACF bonding tape to be introduced between the contacting region 20 of the film 1 and the target contacting region of the target substrate 10. The electrical connection in the contacting region 20 can hereby be further improved. It is advantageous here if the application process (heat and pressure) also corresponds to the usual ACF bonding process as far as possible.

As shown in FIG. 21a and FIG. 21b, the film 1 does not have a tail region which can be raised easily, for example, by an overhanging carrier substrate. The film 1 shown in FIG. 21a and FIG. 21b also does not require such a tail region, as it is applied directly to a target substrate 10, which, because of the contact layer 15, already has a counter contact, by means of which an electrical connection between the electrically conductive layer 3 of the film 1 and the electrically conductive layer 3c of the target substrate 10 can be produced. Therefore, a tail region is not necessary in this embodiment example.

Figure 21B:
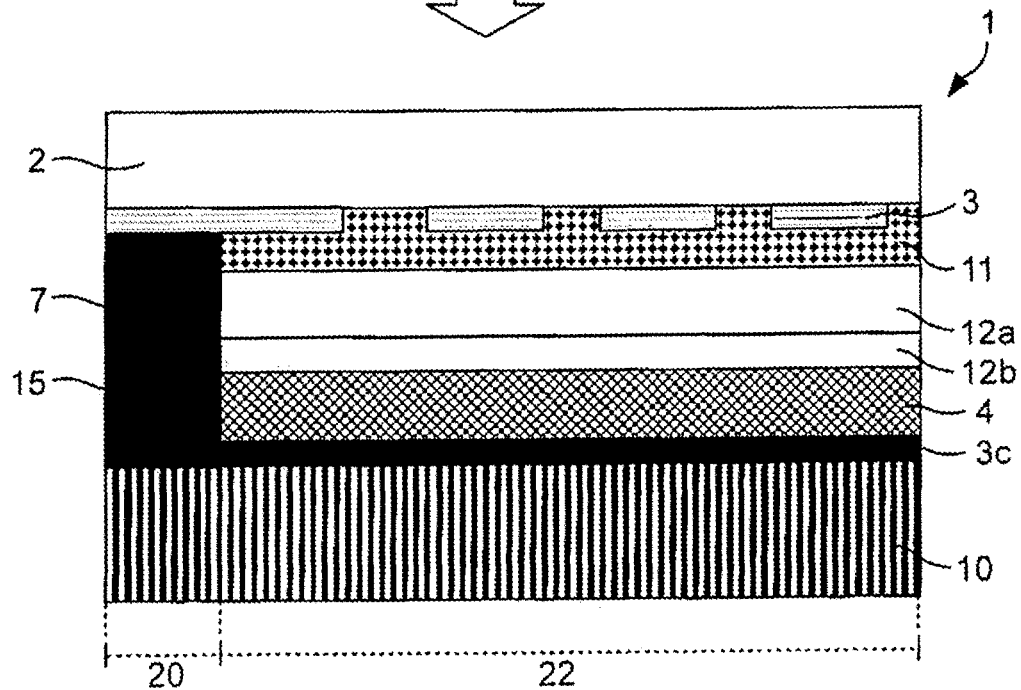

With respect to the design of the layers in FIG. 21, reference is made here to the above statements.

Figure 22A:
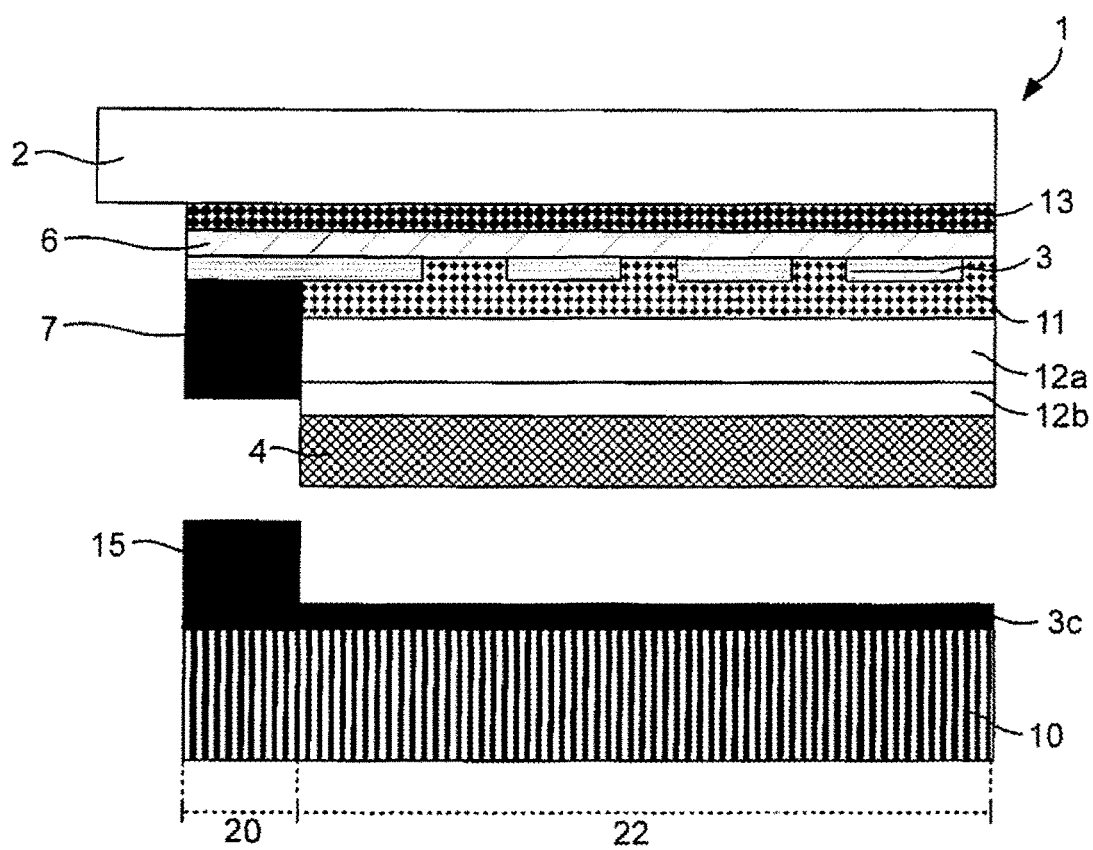
Figure 22B:
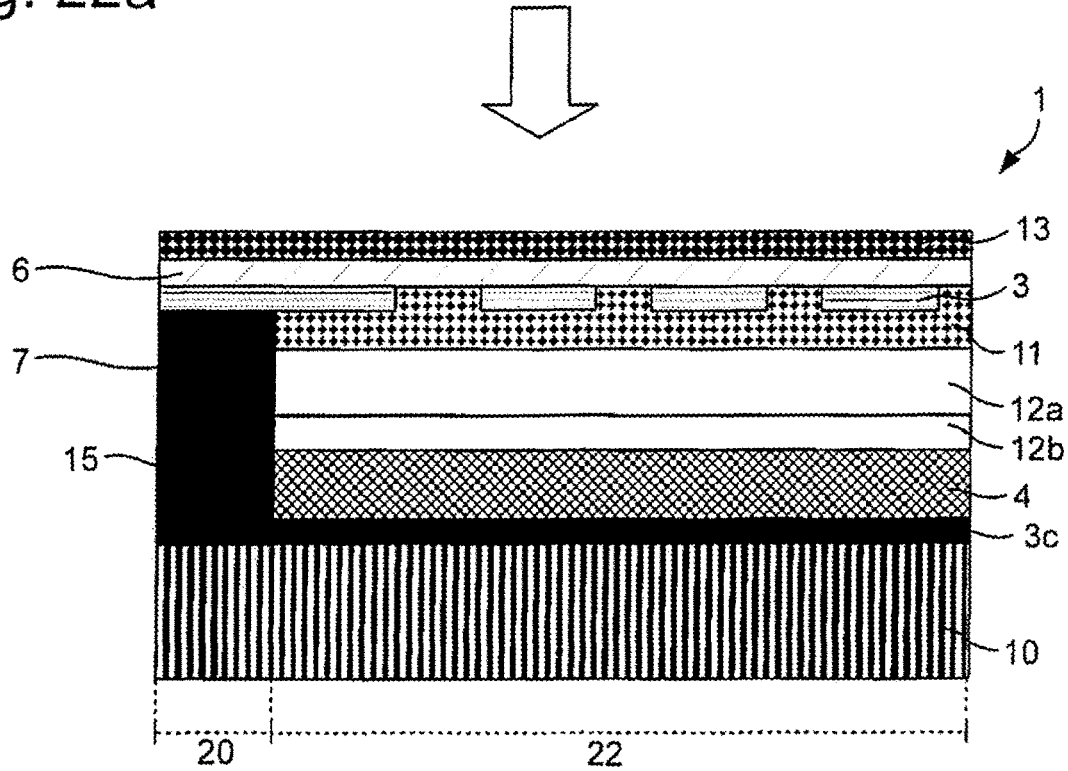

FIG. 22a and FIG. 22b show method steps for producing an electrical functional element. FIG. 22a and FIG. 22b corresponding to FIG. 21a and FIG. 21b, with the difference that the film 1 additionally comprises the separating layer 13 as well as the protective varnish layer 6. With respect to the design of the layers, reference is made here to the above statements. Further, as shown in FIG. 22a, the carrier substrate 2 is designed overhanging, with the result that the carrier substrate 2, as shown in FIG. 22b, can be easily removed after application of the film 1 to the target substrate 10. The film 1 shown in FIG. 22a is therefore, exactly like the film 1 shown in FIG. 21a, applied to a target substrate 10 provided with a contact layer 15, whereby an electrical connection between the electrically conductive layer 3 of the film 1 and the electrically conductive layer 3c of the target substrate 10 is produced.

FIG. 23a to FIG. 23d show top views of a target substrate 10, films 1 and an electrical functional element.

Figure 23A:
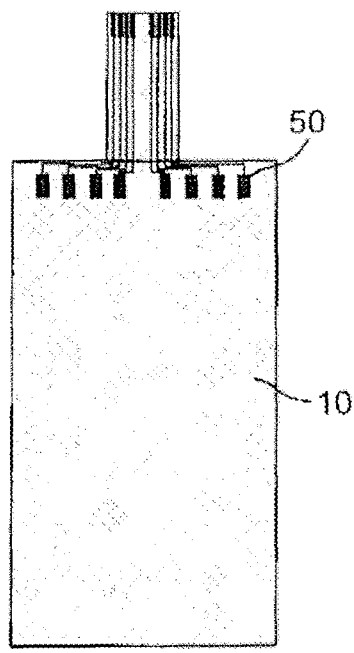

Thus, FIG. 23a shows a target substrate 10 to which a contact layer is applied. The contact layer here has connection elements 50. The connection elements 50 are preferably integrated ZIF contacts, which are connected, as shown in FIG. 23a, to an ACF contacting region by means of conducting paths. It is further possible for the target substrate 10 to be transparent. The contact layer having the connection elements 50 was applied, for example, by means of hot stamping in FIG. 23a. The contact layer of the target substrate 10 here is designed in such a way that two films can be applied to the target substrate 10. Thus, the target substrate 10 to which two films are to be applied, in FIG. 23a, already has a contact layer which is designed in such a way that a two-ply sensor consisting of a film for the x-ply and a film for the y-ply can be applied.

Figure 23B:
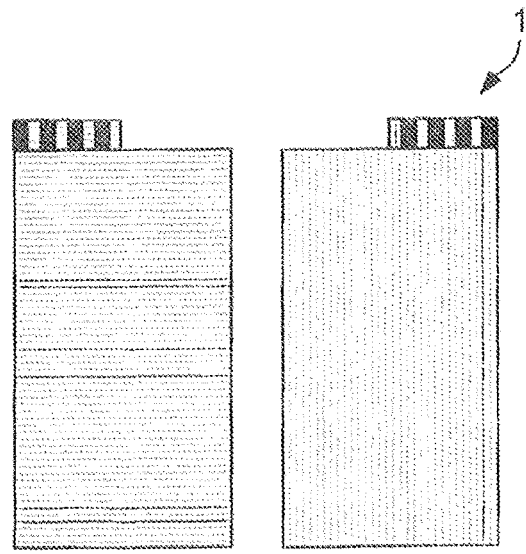

FIG. 23b shows films 1 which together form a two-ply sensor. One film 1 in FIG. 23b forms the x-ply and one film 1 forms the y-ply. Thus, it is possible, for example, for the x-ply to comprise x-sensors of a touch sensor, which detect the x-coordinates of a touch, and for the y-ply to comprise y-sensors of a touch sensor, which detect the y-coordinates of a touch. With respect to the design of the films 1, reference is made here to the above statements.

Figure 23C:
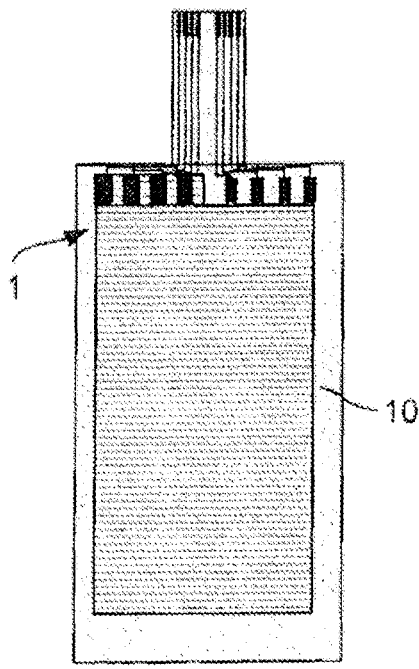

As shown in FIG. 23c, a first film 1, which comprises the first sensor ply, for example the x-ply, is preferably first applied to the target substrate 10 and the electrical contact is produced, in particular by means of ACF bonding. The first film 1, in particular the contacting region of the first film, is advantageously applied register-accurate relative to the contact layer, in particular relative to the connection elements 50 of the contact layer, of the target substrate 10, which are applied to the target substrate for the electrical contacting, in particular of the contacting region of the first film.

Figure 23D:
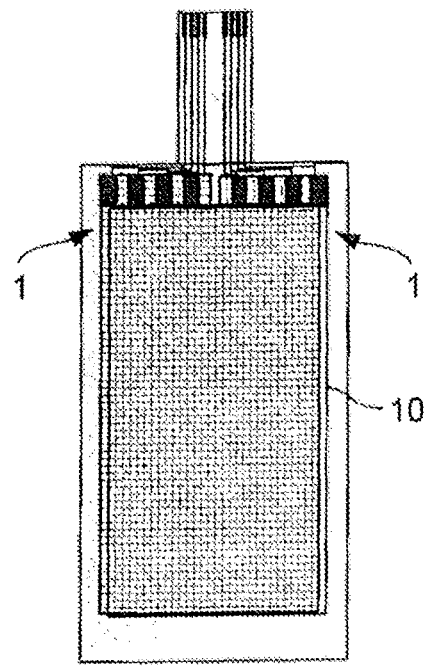

As shown in FIG. 23d, in a separate step the second film 1, which comprises the second sensor ply, for example the y-ply, is preferably then applied register-accurate relative to the first film 1 or register-accurate relative to the contact layer, in particular relative to the connection elements 50 of the contact layer, of the target substrate 10, which are applied to the target substrate 10 for the electrical contacting, in particular of the contacting region of the second film 1. It is possible here that a bonding, for example by means of OCA, between the sensor plies can be dispensed with. The register accuracy, i.e. the positional accuracy, of the second film relative to the first film is preferably ±350 µm, further preferably ±150 µm, in the x- and y-directions, in order to achieve the desired functionality of the electrical functional element, such as for example of the touch sensor.

Figure 24A:
Figure 24A:
Figure 24B:
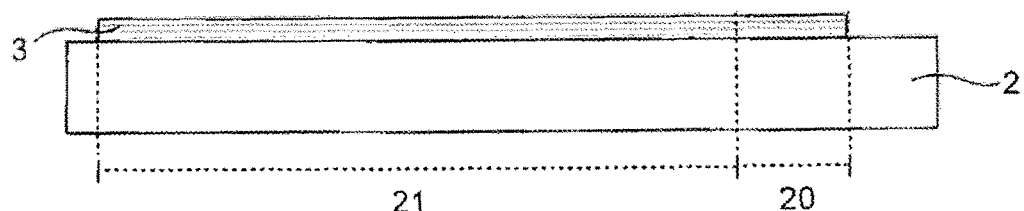

FIG. 24a to FIG. 24e show method steps for producing a film 1. For this, as shown in FIG. 24a, a carrier substrate 2 is provided. Then, as shown in FIG. 24b, the electrical conductive layer 3 is applied to the carrier substrate 2 at least in areas. The electrically conductive layer 3 is, for example, a metal layer made of copper. The metal layer 3 here is applied at least in the regions which later form the functional region 21 and the contacting region 20. The metal layer 3 is preferably applied by means of a vacuum metallization method, i.e. the metal layer 3 is vapor-deposited onto the possibly pre-treated carrier substrate 2. The pre-treatment of the carrier substrate 2 can be, for example, a corona or plasma treatment or the application of a single- or multi-layered adhesion-promoter layer. Thus, for example, copper as the starting material is heated to temperatures close to the boiling point. The individual atoms, atom clusters or molecules of the copper breaking free here migrate through a vacuum chamber and deposit on the opposite, cooler carrier substrate 2. A thin layer made of the vaporized metal hereby forms on the carrier substrate 2. Through the use of masks, it is possible to vapor-deposit the metal layer 3 in areas. It is further possible for the layer thickness of the thin copper layer formed by the vacuum metallization to be increased by galvanic boosting.

Figure 24C:
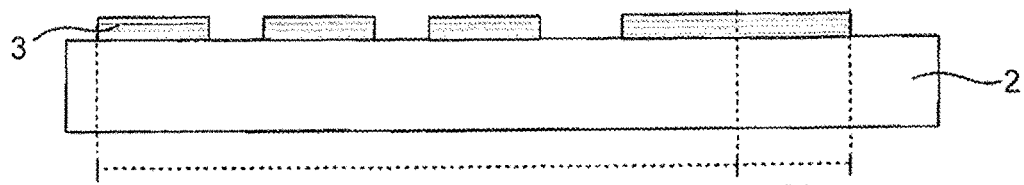

As shown in FIG. 24c, the metal layer 3 applied over the whole surface is then structured. For this, photolithographic techniques are preferably used, i.e. the metal layer 3 is removed again in areas corresponding to the formation of the electrical functional structure in the functional region 21 and contacting structure in the contacting region 20 by positive or negative exposure and etching or by means of a washing method. Thus, for example, a photoresist layer is first applied to the metal layer 3 for the structuring of the metal layer 3. The photoresist layer is then exposed using a mask and a lamp, such as a mercury-vapor lamp, or a laser, such as an excimer laser, wherein the exposed regions correspond to those regions in which the metal layer 3 is to be removed. The exposed regions of the photoresist layer are then worn away and an etching step is then carried out which removes the metal layer 3 in those regions in which the photoresist layer has been worn away. The remaining photoresist layer is then removed.

Figure 24D:
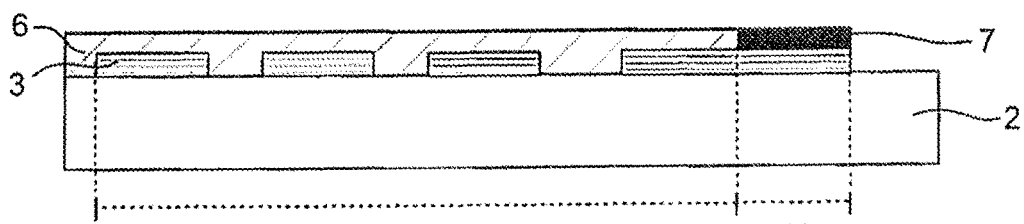

In a next, optional step, as shown in FIG. 24d, a protective varnish layer 6 and a contact-strengthening layer 7 are applied. The protective varnish layer 6 and the contact-strengthening layer 7 here are cast in areas, for example by means of slot dies (=nozzles). The contact-strengthening layer 7 shown in FIG. 24d is a layer made of a carbon conductive varnish. The protective varnish layer 6 shown in FIG. 24d is a layer made of PAC. However, it is also possible for the protective varnish layer 6 and the contact-strengthening layer 7 to be applied by means of gravure printing, such as for example reverse gravure or reverse roll, screen printing or relief printing, such as for example pad printing or flexographic printing. The layers 4, 5, 6 and 7 are preferably physically drying, with the result that it is advantageous to allow them to dry first, in particular before the application of a further layer.

Figure 24E:
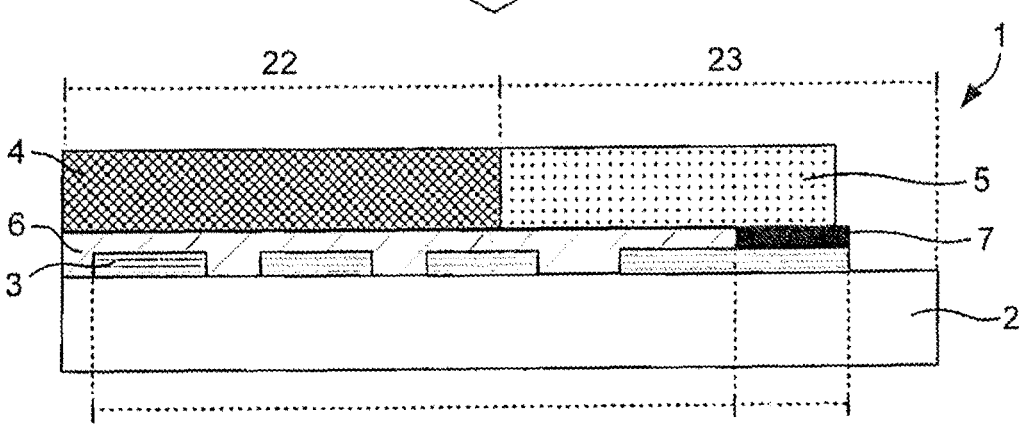

As shown in FIG. 24e, the adhesion-promoting layer 4 is then applied in the region 22. In contrast, the adhesion-promoting layer 4 is not applied in the region 23. The adhesion-promoting layer 4 can be printed on. Gravure printing, screen printing or relief printing methods are suitable as printing methods. However, it is also possible for the adhesion-promoting layer 4 to be cast in the region 22, for example by means of a slot die. Optionally, as shown in FIG. 24e, a detachment layer 5 can be printed on, for example by means of screen printing. The detachment layer 5 can also be applied by means of other printing methods, such as gravure printing or relief printing. The detachment layer 5 can also be applied by means of a slot die. After application of the film 1 to a target substrate, the film 1 shown in FIG. 24e adheres to the target substrate in the region 22, which has the adhesion-promoting layer 4. In the region 23, in contrast, which comprises the contacting region 20, the film 1 does not adhere to the target substrate. The above-named depositing methods can, as already explained, lead to surface roughnesses of the adhesion-promoting layer 4, with the result that the adhesion-promoter layer 4 has, for example, light-scattering properties when not yet applied to the target substrate. In particular after application of the film 1, the adhesion-promoting layer 4 is highly transparent, as the adhesion-promoting layer 4 is, for example, melted on by means of hot lamination and/or smoothed out by means of pressure such that surface roughnesses of the adhesion-promoting layer 4 no longer appear in a visually disruptive manner.

Figure 25A:
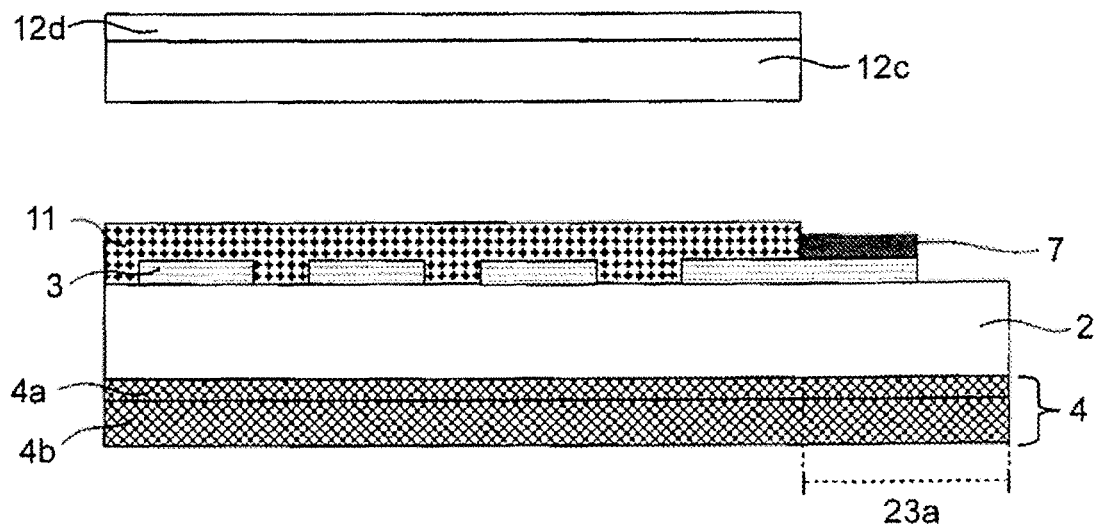
Figure 25B:
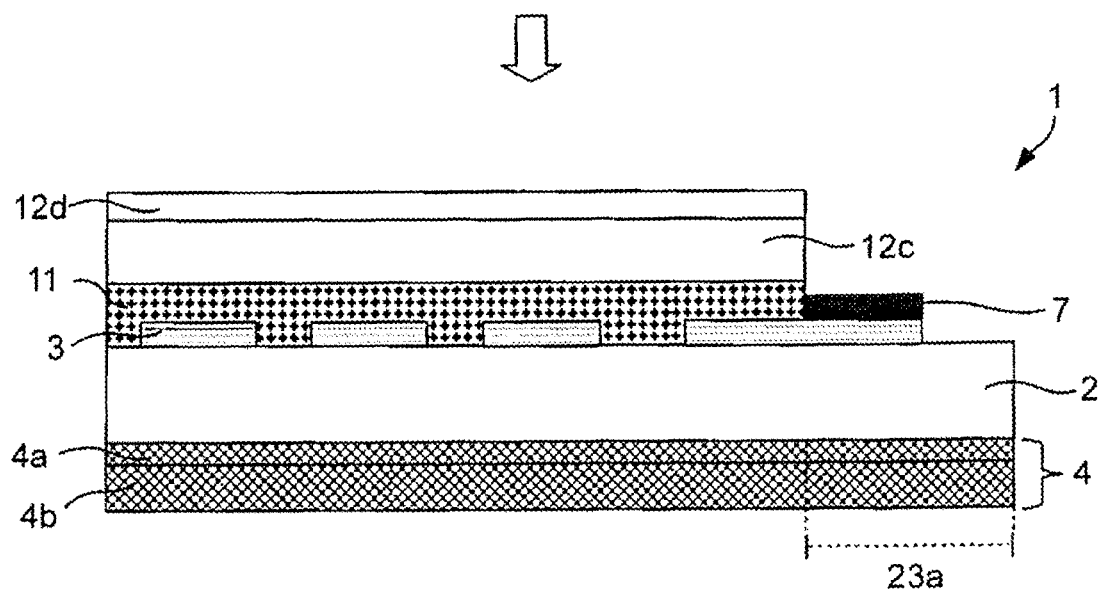

FIG. 25*a* and FIG. 25*b* show a method step for producing a film 1. For this, as shown in FIG. 25*a*, the decorative layers 12*c* and 12*d* are provided. As already explained, the decorative layer 12*c* can be, for example, a transparent colored varnish layer which is arranged on the decorative layer 12*d*, which can be molded as a transparent carrier layer. The decorative layers 12*c* and 12*d* are applied to the intermediate adhesive layer 11 by means of hot stamping. However, it is also possible for the decorative layers 12*c* and 12*d* to be applied to the intermediate adhesive layer 11, for example, by means of cold stamping and/or by means of thermotransfer methods and/or by means of different laminating methods. As shown in FIG. 25*b*, the carrier layer 12*d* here remains on the film 1. Further, it is also possible for the carrier layer 12*d* to be removed, with the result that in FIG. 25*b* only the decorative layer 12*c* remains on the film 1.

Figure 26A:
Figure 26B:
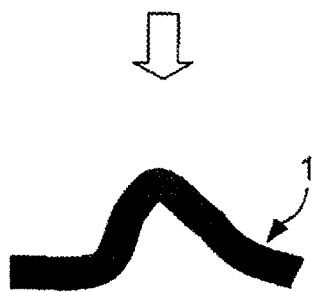
Figure 26C:
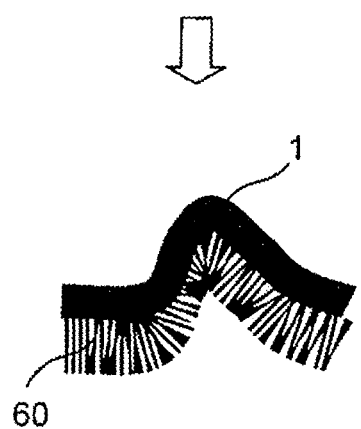

FIG. 26*a* to FIG. 26*c* schematically show method steps for reshaping a film and/or an electrical functional element.

FIG. 26*a* shows a film 1 which, as set out above, is designed multi-layered. With respect to the design of the layers, reference is made here to the above statements. It is further possible for the film 1 to be already applied to a target substrate and/or intermediate substrate, with the result that this is an electrical functional element formed from the film 1 and the target substrate and/or intermediate substrate. The film 1 and/or the electrical functional element can be reshaped, in particular by means of the reshaping processes described in the following. The target substrate and/or intermediate substrate here preferably has a layer thickness of at most 1 mm, preferably 500 µm, with the result that the electrical functional element can be reshaped.

The reshaping advantageously takes place by means of reshaping processes, preferably by means of deep-drawing, thermoforming, high-pressure forming or by means of an injection-molding process.

The film 1 and/or the electrical functional element is preferably reshaped by means of deep-drawing. FIG. 26*b* here shows, for example, the film 1 after the reshaping by means of deep-drawing. The reshaping of the film 1 and/or of the electrical functional element is advantageously effected here by means of vacuum, in particular at a negative pressure of at most 1 bar, and/or by means of positive-pressure support, in particular at a positive pressure between 1 bar and 3 bar, in a reshaping mold corresponding to the desired reshaping geometry.

It is further possible for the film 1 and/or the electrical functional element to be reshaped by means of thermoforming. The reshaping process for the film 1 and/or the electrical functional element or the process parameters of the reshaping process advantageously correspond/corresponds to those/that of the deep-drawing, wherein the reshaping is effected with an additional temperature support, in particular at a temperature between 120° C. and 300° C., preferably between 190° C. and 250° C., for example if ABS material is used. It is possible here for either the carrier substrate and/or the target substrate to contain ABS material.

It is also possible for the film 1 and/or the electrical functional element to be reshaped by means of high-pressure forming. The reshaping of the film 1 and/or of the electrical functional element is advantageously effected here by means of positive-pressure support, in particular at a positive pressure between 1 bar and 300 bar, preferably between 10 bar and 150 bar, in a reshaping mold corresponding to the desired reshaping geometry. It is expedient here that the reshaping is effected with an additional temperature support, preferably at temperatures in the range of the glass transition temperature of the film 1 used. The temperature here is advantageously between 120° C. and 300° C., preferably between 190° C. and 250° C., for example if ABS material is used.

Three-dimensional stretches of the film 1 and/or of the electrical functional element of up to 200% are preferably achieved by means of the above-named reshaping processes. It is also possible, in particular in the case of optimization of the parameters for the respective system, to achieve stretches of up to 300%, wherein stretches between 20% and 50% are sufficient in many application cases.

As shown in FIG. 26*c*, the film 1 reshaped or pre-shaped beforehand for example by means of deep-drawing is back injection molded in a subsequent injection-molding process with an injection-molding material 60.

Further, it is also possible for the film 1 and/or the electrical functional element to be reshaped and/or deformed by means of an injection-molding process. The film 1 and/or the electrical functional element here is advantageously introduced into the injection mold in the flat state via a roll or from a sheet or via a single label and deformed by means of the injection-molding method, wherein in particular the shaping is effected by closing the mold as well as also by the injection of the molding material. The injection pressure in particular is dependent on the component geometry and/or the component size here. For example, it is possible for the injection pressure to be 500 bar and the injection temperature to be between 180° C. and 380° C., wherein injection pressure and injection temperature are dependent on the injection-molding material. Further, it is also expedient that the film 1 introduced into the injection mold and/or the electrical functional element is/are heated before the process of closing the injection mold by means of heating the film 1 and/or the electrical functional element, for example at temperatures between 30° C. and 300° C., preferably between 80° C. and 150° C. It is also possible for the film 1 and/or the electrical functional element to be fitted into the cavity by means of clip frames and/or vacuum and/or positive pressure.

It is also advantageous to reshape the film 1 and/or the electrical functional element by means of "overlaying" the film 1 and/or the electrical functional element over an already three-dimensionally pre-shaped component. The "overlaying" of the film 1 and/or of the electrical functional element is advantageously effected by controlling a vacuum suction of the film 1 and/or of the electrical functional element against the already three-dimensionally pre-shaped component with simultaneous positive pressure in one process. Here the already three-dimensionally pre-shaped component to be overlaid is preferably acted on by temperature beforehand. It is expedient here if the positive pressure is between 1 bar and 50 bar, preferably between 3 bar and 15 bar, and/or the temperature is between 30° C. and 300° C., preferably between 100° C. and 180° C.

The film 1 and/or the electrical functional element preferably has a stretchability of more than 20%. Such high stretchabilities cannot be achieved, for example by means of the above-named reshaping and/or deforming processes, in the case of conventional functional films, in particular as the carrier film made of, for example, PET is not deformable enough and/or the conductive structures break even after slight deformation, in particular in the case of stretches greater than 20%. It has been shown here that the stretching is improved by the film 1 according to the invention. Thus, through the multi-layered structure of the film 1 according to the invention, in particular through the at least one electrically conductive layer embedded between several varnish layers according to a sandwich system, as previously described, it is achieved that the mechanical stretching and/or deformation can be influenced in a targeted manner, in that for example particular regions of the film 1 can be designed more flexible or less flexible by adapting the layer thicknesses or the varnish formulations. The desired stretchability of more than 20% is thus preferably achieved here.

In the case of the above-named three-dimensional deformations it is also advantageous if the electrical functional structure of the film 1 and/or of the electrical functional element can be contacted electrically, in particular galvanically, from the outside, for which the electrical contacts have to be accessible for a contacting. Alternatively, an inductive and/or capacitive coupling, in particular a coupling via an antenna, can be realized. As set out above, a robust and reliable contacting of the electrical functional structure is made possible by the film 1 according to the invention.

LIST OF REFERENCE NUMBERS

1 film
2 carrier substrate
3, 3a, 3b, 3c, 30 electrically conductive layers
4 adhesion-promoting layer
5 detachment layer
6 protective varnish layer
7 contact-strengthening layer
8 dielectric layer
9 darkening layer
10 target substrate
11 intermediate adhesive layer
12a, 12b, 12c, 12d, 12e, 12f,
12g, 12h, 12i, 12j decorative layers
13 separating layer
14 foundation varnish layer
15 contact layer
20, 20a, 20b, 20c contacting region(s)
21 functional region
22, 23, 23a, 24, 25 regions
26 conducting path width
27 conducting path distance
30v section
31, 32, 31a, 32a conducting path(s)
33 surface elements
40 upper side
41 underside
42, 43 boundary surfaces
50 connection element
51 adapter element
52 contact element
60 injection-molding material
70 transfer ply

The invention claimed is:

1. A film comprising a carrier substrate, an adhesion-promoting layer for applying the film to a target substrate and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate, wherein the adhesion-promoting layer is arranged on the side of the carrier substrate facing away from the at least one electrically conductive layer.

2. The film according to claim 1, wherein the adhesion-promoting layer covers the functional region at least in areas.

3. The film according to claim 1, wherein the adhesion-promoting layer does not cover the at least one contacting region over the whole surface.

4. The film according to claim 1, wherein the adhesion-promoting layer does not cover a region adjoining the at least one contacting region when viewed perpendicularly to a plane spanned by the carrier substrate and wherein the region adjoining the at least one contacting region has a width of at least 0.2 mm.

5. The film according to claim 1, wherein the film comprises a detachment layer, wherein the detachment layer covers the at least one contacting region at least in areas when viewed perpendicularly to a plane spanned by the carrier substrate.

6. A film comprising a carrier substrate, an adhesion-promoting layer for applying the film to a target substrate and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate, wherein the film comprises a detachment layer, wherein the detachment layer covers the at least one contacting region at least in areas when viewed perpendicularly to a plane spanned by the carrier substrate, and wherein the detachment layer covers a region adjoining the at least one contacting region.

7. The film according to claim 6, wherein the detachment layer has a layer thickness between 0.1 µm and 10 µm.

8. The film according to claim 6, wherein the adhesion-promoting layer is a layer made of polymers and/or copolymers comprising PMMA, polyester, PU or PVC.

9. The film according to claim 6, wherein the adhesion-promoting layer has a layer thickness between 0.1 µm and 50 µm.

10. The film according to claim 6, wherein the adhesion-promoting layer comprises a material which has a transmittance for light in the wavelength range between 380 nm and 780 nm of more than 85% after application to the target substrate.

11. The film according to claim 6, wherein the adhesion-promoting layer comprises a material which deflects less than 8% of light in the wavelength range between 380 nm and 780 nm through scattering after application to the target substrate.

12. The film according to claim 6, wherein the adhesion-promoting layer is formed from a hot glue, a cold glue or a radiation-curing glue.

13. The film according to claim 6, wherein the film comprises a protective varnish layer.

14. The film according to claim 13, wherein the protective varnish layer covers the at least one electrically conductive layer at least in areas when viewed perpendicularly to a plane spanned by the carrier substrate.

15. The film according to claim 14, wherein the protective varnish layer has a layer thickness between 0.1 µm and 50 µm.

16. The according to claim 13, wherein the protective varnish layer is a transparent protective varnish layer made of PMMA, polyester, PU or PVC.

17. The film according to claim 13, wherein the protective varnish layer is arranged between the at least one electrically conductive layer and the adhesion-promoting layer.

18. The film according to claim 6, wherein the at least one contacting structure for contacting the electrical functional structure is an electrical plug.

19. A film comprising a carrier substrate, an adhesion-promoting layer for applying the film to a target substrate and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate,
wherein the at least one electrically conductive layer has a contact-strengthening layer.

20. The film according to claim 19, wherein the at least one electrically conductive layer has the contact-strengthening layer in the at least one contacting region at least in areas, wherein the contact-strengthening layer protects the at least one contacting region from mechanical, physical and/or chemical environmental influences.

21. The film according to claim 19, wherein the contact-strengthening layer has a layer thickness between 0.1 µm and 100 µm.

22. The film according to claim 19, wherein the contact-strengthening layer is formed from an electrically conductive paste, which comprises silver, gold, aluminum, copper, chromium and/or other conductive metals.

23. The film according to claim 19, wherein the film, after application to the target substrate, has a transmittance for light in the wavelength range between 380 nm and 780 nm of more than 75% at least in the one functional region of the at least one electrically conductive layer.

24. The film according to claim 19, wherein the electrical functional structure forms a touch sensor panel, which provides a touchpad functionality.

25. The film according to claim 19, wherein the film comprises a first electrically conductive layer and a second electrically conductive layer.

26. The according to claim 25, wherein the at least two electrically conductive layers are arranged overlapping at least in areas when viewed perpendicularly to a plane spanned by the carrier substrate.

27. The film according to claim 25, wherein the at least two electrically conductive layers are arranged relative to each other with a tolerance of less than 0.25 mm.

28. The film according to claim 19, wherein the at least one electrically conductive layer and/or the two electrically conductive layers has/have a plurality of conducting paths.

29. The film according to claim 28, wherein the conducting paths have a width between 0.2 µm and 20 µm, and have a distance from each other greater than 10 µm.

30. The film according to claim 28, wherein the conducting paths of the first electrically conductive layer and of the second electrically conductive layer are in each case arranged according to a line grid, wherein the line grids are rotated relative to each other through 90°.

31. The film according to claim 28, wherein the conducting paths of the first electrically conductive layer and of the second electrically conductive layer are structured to form a plurality of surface elements.

32. The film according to claim 28, wherein the contacting regions of the at least two electrically conductive layers are brought together in a common contacting region.

33. The film according to claim 32, wherein the common contacting region is electrically contacted by means of an adapter element.

34. The film according to claim 28, wherein the conducting paths are formed from silver, gold, aluminum, copper or chromium in a layer thickness between 1 nm and 100 nm.

35. The film according to claim 28, wherein the conducting paths are formed from an electrically conductive paste comprising silver, gold copper and/or carbon.

36. The film according to claim 19, wherein the film comprises at least one intermediate adhesive layer.

37. The film according to claim 36, wherein the at least one electrically conductive layer is arranged between the carrier substrate and the at least one intermediate adhesive layer.

38. The film according to claim 19, wherein the at least one electrically conductive layer is arranged between the carrier substrate and the adhesion-promoting layer.

39. A film comprising a carrier substrate, an adhesion-promoting layer for applying the film to a target substrate and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate,
wherein the film further comprises at least one intermediate adhesive layer, and
wherein the at least one intermediate adhesive layer is arranged on the side of the carrier substrate facing away from the at least one electrically conductive layer.

40. The film according to claim 39, wherein the at least one intermediate adhesive layer does not cover the at least one contacting region at least in areas when viewed perpendicularly to a plane spanned by the carrier substrate.

41. The film according to claim 39, wherein the first intermediate adhesive layer covers the functional region at least in areas.

42. The film according to claim 39, wherein the intermediate adhesive layer does not cover the at least one contacting region over the whole surface.

43. The film according to claim 39, wherein the at least one intermediate adhesive layer is arranged substantially congruent with the adhesion-promoting layer when viewed perpendicularly to a plane spanned by the carrier substrate.

44. The film according to claim 39, wherein the film has one or more decorative layers.

45. The film according to claim 44, wherein the one or more decorative layers are arranged on the side of the carrier substrate facing away from the at least one electrically conductive layer and/or wherein the one or more decorative layers are arranged on the side of the at least one electrically conductive layer facing away from the carrier substrate.

46. The film according to claim 44, wherein the at least one intermediate adhesive layer is arranged between the carrier substrate and the one or more decorative layers.

47. The film according to claim 44, wherein the one or more decorative layers comprise at least one of the layers selected from the group protective layers, colored varnish layers, metal layers, reflective layers, replication varnish layers, transparent layers, carrier layers and/or layers generating an optically variable effect.

48. The film according to claim 44, wherein at least one of the one or more decorative layers has a haptically and/or tactilely detectable surface relief structure, at least in areas.

49. The film according to claim 44, wherein the one or more decorative layers are arranged substantially congruent with the adhesion-promoting layer and/or the intermediate adhesive layer when viewed perpendicularly to a plane spanned by the carrier substrate.

50. The film according to claim 39, wherein the film comprises a foundation varnish layer that can be vaporized for metallization.

51. The film according to claim 50, wherein the foundation varnish layer has a layer thickness between 0.1 µm and 5 µm.

52. A film comprising a carrier substrate, an adhesion-promoting layer for applying the film to a target substrate and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate, wherein the film comprises a separating layer.

53. The film according to claim 52, wherein the separating layer is arranged between the carrier substrate and the at least one electrically conductive layer.

54. The film according to claim 52, wherein the separating layer is arranged between the carrier substrate and a protective varnish layer.

55. The film according to claim 54, wherein, because of the separating layer arranged between the carrier substrate and the protective varnish layer, the adhesive force between the carrier substrate and the protective varnish layer is 20% to 80% smaller than the adhesive force between the protective varnish layer and/or the at least one electrically conductive layer and/or the adhesion-promoting layer.

56. The film according to claim 52, wherein the carrier substrate has a layer thickness between 2 µm and 250 µm.

57. The film according to claim 52, wherein the carrier substrate is a transparent carrier substrate made of PET, PMMA, PC, ABS, PU or glass.

58. The film according to claim 52, wherein the carrier substrate is formed from a hybrid material which comprises plastic layers and layers of fiber material.

59. A film comprising a carrier substrate, an adhesion-promoting layer for applying the film to a target substrate and at least one electrically conductive layer, wherein the at least one electrically conductive layer forms an electrical functional structure in a functional region, wherein the at least one electrically conductive layer forms at least one contacting structure for contacting the electrical functional structure in at least one contacting region, and wherein the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate, wherein the film can be reshaped.

60. The film according to claim 59, wherein the film can be reshaped by means of deep-drawing, thermoforming, high-pressure forming or by means of an injection-molding process.

61. A method for producing a film, wherein the method comprises the following steps, which are implemented in the following sequence:
  a) providing a carrier substrate;
  b) applying at least one electrically conductive layer to the carrier substrate, wherein the at least one electrically conductive layer forms an electrical functional structure in a functional region, wherein the at least one electrically conductive layer forms at least one contacting structure for contacting the electrical functional structure in at least one contacting region;
  c) applying an adhesion-promoting layer for application of the film to a target substrate in such a way that the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate,
wherein, in step c), the adhesion-promoting layer is arranged on the side of the carrier substrate facing away from the at least one electrically conductive layer.

62. A method for producing a film, wherein the method comprises the following steps, which are implemented in the following sequence:
  a) providing a carrier substrate;
  b) applying at least one electrically conductive layer to the carrier substrate, wherein the at least one electrically conductive layer forms an electrical functional structure in a functional region, wherein the at least one electrically conductive layer forms at least one contacting structure for contacting the electrical functional structure in at least one contacting region;
  c) applying an adhesion-promoting layer for application of the film to a target substrate in such a way that the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate,
wherein, between step b) and step c), the following step is carried out:

applying a contact-strengthening in such a way that the at least one electrically conductive layer has a contact-strengthening layer at least in areas in the at least one contacting region.

63. The method according to claim 62, wherein, in step c), the adhesion-promoting layer is applied in such a way that the at least one electrically conductive layer is arranged between the carrier substrate and the adhesion-promoting layer.

64. The method according to claim 62, wherein, in step c), the adhesion-promoting layer is applied in such a way that the adhesion-promoting layer covers the functional region at least in areas.

65. The method according to claim 62, wherein, in step b), the at least one electrically conductive layer is a metal layer and step b) further comprises the following steps:
vapor-depositing the metal layer, and
structuring the metal layer by removal of the metal layer in areas by means of photolithographic techniques.

66. The method according to claim 62, wherein, between step b) and step c), the following step is further carried out:
applying a protective varnish layer in such a way that the protective varnish layer covers the at least one electrically conductive layer at least in areas when viewed perpendicularly to a plane spanned by the carrier substrate.

67. A method for producing a film, wherein the method comprises the following steps, which are implemented in the following sequence:
a) providing a carrier substrate;
b) applying at least one electrically conductive layer to the carrier substrate, wherein the at least one electrically conductive layer forms an electrical functional structure in a functional region, wherein the at least one electrically conductive layer forms at least one contacting structure for contacting the electrical functional structure in at least one contacting region;
c) applying an adhesion-promoting layer for application of the film to a target substrate in such a way that the adhesion-promoting layer does not cover the at least one contacting region at least in areas when viewed perpendicularly to a plane spanned by the carrier substrate or wherein the adhesion-promoting layer is applied over the whole surface when viewed perpendicularly to a plane spanned by the carrier substrate,
wherein the method further comprises the following steps:
applying a detachment layer in such a way that the detachment layer covers the at least one contacting region at least in areas when viewed perpendicularly to a plane spanned by the carrier substrate.

68. The method according to claim 67, wherein the method further comprises the following steps:
applying an intermediate adhesive layer in such a way that the at least one electrically conductive layer is arranged between the carrier substrate and the at least one intermediate adhesive layer and/or wherein the first intermediate adhesive layer does not cover the at least one contacting region at least in areas when viewed perpendicularly to a plane spanned by the carrier substrate.

69. The method according to claim 67, wherein the adhesion-promoting layer, the protective varnish layer, the detachment layer, the intermediate adhesive layer and/or the contact-strengthening layer is/are applied by means of gravure printing, screen printing, relief printing or casting techniques.

70. The method according to claim 67, wherein the method further comprises the following steps:
g) applying one or more decorative layers in such a way that the one or more decorative layers are arranged on the side of the carrier substrate facing away from the at least one electrically conductive layer and/or wherein the one or more decorative layers are arranged on the side of the at least one electrically conductive layer facing away from the carrier substrate.

71. The method according to claim 70, wherein, in step g), the one or more decorative layers are applied in such a way that the one or more decorative layers are arranged substantially congruent with the adhesion-promoting layer and/or the intermediate adhesive layer when viewed perpendicularly to a plane spanned by the carrier substrate.

72. The method according to claim 70, wherein the one or more decorative layers are applied by means of hot stamping, cold stamping, thermotransfer methods and/or laminating methods.

73. A method for producing an electrical functional element, wherein the method comprises the following steps:
a) providing a film according to claim 1;
b) applying the film to a target substrate.

74. The method according to claim 73, wherein, in step b), the film is applied to the target substrate from a roll by means of hot lamination at a film web speed between 1.5 m/min and 3.5 m/min.

75. The method according to claim 73, wherein, in step b), the film is applied to the target substrate from a sheet by means of hot lamination.

76. The method according to claim 74, wherein the hot lamination is effected at a temperature in the range between 80° C. and 300° C., and/or with a stamping pressure in the range between 200 and 2000 bar.

77. The method according to claim 73, wherein, in step b), the film is applied to the target substrate by injection of an injection-molding material, wherein the injection-molding material forms the target substrate.

78. The method according to claim 73, wherein the adhesion-promoting layer consists of a material the visual appearance of which changes from cloudy to highly transparent and/or clear during and/or after step b).

79. The method according to claim 73, wherein, in step b), the film is applied to the target substrate by means of hot stamping.

80. The method according to claim 79, wherein the stamping temperature lies in a range of from 80° C. to 250° C., and/or the stamping pressure lies in a range of from 0.5 kN/cm$^2$ to 10 kN/cm$^2$, and/or the stamping time lies in a range of from 1 ms to 2000 ms.

81. An electrical functional element with a film according to claim 1.

82. The electrical functional element according to claim 81, wherein the adhesion-promoting layer of the film has a transmittance for light in the wavelength range between 380 nm and 780 nm of more than 85%, and/or wherein the adhesion-promoting layer of the film is a clear adhesion-promoting layer, wherein less than 8% of light in the wavelength range between 380 nm and 780 nm is deflected by the adhesion-promoting layer of the film through scattering.

* * * * *